United States Patent
Kishi et al.

(10) Patent No.: US 9,874,152 B2
(45) Date of Patent: Jan. 23, 2018

(54) OUTPUT CONTROL DEVICE FOR VEHICLE

(71) Applicant: Nissan Motor Co., Ltd., Kanagawa (JP)

(72) Inventors: Daigo Kishi, Kanagawa (JP); Ryouichi Ootaki, Kanagawa (JP); Toshiaki Motomura, Kanagawa (JP)

(73) Assignee: NISSAN MOTOR CO., LTD., Kanagawa (JP)

( * ) Notice: Subject to any disclaimer, the term of this patent is extended or adjusted under 35 U.S.C. 154(b) by 530 days.

(21) Appl. No.: 14/385,392

(22) PCT Filed: Mar. 14, 2013

(86) PCT No.: PCT/JP2013/057187
§ 371 (c)(1),
(2) Date: Sep. 15, 2014

(87) PCT Pub. No.: WO2013/137387
PCT Pub. Date: Sep. 19, 2013

(65) Prior Publication Data
US 2015/0066335 A1 Mar. 5, 2015

(30) Foreign Application Priority Data
Mar. 15, 2012 (JP) .................................. 2012-058478

(51) Int. Cl.
*F02D 11/10* (2006.01)
*F02D 29/02* (2006.01)
(Continued)

(52) U.S. Cl.
CPC ............ *F02D 11/10* (2013.01); *F02D 11/105* (2013.01); *F02D 29/02* (2013.01); *F02D 41/021* (2013.01);
(Continued)

(58) Field of Classification Search
CPC ........ F02D 11/10; F02D 41/2422; F02D 41/40; F02D 41/2416; F02D 41/04;
(Continued)

(56) References Cited

U.S. PATENT DOCUMENTS 3,576,140 A * 4/1971 Garman ............... B60K 26/021
74/516
4,691,677 A 9/1987 Hotate et al.
(Continued)

FOREIGN PATENT DOCUMENTS

JP 60-027744 A 2/1985
JP 61-171843 A 8/1986
(Continued)

OTHER PUBLICATIONS

International Search Report issued in PCT/JP2013/057187 dated Jun. 18, 2013 (8 pages).
Written Opinion of the International Searching Authority issued in PCT/JP2013/057187 dated Jun. 18, 2013 (7 pages).
International Preliminary Report on Patentability from PCT/JP2013/057187 dated Oct. 18, 2013 (19 pages).

*Primary Examiner* — David Hamaoui
(74) *Attorney, Agent, or Firm* — Osha Liang LLP

(57) ABSTRACT

An output control device includes a vehicle speed detection unit configured to detect a vehicle speed, an accelerator pedal opening detection unit configured to detect an accelerator pedal opening, a basic correction amount calculation unit and a first basic throttle opening calculation unit. The basic correction amount calculation unit calculates a basic correction amount, which increases with an increase in the vehicle speed. The first basic throttle opening calculation unit calculates a basic throttle opening based on the basic correction amount and the values of two virtual throttle openings.

6 Claims, 42 Drawing Sheets

(51) Int. Cl.
*F02D 41/04* (2006.01)
*F02D 41/02* (2006.01)
*F02D 41/24* (2006.01)
*F02D 41/40* (2006.01)
*F02D 41/00* (2006.01)
*F02M 26/15* (2016.01)
*F02M 26/23* (2016.01)
*F02M 26/54* (2016.01)

(52) U.S. Cl.
CPC ......... *F02D 41/04* (2013.01); *F02D 41/2416* (2013.01); *F02D 41/2422* (2013.01); *F02D 41/40* (2013.01); F02D 41/0002 (2013.01); F02D 2200/501 (2013.01); F02D 2200/602 (2013.01); F02D 2200/702 (2013.01); F02D 2250/18 (2013.01); *F02M 26/15* (2016.02); *F02M 26/23* (2016.02); *F02M 26/54* (2016.02); *Y02T 10/44* (2013.01)

(58) Field of Classification Search
CPC ...... F02D 41/021; F02D 29/02; F02D 11/105; F02D 2250/18; F02D 2200/702; F02D 41/0002; F02D 2200/602; F02D 2200/501; F02M 26/15; F02M 26/23; F02M 26/54; Y02T 10/44
See application file for complete search history.

(56) References Cited

U.S. PATENT DOCUMENTS

| | | | | |
|---|---|---|---|---|
| 5,383,431 A | * | 1/1995 | Nishimura | F02D 11/105 123/399 |
| 5,501,193 A | * | 3/1996 | Schneider | F02D 11/106 123/339.14 |
| 6,078,860 A | * | 6/2000 | Kerns | B60K 31/042 123/399 |
| 6,482,122 B2 | * | 11/2002 | Ochiai | B60K 31/0008 477/108 |
| 7,016,803 B2 | * | 3/2006 | Kitazawa | B60K 31/047 123/349 |

FOREIGN PATENT DOCUMENTS

| | | |
|---|---|---|
| JP | 1-113538 A | 5/1989 |
| JP | 9-4482 A | 1/1997 |
| JP | 09-242579 A | 9/1997 |
| JP | 11-011182 A | 1/1999 |
| JP | 2009-215925 A | 9/2009 |
| JP | 2011-099376 A | 5/2011 |
| JP | 2011-163125 A | 8/2011 |

* cited by examiner

OUTPUT CONTROL DEVICE FOR VEHICLE

CROSS-REFERENCE TO RELATED APPLICATIONS

This application is a National Stage application of International Patent Application No. PCT/JP2013/057187, filed on Mar. 14, 2013, which claims priority to Japanese Patent Application No. 2012-058478, filed on Mar. 15, 2012. Both Japanese Patent Application No. 2012-058478 and International Patent Application No. PCT/JP2013/057187 are hereby incorporated by reference in their entirety.

TECHNICAL FIELD

This invention relates to an output control device for vehicle.

BACKGROUND ART

In JP9-242579A, a correlation between an accelerator pedal opening and a throttle opening is changed based on a road surface gradient.

SUMMARY OF INVENTION

So-called steady running in which a vehicle runs with a constant speed targeted by avoiding acceleration is preferable to improve fuel economy of a vehicle. In this case, it is known that how to depress an accelerator pedal differs from driver to driver and fuel economy differs due to a difference in how each driver depresses the accelerator pedal even if the vehicle is steadily driven.

Accordingly, fuel economy can be further improved during steady running if an output control device can be devised which enables anyone to subtly operate a throttle opening regardless of who is driving at the time of steady running.

However, the case of steady running is not described at all in the technique of JP9-242579A.

Accordingly, the present invention aims to provide a device enabling anyone to subtly operate a throttle opening at the time of steady running.

An output control device for a vehicle of the present invention is premised on an output control device for a vehicle provided with a gasoline engine including a throttle valve capable of adjusting an intake air amount into the engine and a throttle actuator for driving the throttle valve according to a control amount and configured to specify a first opening characteristic, which is a correlation between an accelerator pedal opening and a throttle opening, as a relationship of an increasing function. In the output control device for the vehicle of the present invention, a constant-speed opening characteristic is further specified which is a characteristic of making a throttle opening change in relation to an accelerator pedal opening change smaller as compared with the first opening characteristic in a predetermined accelerator pedal opening range on a side having a larger accelerator pedal opening than at a predetermined point on the first opening characteristic corresponding to the magnitude of a throttle opening necessary for constant speed running of the vehicle as a base point, and the throttle actuator is controlled based on the constant-speed opening characteristic during steady running in which a constant speed is targeted.

Embodiments and advantages of the present invention are described in detail below with reference to the accompanying drawings.

DESCRIPTION OF EMBODIMENTS

Hereinafter, embodiments of the present invention are described based on the drawings.

First Embodiment

Figure 1:
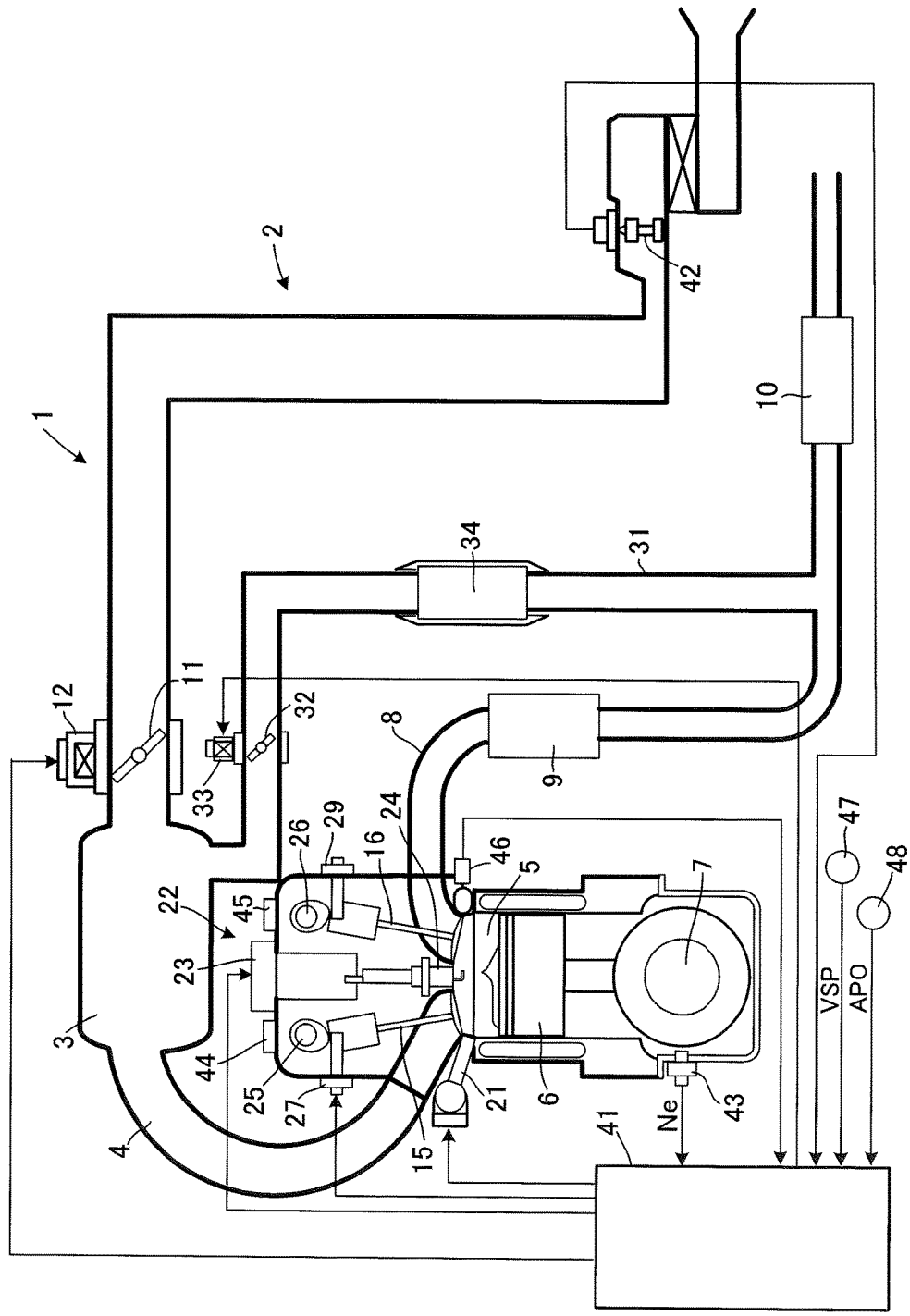
FIG. 1 is a schematic configuration diagram of an output control device of a gasoline engine vehicle according to a first embodiment of the present invention.

FIG. 1 is a schematic configuration diagram of an output control device of a vehicle provided with a gasoline engine according to a first embodiment of the present invention. In FIG. 1, a throttle valve 11 is provided in an intake passage 2. The throttle valve 11 is driven by a throttle motor 12 (throttle actuator) which receives a signal from an engine controller 41 (throttle actuator control means). The amount of air is measured by the throttle valve 11 and introduced into a combustion chamber 5 of each cylinder via an intake manifold 4 after being stored in an intake air collector 3 of the intake passage 2. Fuel is injected and supplied by a fuel injector 21 arranged to directly face the combustion chamber 5 of each cylinder. The fuel injected into the combustion chamber 5 is mixed with the air to produce gas (air-fuel mixture) while being evaporated. This air-fuel mixture is enclosed in the combustion chamber 5 by closing an intake valve 15 and compressed by an upward movement of a piston 6.

An ignition device 22 of an electronic distribution system in which an ignition coil with a built-in power transistor is arranged in each cylinder is provided to ignite this compressed air-fuel mixture by high pressure spark. Specifically, the ignition device 22 is composed of the ignition coils, the power transistors (not shown) and ignition plugs 24. The ignition coil 23 stores electric energy from a battery and the power transistor applies and cuts off power application to a primary side of the ignition coil 23. The ignition plug 24 provided on the ceiling of the combustion chamber 5 discharges sparks upon receiving a high voltage generated on a secondary side of the ignition coil 23 by cutting off a primary current of the ignition coil 23.

When sparks are discharged by the ignition plug 24 and the compressed air-fuel mixture is ignited slightly before a compression top dead center, flame spreads, eventually causing explosive combustion, and a gas pressure by this combustion performs a task of pushing down the piston 6. This task is taken out as a rotational force of a crankshaft 7. Gas (exhaust air) after the combustion is discharged to an exhaust passage 8 when an exhaust valve 16 is opened.

Three-way catalysts 9, 10 are provided in the exhaust passage 8. The three-way catalysts 9, 10 can simultaneously and efficiently remove three toxic components of HC, CO and NOx contained in exhaust air when an air-fuel ratio of the exhaust air is in a narrow range centered on a theoretical air-fuel ratio.

The air-fuel ratio is a ratio of an intake air amount and a fuel amount. In the engine controller 41, a fuel injection pulse width Ti [ms] is so calculated that a ratio of the intake air amount introduced into the combustion chamber 5 per cycle of an engine and the fuel injection amount from the fuel injector 21 becomes the theoretical air-fuel ratio. At a predetermined fuel injection timing, the fuel injector 21 is opened to directly inject and supply the fuel into the combustion chamber 5 for a period corresponding to this fuel injection pulse width Ti. It should be noted that a basic injection pulse width Tp [ms] is calculated based on a signal indicating the intake air amount from an air flow meter 42 and a signal from a crank angle sensor (43, 44). The above fuel injection pulse width Ti is determined by correcting this basic injection pulse width Tp, for example, by a signal from a water temperature sensor 46.

The intake valve 15 and the exhaust valve 16 are driven to be opened and closed by movements of cams respectively provided in an intake-side cam shaft 25 and an exhaust-side cam shaft 26 using the crankshaft 7 as a power source.

A variable valve timing mechanism (hereinafter, referred to as a "VTC mechanism") 27 for advancing and retarding opening and closing timings (opening timing and closing timing) of the intake valve 15 by continuously variably controlling a rotational phase difference between the crankshaft 7 and the intake-side cam shaft 25 is provided on the side of the intake valve 15. Further, a cam angle sensor 44 for detecting the rotational position of the intake-side cam shaft 25 is also provided on the other end of the intake-side cam shaft 25.

On the other hand, a variable valve timing mechanism (hereinafter, referred to as a "VTC mechanism") 29 for advancing and retarding opening and closing timings (opening timing and closing timing) of the exhaust valve 16 by continuously variably controlling a rotational phase difference between the crankshaft 7 and the exhaust-side cam shaft 26 is provided also on the side of the exhaust valve 16. Further, a cam angle sensor 45 for detecting the rotational position of the exhaust-side cam shaft 26 is also provided on the other end of the exhaust-side cam shaft 26.

An EGR passage 31 for flowing a part of the exhaust air back to the intake passage 2 is open on the intake air collector 3. An EGR valve 32 capable of measuring the amount of EGR gas is provided upstream of an opening end of the intake air collector 3 in this EGR passage 31. The EGR valve 32 is driven by a motor 33 (EGR valve actuator) which receives a signal from the engine controller 41. An EGR gas cooler 34 for cooling the EGR gas is provided upstream of the EGR valve 32. It should be noted that the actuator is not limited to the motor 33 and may be an actuator using a negative pressure (pressure lower than an atmospheric pressure).

Figure 2:
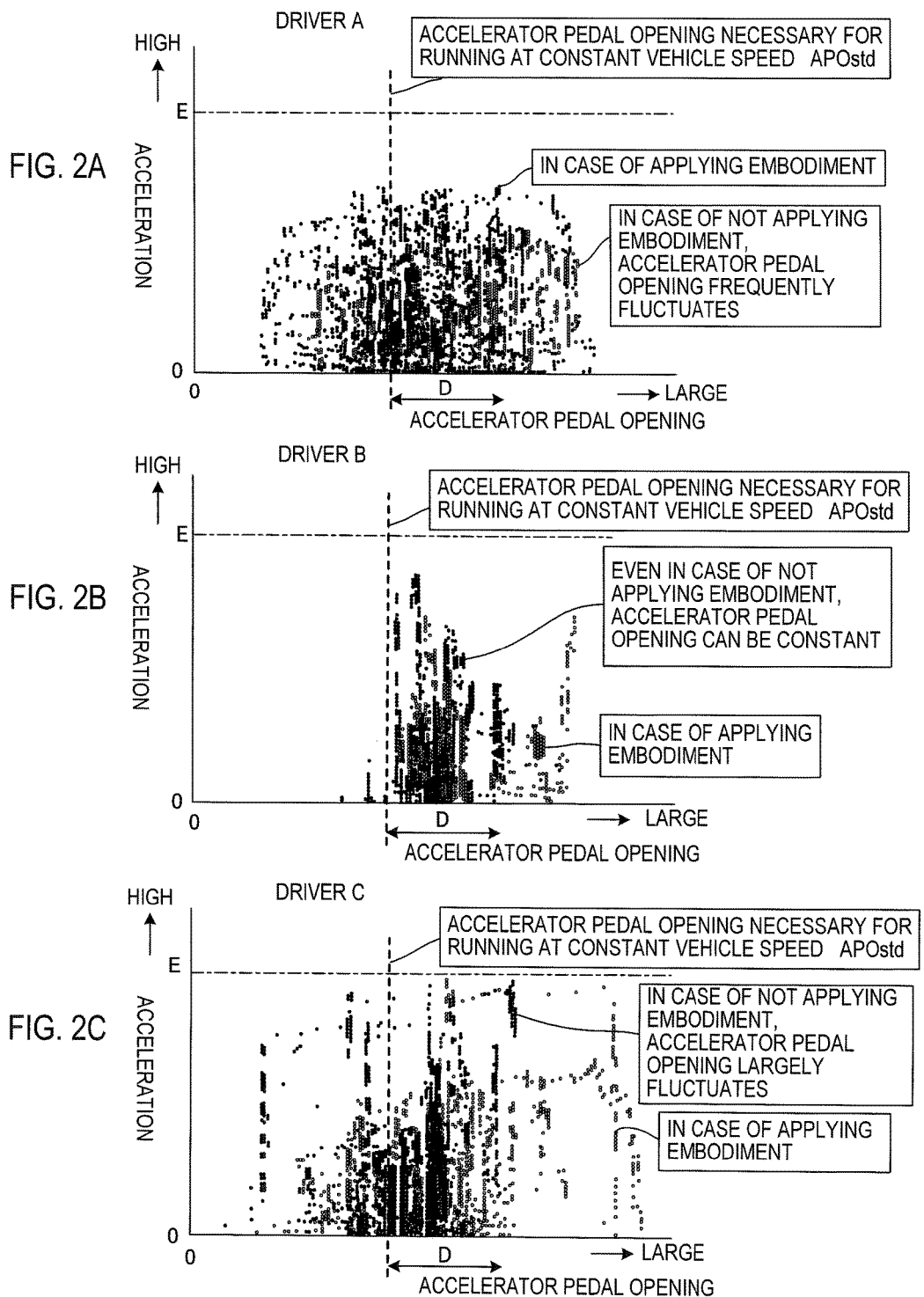
FIG. 2A shows experiment data on acceleration in relation to accelerator pedal opening (driver A)
FIG. 2B shows experiment data on acceleration in relation to accelerator pedal opening (driver B)
FIG. 2C shows experiment data on acceleration in relation to accelerator pedal opening (driver C)

It is known that how to depress an accelerator pedal differs from driver to driver and fuel economy differs due to a difference in how each driver depresses the accelerator pedal even if the vehicle is steadily driven to target a constant speed by avoiding acceleration. Accordingly, three drivers were let to drive a predetermined distance while targeting a constant speed on a flat road and operation points determined by an accelerator pedal opening (i.e. depressed amount of an accelerator pedal or operated amount of the accelerator pedal) and a vehicle acceleration during running were recorded. FIG. 2 show experiment data at that time. Specifically, FIG. 2 are obtained by plotting all data on a graph with a horizontal axis representing the accelerator pedal opening and a vertical axis representing vehicle acceleration for each of the three drivers. Data when the present embodiment is not applied is shown by a white circle and data when present embodiment is not applied is shown by a black circle. FIG. 2A corresponds to the driver A, FIG. 2B corresponds to the driver B and FIG. 2C corresponds to the driver C.

In FIG. 2, points of data (see black circles) laterally largely vary with a broken line as a center in FIGS. 2A and 2C when the broken line represents an accelerator pedal opening APOstd corresponding to a throttle opening necessary for running at a constant speed. However, how the points vary differ. The acceleration does not vary very much and, mainly, the accelerator pedal opening varies in FIG. 2A, whereas the acceleration varies more than the accelerator pedal opening in FIG. 2C. This indicates that the accelerator pedal opening frequently fluctuates because the accelerator pedal is excessively depressed to achieve the accelerator pedal opening larger than the accelerator pedal opening APOstd and insufficiently depressed to achieve the accelerator pedal opening smaller than APOstd in the case of the driver A. Further, it is presumed that the accelerator pedal opening largely fluctuates and the vehicle speed may largely change due to the variation of the acceleration in the case of the driver C. On the other hand, the points of data are concentrated substantially as a mass near APOstd in the case of the driver B. This indicates that the driver B can operate to have the constant accelerator pedal opening.

When the experiment data obtained in this way were analyzed, the present inventors found out for the first time that the driver B adjusted the accelerator pedal opening for a vehicle speed adjustment in a predetermined accelerator pedal opening range D (e.g. 6 to 12 deg) on a side larger than the accelerator pedal opening APOstd corresponding to the throttle opening necessary for running at a constant speed. That means that it is desirable to control a gradient of the throttle opening corresponding to an accelerator pedal operation amount (throttle opening) in a predetermined opening range on the side larger than the accelerator pedal opening APOstd corresponding to the throttle opening necessary for running at a constant speed and generate a characteristic of a drive force in which the vehicle speed is easily adjusted. Then, it becomes easy to suppress a variation of the vehicle speed caused by a fluctuation of the accelerator pedal opening and drive at a constant speed without depending on a driver's driving skill.

Further, the present inventors found out for the first time that an acceleration a driver feels necessary for steady running is at most a predetermined value E. That means that an accelerator pedal opening range for obtaining the acceleration of the predetermined value E, i.e. an accelerator pedal opening range F used during steady running is determined. Thus, it is sufficient to determine a characteristic of throttle opening in relation to accelerator pedal opening in this range F.

Figure 3:
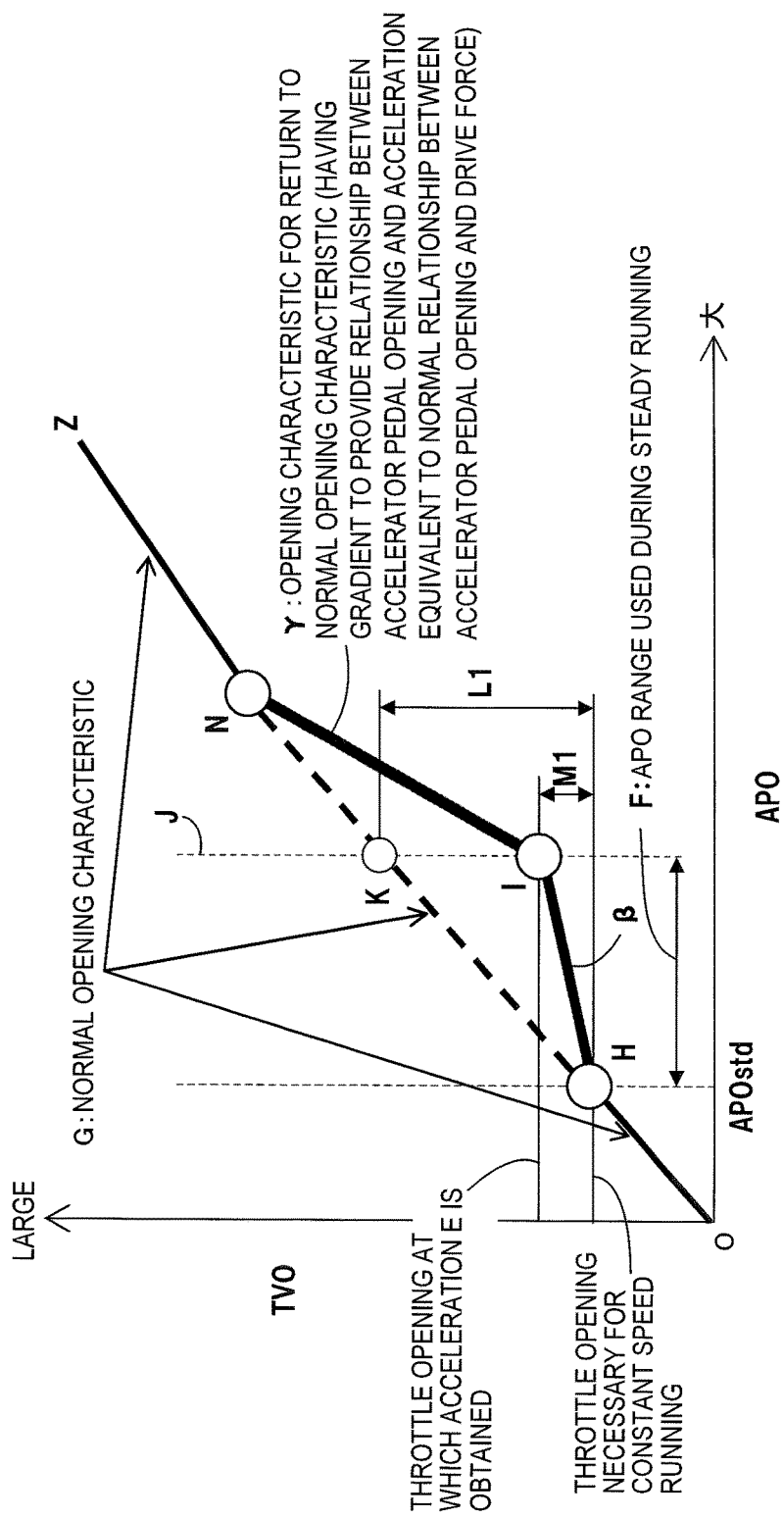
FIG. 3 is a characteristic diagram of throttle opening in relation to accelerator pedal opening according to the first embodiment.

An opening characteristic for embodying such an idea is shown in FIG. 3, wherein a horizontal axis represents the accelerator pedal opening APO and a vertical axis represents the throttle opening TVO. In FIG. 3, a polygonal line G approximate to a straight line which passes through an origin O, becomes an increasing function and reaches a point Z is a characteristic representing a normal relationship between the accelerator pedal opening and the throttle opening. In the present embodiment, this characteristic is referred to as a "normal opening characteristic" below. It should be noted that the normal opening characteristic is not limited to a polygonal line approximate to a straight line and may be a straight line. Each point on the normal opening characteristic (first opening characteristic or first monotonous increasing function) G is equivalent to an operation point when running load resistance (road load) is given.

In the present embodiment, a period until the accelerator pedal is released after the accelerator pedal depressed amount (accelerator pedal opening) becomes equal to or larger than a predetermined value and an accelerator pedal depressing speed becomes equal to or faster than a predetermined value is judged to be an accelerated running period and periods other than that are judged to be steady running periods. An operation when the steady running period is judged is described below.

Now, considering a predetermined point H on the normal opening characteristic G, the throttle opening at the point H is assumed to be the throttle opening necessary for running at a constant speed. In which vehicle speed range the vehicle runs at a constant speed is determined in advance and a minimum vehicle speed in the thus determined constant speed running range is a "constant speed" mentioned here and, for example, a value such as 30 km/h or 40 km/h. Since the throttle opening necessary for constant speed running at the minimum vehicle speed is the throttle opening at the point H, the point H moves upward along the normal opening characteristic if the targeted vehicle speed during steady running increases. This case is handled with reference to FIG. 4 to be described later.

If an operation point I when the above acceleration E is obtained in the predetermined accelerator pedal opening range F on the side larger than the point H (in the embodiment below, the accelerator pedal opening at the point H is denoted by APOstd) as a base point is written on the characteristic of FIG. 3, the point I should be on a vertical line J of the accelerator pedal opening APO moved to the right from the point H by the accelerator pedal opening range F used during steady running. In this case, if K denotes an intersection of the normal opening characteristic G and the vertical line J, a point located on the vertical line J below the point K and higher than the point H on the right side (at the right upper side) is selected as the point I. A gradient of a line segment H-I is set smaller than that of a line segment H-K and exceeds 0.

In this way, an opening characteristic β (second opening characteristic or second monotonous increasing function) from the point H to the point I is determined. When the accelerator pedal opening is increased from the point H by the same amount F, the throttle opening is increased by L1 in the case of the normal opening characteristic G, whereas the throttle opening is increased by M1, which is smaller than L1, according to the opening characteristic β of the present embodiment. This means that the opening characteristic β of the present embodiment can more subtly adjust the throttle opening than the normal opening characteristic G in driving. This facilitates the adjustment of the accelerator pedal opening for constant speed running. Conversely speaking, since a change of the throttle opening is larger in the case of the normal opening characteristic G than in the case of the opening characteristic β of the present embodiment, the adjustment of the accelerator pedal opening for constant speed running has been difficult.

Next, an opening characteristic γ for a return from the point I to the normal opening characteristic G at a point N (third opening characteristic or third monotonous increasing function) is determined in the present embodiment. A gradient of a line segment I-N is set to obtain a relationship of the accelerator pedal opening and the acceleration equivalent to a relationship of the accelerator pedal opening and the drive force obtained by the normal opening characteristic G. That is, a constant-speed opening characteristic α composed of the opening characteristics β and γ is newly set in the present embodiment. As a result, in the present embodiment, the throttle motor 12 is controlled during constant speed running at the minimum vehicle speed in the constant speed running range using the constant-speed opening characteristic α and the normal opening characteristic G from the point 0 to point H and from point N to the point Z. To summarize, the throttle opening moves along the points O-H-I-N-Z. Such a throttle opening characteristic is referred to as an "opening characteristic of the present embodiment" below.

Figure 4:
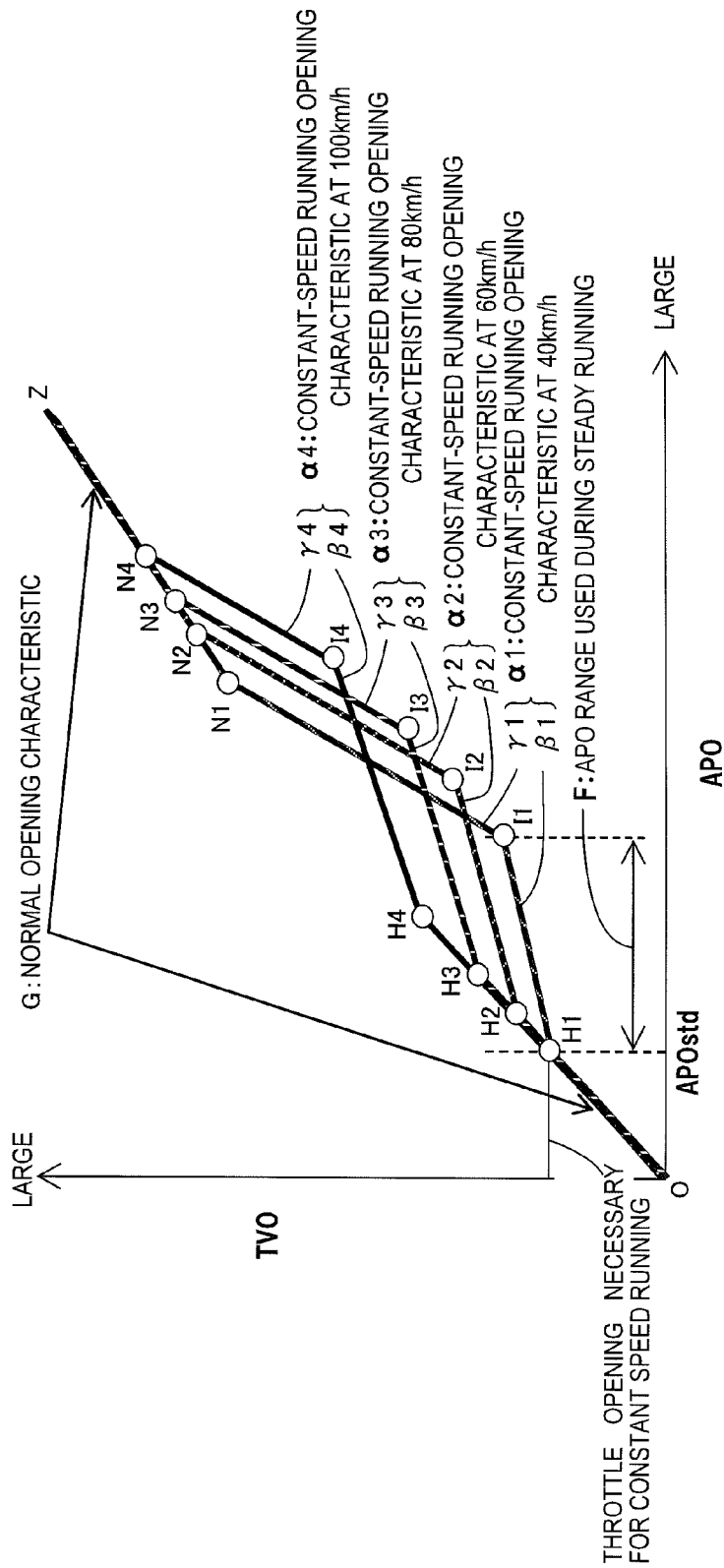
FIG. 4 is an opening characteristic diagram according to the first embodiment at each vehicle speed.

FIG. 4 is a characteristic diagram showing the opening characteristic of the present embodiment at each vehicle speed in a superimposed manner during running on a flat road. In FIG. 4, 40 km/h is set as the minimum vehicle speed in the constant speed running range and there are three typical vehicle speeds of 60 km/h, 80 km/h and 100 m/h. As shown in FIG. 4, there are a plurality of constant-speed opening characteristics in which the point H is shifted to a larger side of the accelerator pedal opening APO and to a larger side of the throttle opening TVO on the normal opening characteristic G with an increase in the vehicle speed with a width of the accelerator pedal opening range F used during steady running kept constant.

The position of the accelerator pedal opening range F used during steady running is shifted to the larger side of the accelerator pedal opening and the throttle opening range corresponding to the range F is also shifted to the larger side of the throttle opening with an increase in the vehicle speed in the constant speed running range for the following reason. Specifically, this is because the throttle opening necessary for running at a constant speed is shifted to the larger side of the throttle opening with an increase in the vehicle speed.

Since each of the points H, I and N shown in FIG. 3 has a different value at each vehicle speed, a symbol is assigned to each point as follows. Specifically, the points H, I and N when the constant speed is 40 km/h are newly defined to be H1, I1 and N1. β1 denotes an opening characteristic from the point H1 to the point I1, γ1 denotes an opening characteristic from the point I1 to the point N1 and α1 denotes a constant-speed opening characteristic composed of β1, γ1. The points H, I and N when the constant speed is 60 km/h are newly defined to be H2, I2 and N2. β2 denotes an opening characteristic from the point H2 to the point I2, γ2 denotes an opening characteristic from the point I2 to the point N2 and α2 denotes a constant-speed opening characteristic composed of β2, γ2. The points H, I and N when the constant speed is 80 km/h are newly defined to be H3, I3 and N3. β3 denotes an opening characteristic from the point H3 to the point I3, γ3 denotes an opening characteristic from the point I3 to the point N3 and α3 denotes a constant-speed opening characteristic composed of β3, γ3. The points H, I and N when the constant speed is 100 km/h are newly defined to be H4, I4 and N4. β4 denotes an opening characteristic from the point H4 to the point I4, γ4 denotes an opening characteristic from the point I4 to the point N4 and α4 denotes a constant-speed opening characteristic composed of β4, γ4.

If there are a plurality of constant-speed opening characteristics (α1 to α4) as just described, the throttle motor 12 is controlled as follows. Specifically, the constant-speed opening characteristic corresponding to the vehicle speed detected by a vehicle speed sensor 47 (vehicle speed detecting means) is selected from the plurality of constant-speed opening characteristics, and the throttle motor 12 is controlled during running in which the detected vehicle speed is set as the constant speed, using the selected constant-speed opening characteristic and the normal opening characteristic G. For example, at the time of constant speed running at a vehicle speed of 60 km/h, the throttle motor 12 is controlled using the constant-speed opening characteristic α2 and the normal opening characteristic G from the point 0 to the point H2 and from the point N2 to the point Z. Similarly, at the time of constant speed running at a vehicle speed of 80 km/h, the throttle motor 12 is controlled using the constant-speed opening characteristic α3 and the normal opening characteristic G from the point 0 to the point H3 and from the point N3 to the point Z.

However, if the plurality of constant-speed opening characteristics (α1 to α4) are prepared, a memory capacity becomes large. Accordingly, as shown in FIG. 4, the constant-speed opening characteristics (α2 to α4) are prepared only for three typical vehicle speeds (60 km/h, 80 km/h, 100 km/h). At a vehicle speed deviating from the typical vehicle speeds, throttle openings are calculated using the constant-speed opening characteristics corresponding to two typical vehicle speeds adjacent to that vehicle speed. Subsequently, interpolation calculation is carried out for the calculated two throttle openings. Thus, an optimal throttle opening can be obtained even at the vehicle speed deviating from the typical vehicle speeds.

For example, if the detected vehicle speed is 65 km/h and the accelerator pedal opening is in the accelerator pedal opening range F used during steady running, two typical vehicle speeds adjacent to 65 km/h are 60 km/h and 80 km/h. Accordingly, the throttle openings corresponding to the accelerator pedal opening at that time are calculated using the constant-speed opening characteristics $\alpha 2$, $\alpha 3$. If the throttle openings at this time are respectively $\delta$, $\epsilon$ ($\delta < \epsilon$), a throttle opening at the time of constant speed running at 65 km/h can be obtained by the following interpolation calculation equation.

$$\xi = (\epsilon - \delta) \times ((65-60)/(80-60)) + \delta \quad (1)$$

However, even if the constant-speed opening characteristics ($\alpha 2$ to $\alpha 4$) are prepared only for the typical vehicle speeds in addition to the minimum vehicle speed in the constant speed running range, the memory capacity increases according to the number of the typical vehicle speeds.

Accordingly, the present inventors considered whether or not it was possible to express a characteristic of throttle opening in relation to accelerator pedal opening by one table even if the vehicle speed differed, and succeeded in expressing the characteristic of throttle opening in relation to accelerator pedal opening by one table using the following mathematical technique. This is described with reference to FIGS. 5A, 5B and 6.

Figure 5A:
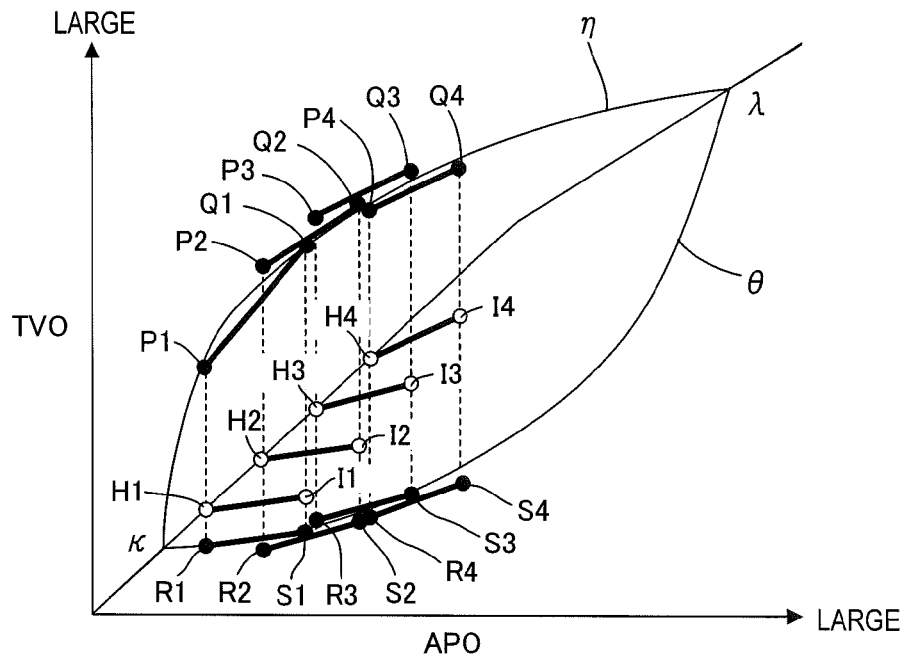
FIG. 5A is a characteristic diagram showing the generation of an upper virtual curve and a lower virtual curve.

FIG. 5A shows line segments H1-I1, H2-I2, H3-I3 and H4-I4 shown in FIG. 4.

Attention is focused on the line segment H1-I1. It is considered to obtain the point H1 of this line segment by a linear interpolation calculation equation. Virtual points P1, R1 are defined on a vertical line passing through the point H1. At this time, the point H1 can be obtained by the following equation for interpolating between the points P1 and R1 using a correction amount 1.

$$H1 = (P1-R1) \times (\text{correction amount } 1)/100 + R1 \quad (2)$$

Here, the correction amount 1 [%] in the equation (2) is a value defined by the following equation.

$$\text{Correction amount } 1 = (H1-R1)/(P1-R1) \times 100 \quad (3)$$

Subsequently, it is considered to obtain the point I1 by a linear interpolation calculation equation. Virtual points Q1, S1 are defined on a vertical line passing through the point I1. At this time, the point I1 can be obtained by the following equation for interpolating between the points Q1 and S1 using a correction amount 2.

$$I1 = (Q1-S1) \times (\text{correction amount } 2)/100 + S1 \quad (4)$$

Here, the correction amount 2 [%] in the equation (4) is a value defined by the following equation.

$$\text{Correction amount } 2 = (I1-S1)/(Q1-S1) \times 100 \quad (5)$$

Subsequently, the points P1, Q1 and the points R1, S1 are connected. Then, it is found that an arbitrary point on the line segment connecting the points H1 and I1 can be obtained by a linear interpolation equation if a line segment connecting the points P1, Q1, a line segment connecting the points R1, S1 and the correction amounts are used.

Next, attention is focused on the line segment H2-I2. The operation is similar to that for the line segment H1-I1. It is considered to obtain the point H2 by a linear interpolation calculation equation. If virtual points P2, R2 are defined on a vertical line passing through the point H2, the point H2 can be obtained by the following equation for interpolating between the points P2 and R2 using a correction amount 3.

$$H2 = (P2-R2) \times (\text{correction amount } 3)/100 + R2 \quad (6)$$

Here, the correction amount 3 [%] in the equation (6) is a value defined by the following equation.

$$\text{Correction amount } 3 = (H2-R2)/(P2-R2) \times 100 \quad (7)$$

Subsequently, it is considered to obtain the point I2 by a linear interpolation calculation equation. If virtual points Q2, S2 are defined on a vertical line passing through the point I2, the point I2 can be obtained by the following equation for interpolating between the points Q2 and S2 using a correction amount 4.

$$I2 = (Q2-S2) \times (\text{correction amount } 4)/100 + S2 \quad (8)$$

Here, the correction amount 4 [%] in the equation (8) is a value defined by the following equation.

$$\text{Correction amount } 4 = (I2-S2)/(Q2-S2) \times 100 \quad (9)$$

Subsequently, the points P2, Q2 and the points R2, S2 are connected. Then, it is found that an arbitrary point on the line segment connecting the points H2 and I2 can be obtained by a linear interpolation equation if a line segment connecting the points P2, Q2, a line segment connecting the points R2, S2 and the correction amounts are used.

In this case, since any of the points P1, Q1, P2 and Q2 is a virtual point, these points are smoothly connected to obtain an upwardly convex curve (upper virtual curve) $\eta$ as a whole as shown in FIG. 5A. Similarly, since any of the points R1, S1, R2 and S2 is a virtual point, these points are smoothly connected to obtain a downwardly convex curve (lower virtual curve) $\theta$ as a whole as shown in FIG. 5A.

Thereafter, the line segments H3-I3, H4-I4 are similarly considered and an upwardly convex curve and a downwardly convex curve are generated.

Figure 5B:
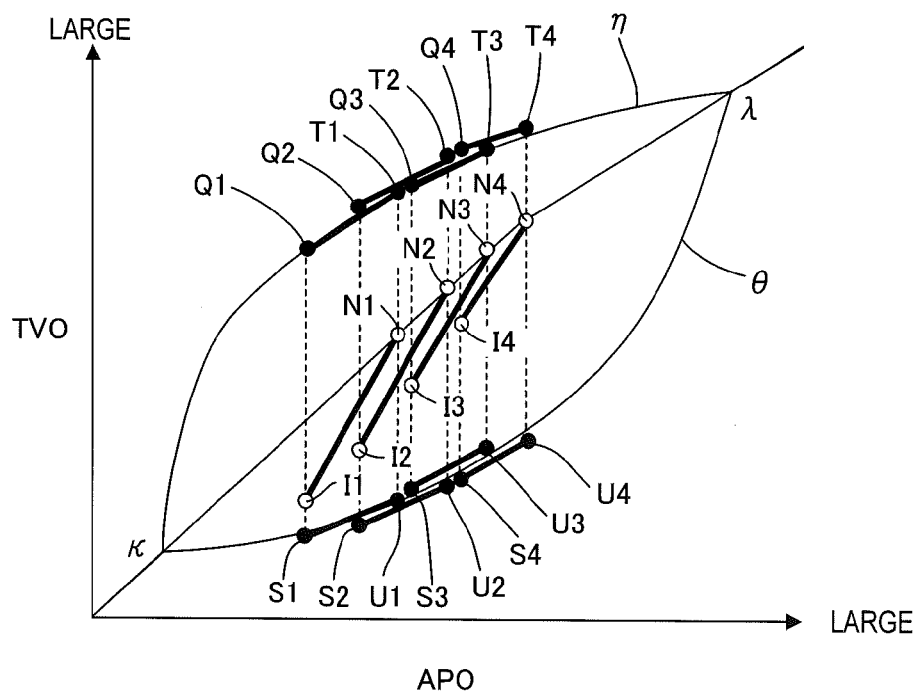
FIG. 5B is a characteristic diagram showing the generation of the upper and lower virtual curves.

FIG. 5B shows line segments I1-N1, I2-N2, I3-N3 and I4-N4 shown in FIG. 4.

Attention is focused on the line segment I1-N1. It is considered to obtain the point I1 of this line segment by a linear interpolation calculation equation. Virtual points Q1, S1 are defined on a vertical line passing through the point I1. At this time, the point I1 is already obtained by the above equation (4).

Subsequently, it is considered to obtain the point N1 by a linear interpolation calculation equation. If virtual points T1, U1 are defined on a vertical line passing through the point N1, the point N1 can be obtained by the following equation for interpolating between the points T1 and U1 using a correction amount 5.

$$N1 = (T1-U1) \times (\text{correction amount } 5)/100 + U1 \quad (10)$$

Here, the correction amount 5 [%] in the equation (10) is a value defined by the following equation.

$$\text{Correction amount } 5 = (N1-U1)/(T1-U1) \times 100 \quad (11)$$

Subsequently, the points Q1, T1 and the points S1, U1 are connected. Then, it is found that an arbitrary point on the line segment connecting the points I1 and N1 can be obtained by a linear interpolation equation if a line segment connecting the points Q1, T1, a line segment connecting the points S1, U1 and the correction amounts are used.

Next, attention is focused on the line segment I1-N2. The operation is similar to that for the line segment I1-N1. If virtual points Q2, S2 are defined on a vertical line passing through the point I2, the point I2 is already obtained by the above equation (8).

Subsequently, it is considered to obtain the point N2 by a linear interpolation calculation equation. If virtual points T2, U2 are defined on a vertical line passing through the point N2, the point N2 can be obtained by the following equation for interpolating between the points T2 and U2 using a correction amount 6.

$$N2=(T2-U2)\times(\text{correction amount 6})/100+U2 \quad (12)$$

Here, the correction amount 6 [%] in the equation (12) is a value defined by the following equation.

$$\text{Correction amount } 4=(N2-U2)/(T2-U2)\times 100 \quad (13)$$

Subsequently, the points Q2, T2 and the points S2, U2 are connected. Then, it is found that an arbitrary point on the line segment connecting the points I2 and N2 can be obtained by a linear interpolation equation if a line segment connecting the points Q2, T2, a line segment connecting the points S2, U2 and the correction amounts are used.

In this case, since any of the points Q1, T1, Q2 and T2 is a virtual point, these points are smoothly connected to obtain an upwardly convex curve (upper virtual curve) η as a whole as shown in FIG. 5B. Similarly, since any of the points S1, U1, S2 and U2 is a virtual point, these points are smoothly connected to obtain a downwardly convex curve (lower virtual curve) as a whole as shown in FIG. 5B.

Thereafter, the line segments I3-N3, I4-N4 are similarly considered and an upwardly convex curve and a downwardly convex curve are generated.

Further, a normal opening characteristic part up to the point H1 and a normal opening characteristic part from the point N4 are also similarly considered so that an upwardly convex curve and a downwardly convex curve intersect with the normal opening characteristic at points κ, λ.

Figure 6:
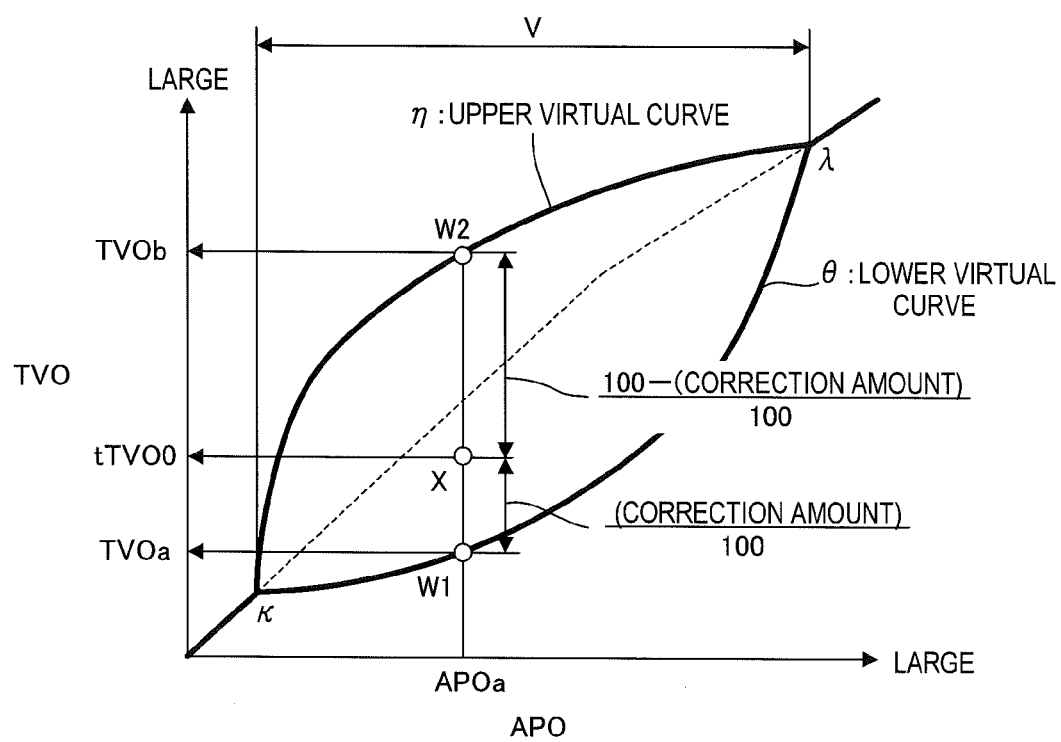
FIG. 6 is a characteristic diagram showing how to use the upper and lower virtual curves.

By way of such an operation, a characteristic including the upper virtual curve η and the lower virtual curve f and having the values of two virtual throttle openings for one accelerator pedal opening in a predetermined accelerator pedal opening range V is finally obtained as shown in FIG. 6. Further, the normal opening characteristic G is used in regions of the accelerator pedal opening up to the point κ and from the point λ (regions outside the predetermined accelerator pedal opening range V). These two opening characteristics constitute one leaf-like opening characteristic as a whole. As just described, the leaf-like opening characteristic that is a function between the accelerator pedal opening APO and the throttle opening TVO is composed of a closed curve function made up of the upper and lower virtual curve functions η, θ and at least one linear function connected to this closed curve function.

The throttle opening is calculated as follows using the opening characteristic having a leaf-like shape as a whole. For example, if the accelerator pedal opening is a predetermined value APOa [%] in the range V, a value TVOa [%] of a virtual throttle opening on the lower virtual curve θ and a value TVOb [%] of a virtual throttle opening on the upper virtual curve η are obtained from APOa using the leaf-like opening characteristic shown in FIG. 6. From these two values TVOa, TVOb of the virtual throttle openings, a basic throttle opening tTVO0 [%] is calculated by the following equation.

$$tTVO0=(TVOb-TVOa)\times\text{correction amount}/100+TVOa \quad (14)$$

The correction amount in the equation (14) is a value newly introduced since the leaf-like opening characteristic shown in FIG. 6 is created. If it is now assumed that W1 denotes a point where a vertical line of APOa intersects with the lower virtual curve, W2 denotes a point where the vertical line intersects with the upper virtual curve and X denotes a point at which a line segment W1-W2 is divided by the correction amount, a line segment X-W1 corresponds to the correction amount/100 and a line segment W2-X corresponds to (100-correction amount)/100. The correction amount is a value of 0 [%] correction amount 100 [%]. From the equation (14), the basic throttle opening approaches the upper virtual curve, i.e. increases as the correction amount increases. Conversely, the basic throttle opening approaches the lower virtual curve, i.e. decreases as the correction amount decreases. Since the basic throttle opening needs to be increased with an increase in the vehicle speed from FIG. 4, the correction amount may basically set, using the vehicle speed as a parameter, so that the correction amount increases with an increase in the vehicle speed.

As just described, a table is necessary for each vehicle speed when the opening characteristic of the present embodiment shown in FIG. 4 is used as it is. However, only one opening characteristic is sufficient when the leaf-like opening characteristic shown in FIG. 6 is used. This enables the memory capacity to be drastically reduced.

Figure 7:
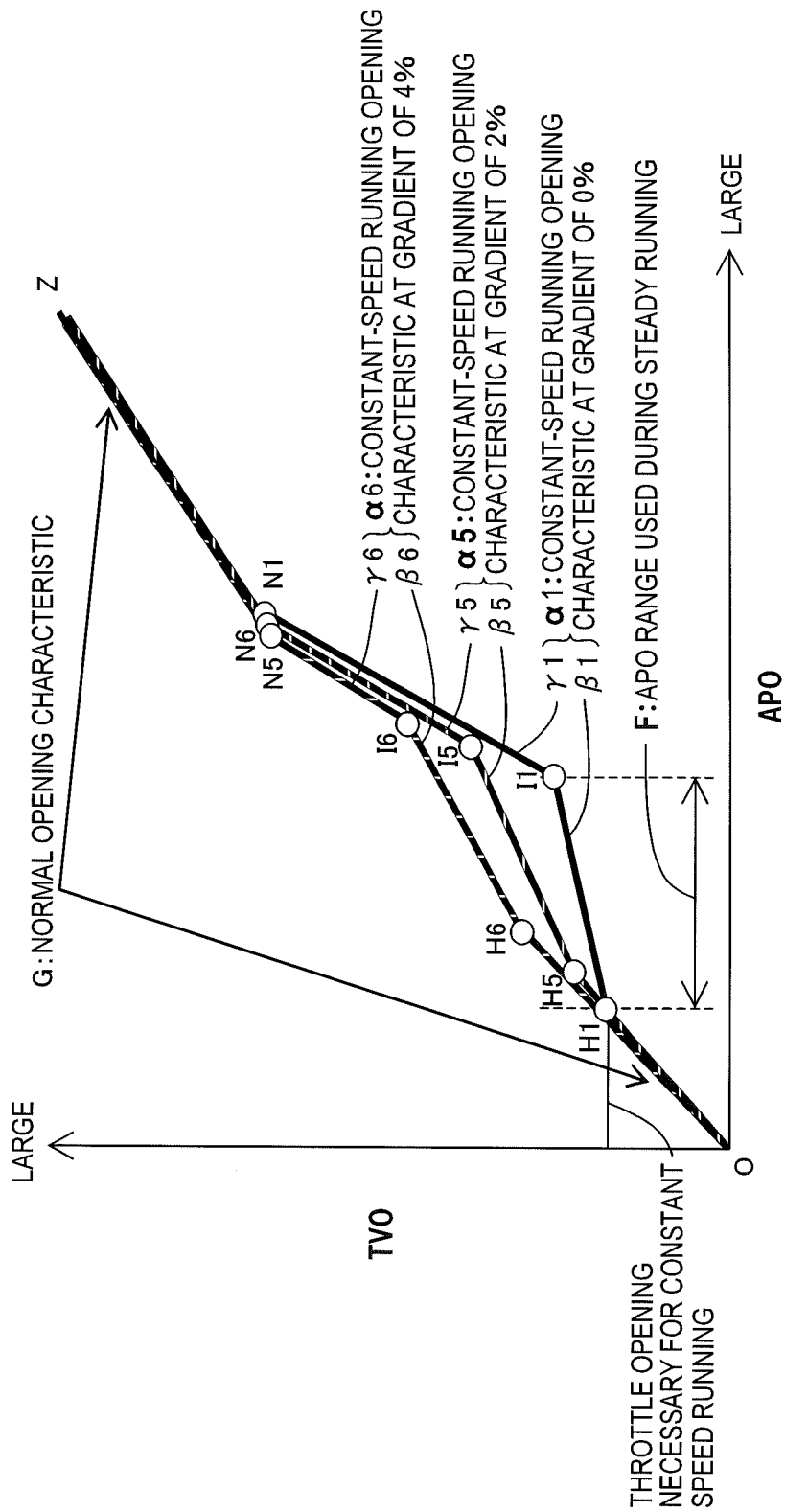
FIG. 7 is a characteristic diagram of throttle opening in relation to accelerator pedal opening at each road surface gradient during uphill running.

Next, FIG. 7 is a characteristic diagram showing the opening characteristic of the present embodiment at each road surface gradient during uphill running in a superimposed manner. In FIG. 7, a minimum road surface gradient is set at 0% and there are two typical road surface gradients of 2%, 4%. As shown in FIG. 7, there are a plurality of constant-speed opening characteristics in which the point H is shifted to the larger side of the accelerator pedal opening APO and to the larger side of the throttle opening TVO on the normal opening characteristic G with an increase in the road surface gradient with the width of the accelerator pedal opening range F used during steady running kept constant.

The position of the accelerator pedal opening range F used during steady running is shifted to the larger side of the accelerator pedal opening and the throttle opening range corresponding to the range F is also shifted to the larger side of the throttle opening with an increase in the road surface gradient during steady running for the following reason. Specifically, the throttle opening necessary to run at a constant speed is shifted to the larger side of the throttle opening with an increase in the road surface gradient.

Since each of the points H, I and N shown in FIG. 7 has a different value at each road surface gradient of the uphill road, a symbol is assigned to each point as follows. Specifically, the points H, I and N when the road surface gradient is 0% are newly defined to be H1, I1 and N1. β1 denotes an opening characteristic from the point H1 to the point I1, γ1 denotes an opening characteristic from the point I1 to the point N1 and α1 denotes a constant-speed opening characteristic composed of β1, γ1. The points H, I and N when the road surface gradient is 2% are newly defined to be H5, I5 and N5. β5 denotes an opening characteristic from the point H5 to the point I5, γ5 denotes an opening characteristic from the point I5 to the point N5 and α5 denotes a constant-speed opening characteristic composed of β5, γ5. The points H, I and N when the road surface gradient is 4% are newly defined to be H6, I6 and N6. β6 denotes an opening characteristic from the point H6 to the point I6, γ6 denotes an opening characteristic from the point I6 to the point N6 and α6 denotes a constant-speed opening characteristic composed of β6, γ6.

If there are a plurality of constant-speed opening characteristics (α1, α5, α6) as just described, the throttle motor 12 is controlled as follows. Specifically, the constant-speed opening characteristic corresponding to a road surface gradient of an uphill road is selected from the plurality of constant-speed opening characteristics, and the throttle motor 12 is controlled during steady running at the road surface gradient at that time using the selected constant-speed opening characteristic and the normal opening characteristic G. For example, at the time of steady running at a road surface gradient of 2%, the throttle motor 12 is controlled using the constant-speed opening characteristic α5 and the normal opening characteristic G from the point 0 to the point H5 and from the point N5 to the point Z. Similarly, at the time of steady running at a road surface gradient of 4%, the throttle motor 12 is controlled using the constant-speed opening characteristic α6 and the normal opening characteristic G from the point 0 to the point H6 and from the point N6 to the point Z. The road surface gradient of the above uphill road can be estimated based on a signal from a navigation system, for example, in a vehicle equipped with the navigation system.

Figure 8:
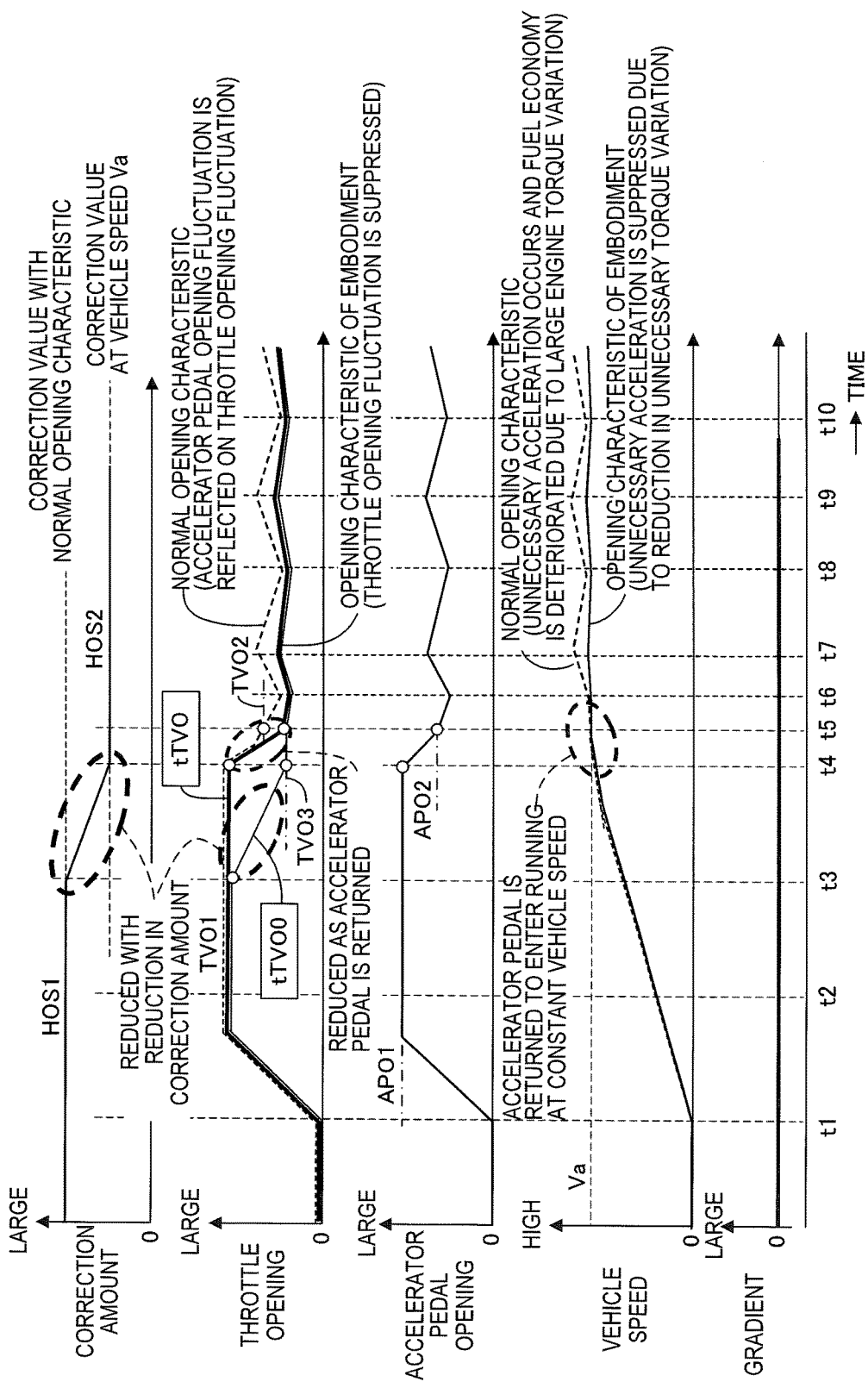
FIG. 8 is a timing chart showing changes in correction amount, accelerator pedal opening, throttle opening and vehicle speed at the time of steady running on a flat road.

Next, FIG. 8 is a timing chart showing how the correction amount, the accelerator pedal opening, the throttle opening and the vehicle speed change at the time of running at a constant speed Va on a flat road by a model. It should be noted that the throttle opening in the case of the normal opening characteristic shown by broken line and that in the case of the opening characteristic of the present embodiment shown by solid line are shown in a superimposed manner. In this case, parts difficult to see in superimposition are shown to be slightly vertically shifted.

Assuming that the constant speed Va is obtained when the accelerator pedal opening is increased to a predetermined value APO1 from timing t1 on and that increased state is kept until t4, the accelerator pedal opening is reduced to a predetermined value APO2 during a period from timing t4 to timing t5. The accelerator pedal opening is repeatedly slightly increased and slightly reduced to maintain the constant speed Va from timing t5 on (see $3^{rd}$ row of FIG. 8).

In response to such a behavior of the accelerator pedal opening, the throttle opening increases to a predetermined value TVO1 from timing t1 on, that increased state is kept until t4, and the throttle opening is reduced to a predetermined value TV2 for a period from timing t4 to timing t5 in the case of the normal opening characteristic. Then, the throttle opening is repeatedly slightly increased and slightly reduced from the predetermined value TVO2 from timing t5 on (see broken line in the $2^{nd}$ row of FIG. 8). As just described, a fluctuation of the accelerator pedal opening from timing t6 is directly reflected on that of the throttle opening in the case of the normal opening characteristic. Since an engine torque is substantially proportional to the throttle opening, the engine torque largely varies if the throttle opening fluctuates. Due to this variation of the engine torque, unnecessary acceleration from the constant speed Va occurs (see broken line in the $4^{th}$ row of FIG. 8) and fuel economy is deteriorated.

On the other hand, in the opening characteristic of the present embodiment, an entry is made into the accelerator pedal opening range F used during steady running at timing t3. That is, the correction amount deviates from a correction amount HOS1 in the normal opening characteristic and reduced to a correction amount HOS2 at the vehicle speed Va from timing t3 on (see $1^{st}$ row of FIG. 8). Then, the basic throttle opening tTVO0 calculated based on this correction amount HOS2 decreases and reaches a predetermined value TVO3 at timing t4. This predetermined value TVO3 is smaller than the above predetermined value TVO2. Then, the throttle opening is repeatedly slightly increased and slightly reduced from the predetermined value TVO3 from timing t5 on (see thin broken line in the $2^{nd}$ row of FIG. 8). In this case, a fluctuation width centered on the predetermined value TVO3 is smaller than that centered on the predetermined value TVO3 in the case of the normal opening characteristic by as much as the predetermined value TVO3 is smaller than the predetermined value TVO2. That the fluctuation width becomes smaller than in the case of the normal opening characteristic means that the variation of the engine torque also becomes smaller than in the case of the normal opening characteristic. By reducing the variation of the engine torque in this way, unnecessary acceleration from the constant speed Va is suppressed (see solid line in the $4^{th}$ row of FIG. 8) and fuel economy is improved by that much.

It should be noted that a driver does not change the accelerator pedal opening during a period from timing t3 to timing t4. If the actual throttle opening is, nevertheless, reduced with a reduction in the basic throttle opening tTVO0, the engine torque is reduced to give a sense of incongruity to the driver. Accordingly, a target throttle opening tTVO is introduced separately from the basic throttle opening tTVO0 and the actual throttle opening is controlled based on this target throttle opening (see thick solid line in the $2^{nd}$ row of FIG. 8). The target throttle opening tTVO is kept as it is without being reduced during the period from t3 to t4, reduced at a timing (t4) at which the accelerator pedal opening is reduced, and matched with the basic throttle opening tTVO0 at timing t5.

Figure 9:
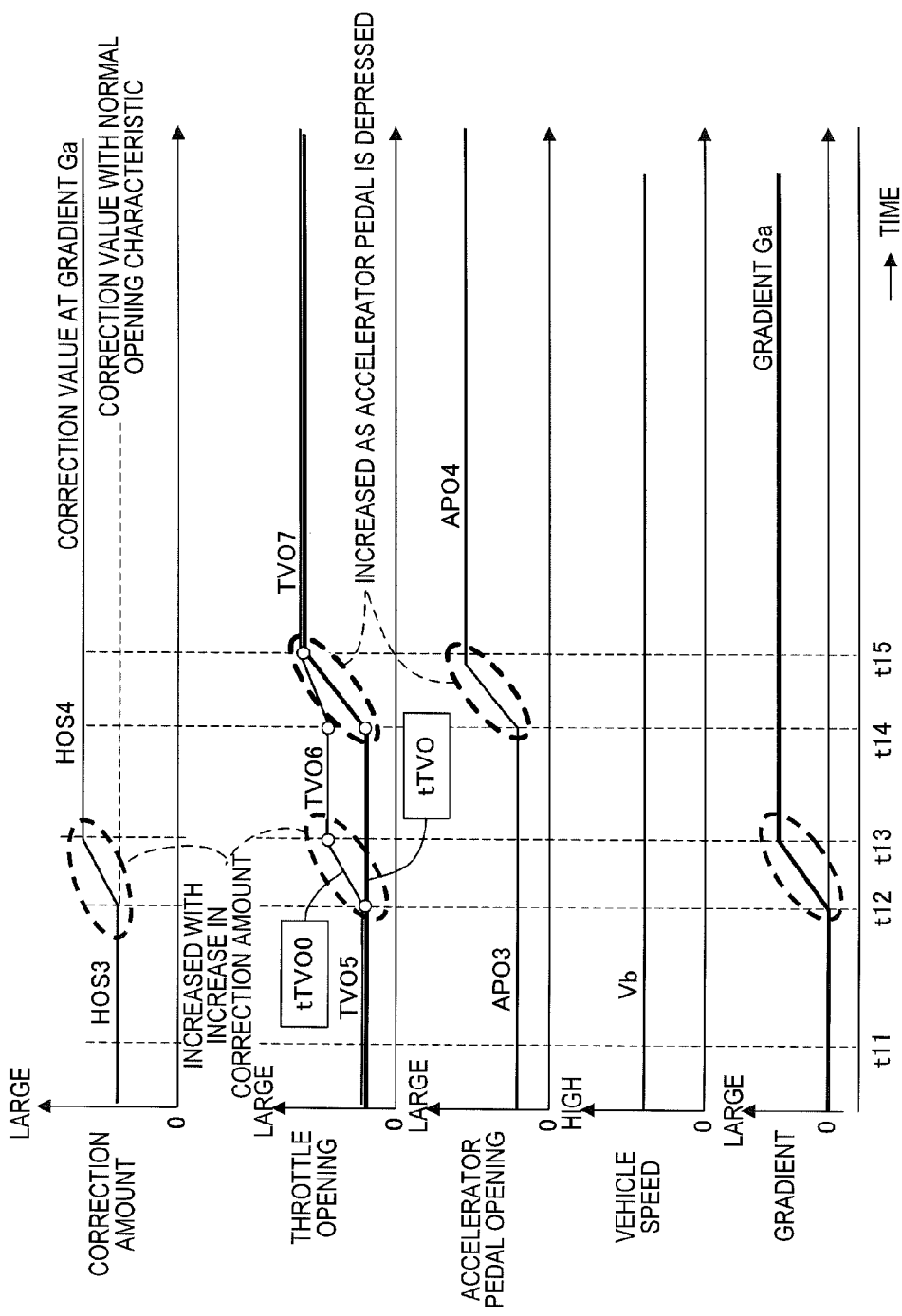
FIG. 9 is a timing chart showing changes in correction amount, accelerator pedal opening, throttle opening and vehicle speed at the time of steady running regardless of an uphill road when the uphill road is present ahead of a flat road.

FIG. 9 is a timing chart showing how the correction amount, the accelerator pedal opening, the throttle opening and the vehicle speed change at the time of running at a constant speed Vb regardless of an uphill road when the uphill road having a road surface gradient Ga is present ahead of a flat road by a model.

When the vehicle starts running on the uphill road having the road surface gradient Ga at timing t12, the constant speed Vb is kept by increasing the accelerator pedal opening from a predetermined value APO3 to a predetermined value APO4 at timing t14 (see the $3^{rd}$ row of FIG. 9).

In response to such a behavior of the accelerator pedal opening, the correction amount deviates from a correction amount HOS3 in the normal opening characteristic at timing t12 at which the vehicle starts running on the uphill road and is increased to a correction amount HOS4 at the road surface gradient Ga (see the $1^{st}$ row of FIG. 9). Then, the basic throttle opening tTVO0 calculated based on this correction amount HOS4 is increased from a predetermined value TVO5 to a predetermined value TVO6 (see thin solid line in the $2^{nd}$ row of FIG. 9). Further, in response to an increase in the accelerator pedal opening from t14 on, the throttle opening is increased from the predetermined value TVO6 to a predetermined value TVO7.

It should be noted that the driver does not change the accelerator pedal opening during a period from timing t12 to timing t14. If the actual throttle opening is, nevertheless, reduced with an increase in the basic throttle opening tTVO0, the engine torque is increased to give a sense of incongruity to the driver. Accordingly, the target throttle opening tTVO is introduced separately from the basic throttle opening tTVO0 and the actual throttle opening is controlled based on this target throttle opening (see thick solid line in the 2$^{nd}$ row of FIG. 9). The target throttle opening tTVO is kept as it is without being increased during the period from t12 to t14, increased at a timing (t14) at which the accelerator pedal opening is increased, and matched with the basic throttle opening tTVO0 at timing t15.

The control of the throttle opening executed by the engine controller 41 is described with reference to a control block diagram of FIG. 10. The engine controller 41 executes the control using a program corresponding to the control block diagram and a flow chart (to be described later). For example, the engine controller 41 is configured by a microcomputer including a central processing unit (CPU), a read only memory (ROM), a random access memory (RAM) and an input/output interface (I/O interface). It is also possible to configure the engine controller 41 by a plurality of microcomputers. A memory of the engine controller 41 stores reference tables (or reference maps) and the program to be described later.

Figure 10:
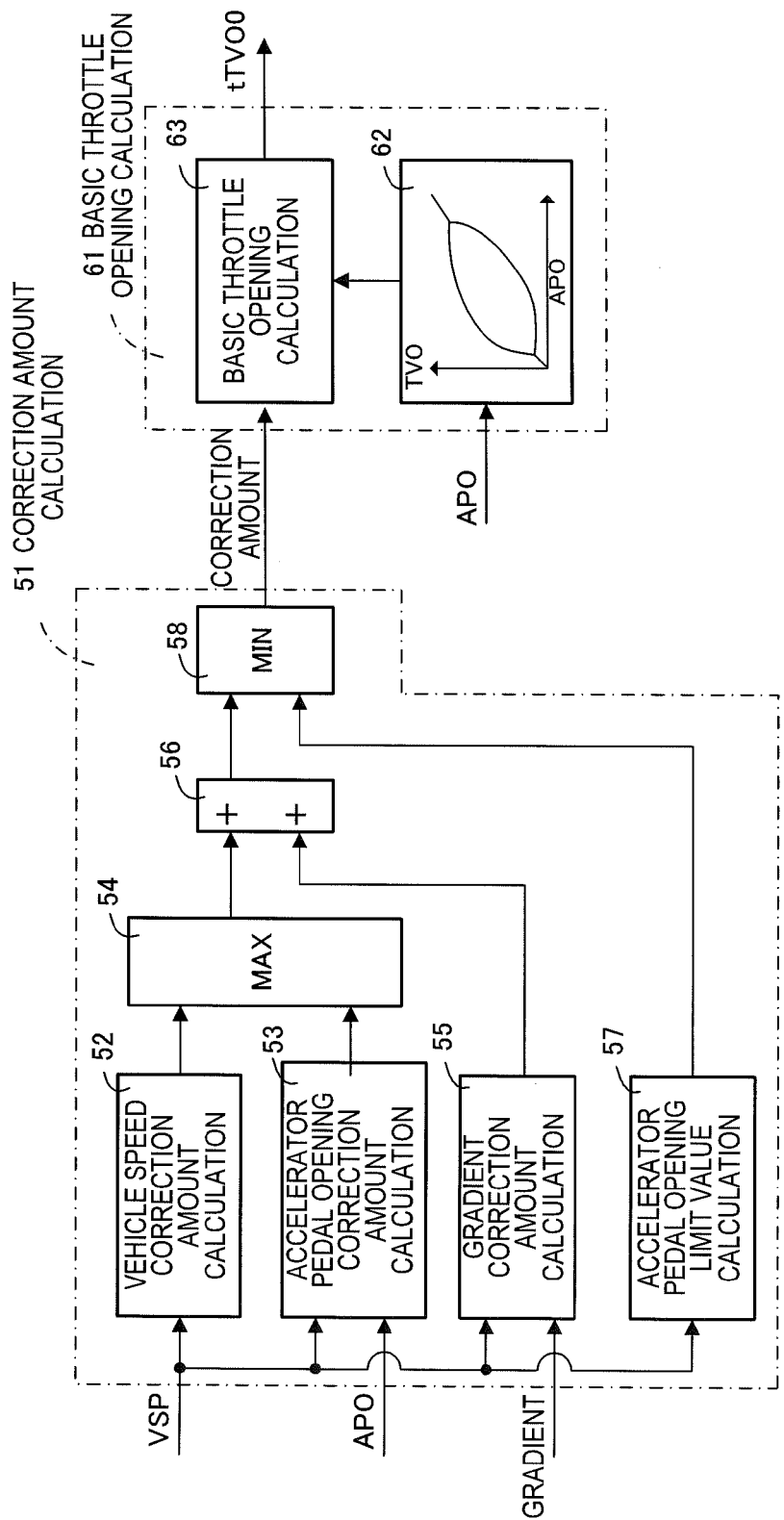
FIG. 10 is a control block diagram for calculating a basic throttle opening of the first embodiment.

In FIG. 10, a correction amount calculation unit 51 is composed of calculation units 52, 53 and 55 for calculating three different correction amounts, an accelerator pedal opening limit value calculation unit 57, a maximum selection unit 54, an addition unit 56 and a minimum selection unit 58.

Figure 11:
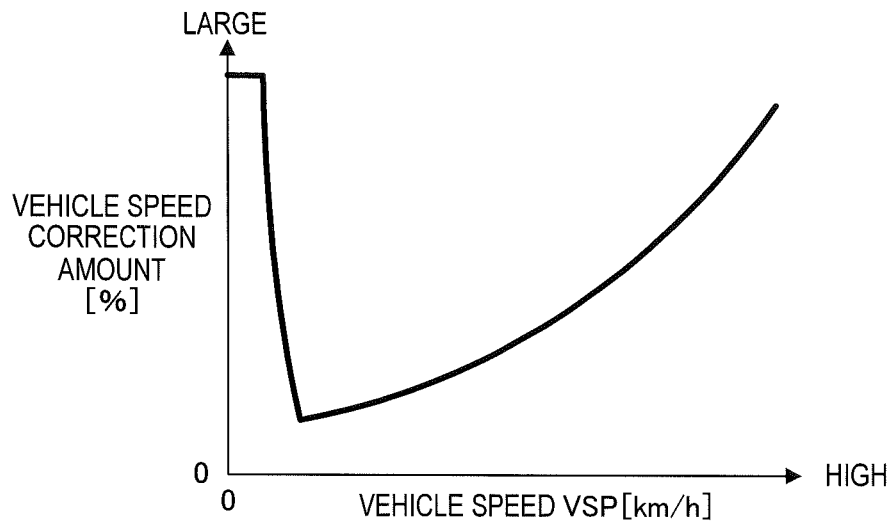
FIG. 11 is a characteristic diagram of a vehicle speed correction amount.

The vehicle speed correction amount calculation unit 52 calculates a vehicle speed correction amount [%] by retrieving a reference table with the contents of FIG. 11 based on a vehicle speed VSP [km/h] detected by the vehicle speed sensor 47. The reference table (FIG. 11) defining a relationship between the vehicle speed VSP and the vehicle speed correction amount is stored in the memory of the engine controller 41. As shown in FIG. 11, the vehicle speed correction amount is a value which increases with an increase in the vehicle speed VSP. If the correction amount increases, the basic throttle opening tTVO0 increases as described later. The correction amount is increased with an increase in the vehicle speed VSP to meet such a tendency that the throttle opening necessary for running at a constant speed increases with an increase in the vehicle speed VSP as shown in FIG. 4.

It should be noted that a large value is given to the vehicle speed correction amount in a region where the vehicle speed VSP is low. This is to set a certain large vehicle speed correction amount (open the throttle pedal to a predetermined opening) and, thereby, stabilize the throttle opening since a variation of the accelerator pedal opening is unthinkable in the region where the vehicle speed VSP is low.

Figure 12:
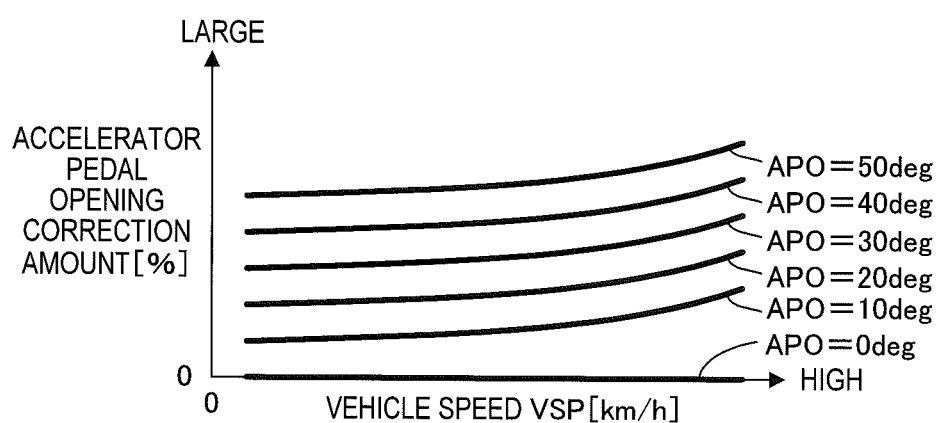
FIG. 12 is a characteristic diagram of accelerator pedal opening correction amounts.

The accelerator pedal opening correction amount calculation unit 53 calculates an accelerator pedal opening correction amount [%] by retrieving a reference table with the contents of FIG. 12 based on the accelerator pedal opening detected by an accelerator pedal opening sensor 48 (accelerator pedal opening detection means) and the vehicle speed VSP. The reference table (FIG. 12) relating the accelerator pedal opening APO and the vehicle speed VSP to the accelerator pedal opening correction amount is stored in the memory of the engine controller 41. As shown in FIG. 12, the accelerator pedal opening correction amount is a value which increases with an increase in the accelerator pedal opening APO on the condition that the vehicle speed VSP is constant and increases with an increase in the vehicle speed VSP on the condition that the accelerator pedal opening APO is constant. The vehicle speed correction amount is increased with an increase in the accelerator pedal opening APO on the condition that the vehicle speed VSP is constant to meet such a tendency that the throttle opening necessary for running at a constant speed increases with an increase in the accelerator pedal opening APO as shown in FIG. 4. Similarly, the vehicle speed correction amount is increased with an increase in the vehicle speed VSP on the condition that the accelerator pedal opening APO is constant to meet such a tendency that the throttle opening necessary for running at a constant speed increases with an increase in the vehicle speed VSP as shown in FIG. 4.

The maximum selection unit 54 outputs the larger value of the vehicle speed correction amount and the accelerator pedal opening correction amount as a basic correction amount.

Figure 13:
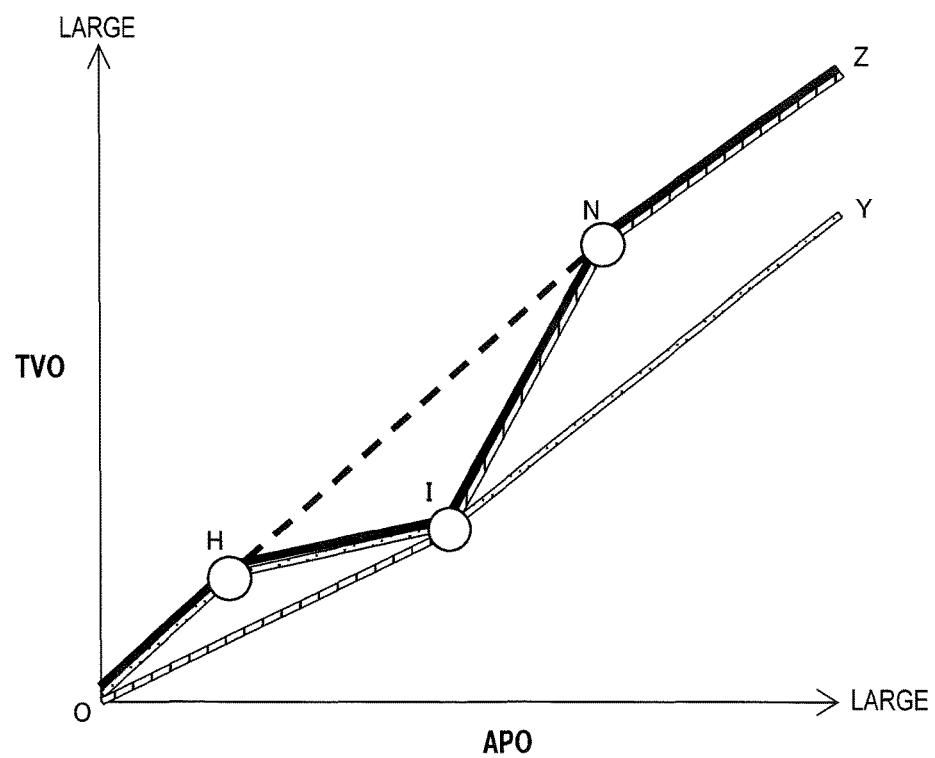
FIG. 13 is a characteristic diagram showing a relationship between a target throttle opening obtained using the vehicle speed correction amount and a target throttle opening obtained using the accelerator pedal opening correction amount.

Here, a relationship between the basic throttle opening tTVO0 obtained using the vehicle speed correction amount and the basic throttle opening tTVO0 obtained using the accelerator pedal opening correction amount is shown in FIG. 13. In FIG. 13, the same parts as in FIG. 3 are denoted by the same reference signs. As shown in FIG. 13, the basic throttle opening tTVO0 using the vehicle speed correction amount moves along points O-H-I-Y, and the basic throttle opening tTVO0 using the accelerator pedal opening correction amount moves along points O-I-N-Z. Thus, the larger value of the both moves along the points O-H-I-N-Z and this characteristic is found to coincide with that of FIG. 3.

Figure 14:
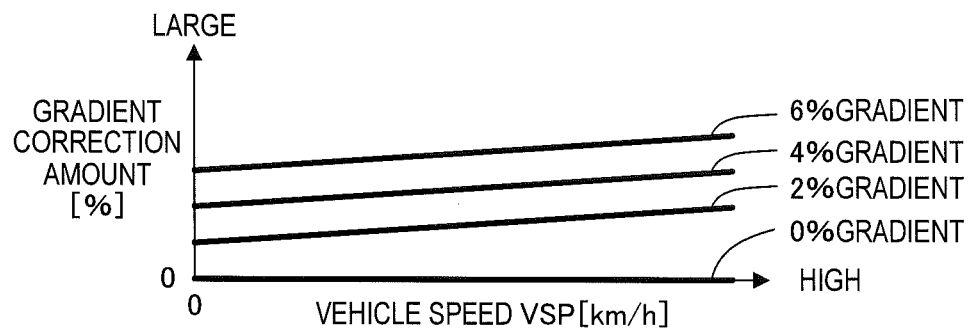
FIG. 14 is a characteristic diagram of gradient correction amounts.

Referring back to FIG. 10, the gradient correction amount calculation unit 55 calculates a gradient correction amount [%] by retrieving a reference table with the contents of FIG. 14 based on the road surface gradient and the vehicle speed VSP. The reference table (FIG. 14) relating the road surface gradient and the vehicle speed VSP to the gradient correction amount is stored in the memory of the engine controller 41. As shown in FIG. 14, the gradient correction amount is a value which increases with an increase in the road surface gradient on the condition that the vehicle speed VSP is constant and increases with an increase in the vehicle speed VSP on the condition that the road surface gradient is constant. The gradient correction amount is increased with an increase in the road surface gradient on the condition that the vehicle speed VSP is constant to meet such a tendency that the throttle opening necessary for running at a constant speed increases with an increase in the road surface gradient as shown in FIG. 7. Similarly, the gradient correction amount is increased with an increase in the vehicle speed VSP on the condition that the road surface gradient is constant to meet such a tendency that the throttle opening necessary for running at a constant speed increases with an increase in the vehicle speed VSP as shown in FIG. 4.

The above road surface gradient can be obtained from position information of the vehicle if the vehicle 1 is equipped with a navigation system. Specifically, since the position information includes height information, the road surface gradient can be estimated from the height information of two points of movement of the vehicle. A gradient sensor for detecting a gradient of a road surface may be provided in the vehicle and information from this gradient sensor may be used (see JP9-4482A).

Referring back to FIG. 10, the addition unit 56 corrects the basic correction amount by adding the gradient correction amount from the gradient correction amount calculation unit 55 to the basic correction amount from the maximum selection unit 54.

Figure 15:
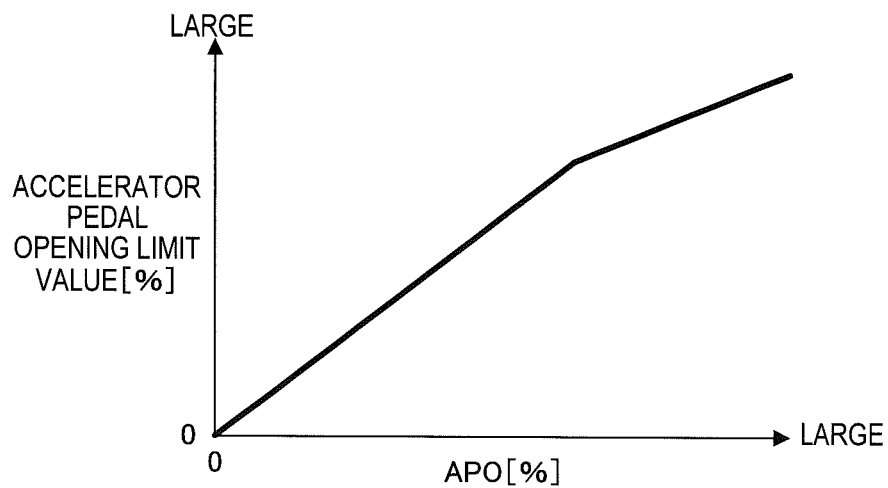
FIG. 15 is a characteristic diagram of an accelerator pedal opening limit value.

The accelerator pedal opening limit value calculation unit 57 calculates an accelerator pedal opening limit value [%] by retrieving a reference table with the contents of FIG. 15 based on the accelerator opening APO. The reference table (FIG. 15) defining the accelerator pedal opening APO and the accelerator pedal opening limit value is stored in the memory of the engine controller 41. In FIG. 15, the normal opening characteristic is set as the accelerator pedal opening limit value. The normal opening characteristic is set as the accelerator pedal opening limit value since it is not possible for the basic throttle opening tTVO0 calculated based on the correction amount to exceed the normal opening characteristic.

The minimum selection unit 58 outputs the smaller value of the accelerator pedal opening limit value from the accelerator pedal opening limit value calculation unit 57 and the basic correction amount after a correction (corrected basic correction amount) from the addition unit 56 as a final correction amount HOS [%].

Next, a basic throttle opening calculation unit 61 (basic throttle opening calculation means) is composed of a virtual throttle opening calculation unit 62 and a basic throttle opening calculation unit 63.

Figure 16:
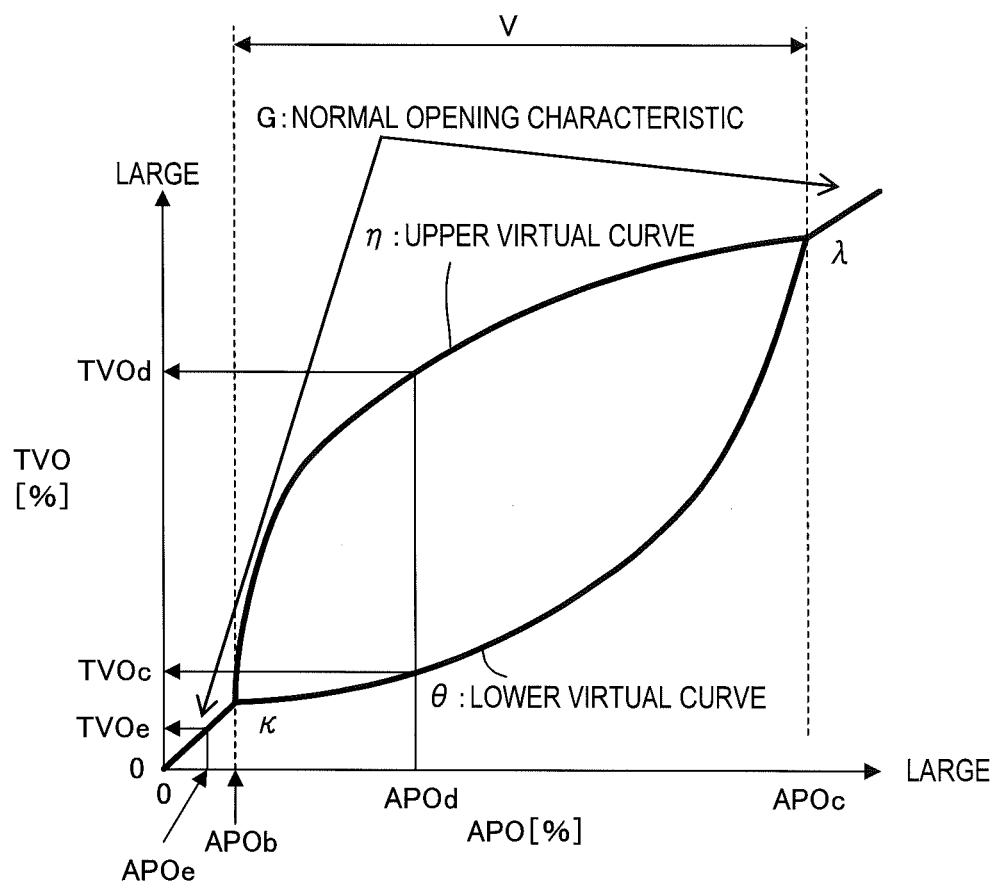
FIG. 16 is a throttle opening characteristic diagram having two values in a predetermined range of the accelerator pedal opening.

The virtual throttle opening correction amount calculation unit 62 calculates the values of two virtual throttle openings, i.e. a value on the lower virtual curve and a value on the upper virtual curve if the accelerator pedal opening APO is in the predetermined accelerator pedal opening range V (APOb<APO<APOc) by retrieving a reference table with the contents of FIG. 16 based on the accelerator pedal opening APO. For example, if the accelerator pedal opening APO is a predetermined value APOd, a first virtual throttle opening TVOc as a value on the lower virtual curve and a second virtual throttle opening TVOd as a value on the upper virtual curve are calculated. The reference table (FIG. 16) defining a relationship between the accelerator pedal opening APO and the throttle opening (including first virtual throttle opening TVOc and second virtual throttle opening TVOd) is stored in the memory of the engine controller 41.

On the other hand, the throttle opening TVO is calculated from a linear characteristic if the accelerator pedal opening APO is not larger than the predetermined APOb and if the accelerator pedal opening APO is not smaller than the predetermined APOc (if the accelerator pedal opening APO is in a region outside the predetermined accelerator pedal opening range V). For example, a throttle opening TVOe is calculated if the accelerator pedal opening APO is a predetermined value APOe. The linear characteristic is the normal opening characteristic G. FIG. 16 shows basically the same characteristic as FIG. 6.

The basic throttle opening correction amount calculation unit 63 calculates the basic throttle opening tTVO0 by the following equation, using the above two virtual throttle opening values TVOc, TVOd and the correction amount HOS if the accelerator pedal opening APO is in the predetermined accelerator pedal opening range V (APOb<APO<APOc).

$$tTVO0=(TVOd-TVOc)\times HOS/100+TVOc \quad (15)$$

The equation (15) sets a value calculated by interpolating between the values (TVOd, TVOc) of the two upper and lower virtual throttle openings at the same accelerator pedal opening APO using the correction amount HOS as the basic throttle opening tTVO0 as shown in FIG. 6. By the equation (15), the basic throttle opening tTVO0 increases with an increase in the correction amount HOS on the condition that the accelerator pedal opening APO is the same.

On the other hand, the basic throttle opening calculation unit 63 sets the value of the throttle opening TVOe as it is as the basic throttle opening tTVO0 if the accelerator pedal opening APO is not larger than the predetermined APOb and if the accelerator pedal opening APO is not smaller than the predetermined APOc (if the accelerator pedal opening APO is in a region outside the predetermined accelerator pedal opening range V). As just described, the basic throttle opening calculation unit 63 can obtain the basic throttle opening tTVO0 from the correction amount HOS and the reference table of FIG. 16 in the same manner as the basic throttle opening tTVO0 is obtained from the reference tables of FIGS. 4 and 7 while reducing the memory capacity.

Figure 17:
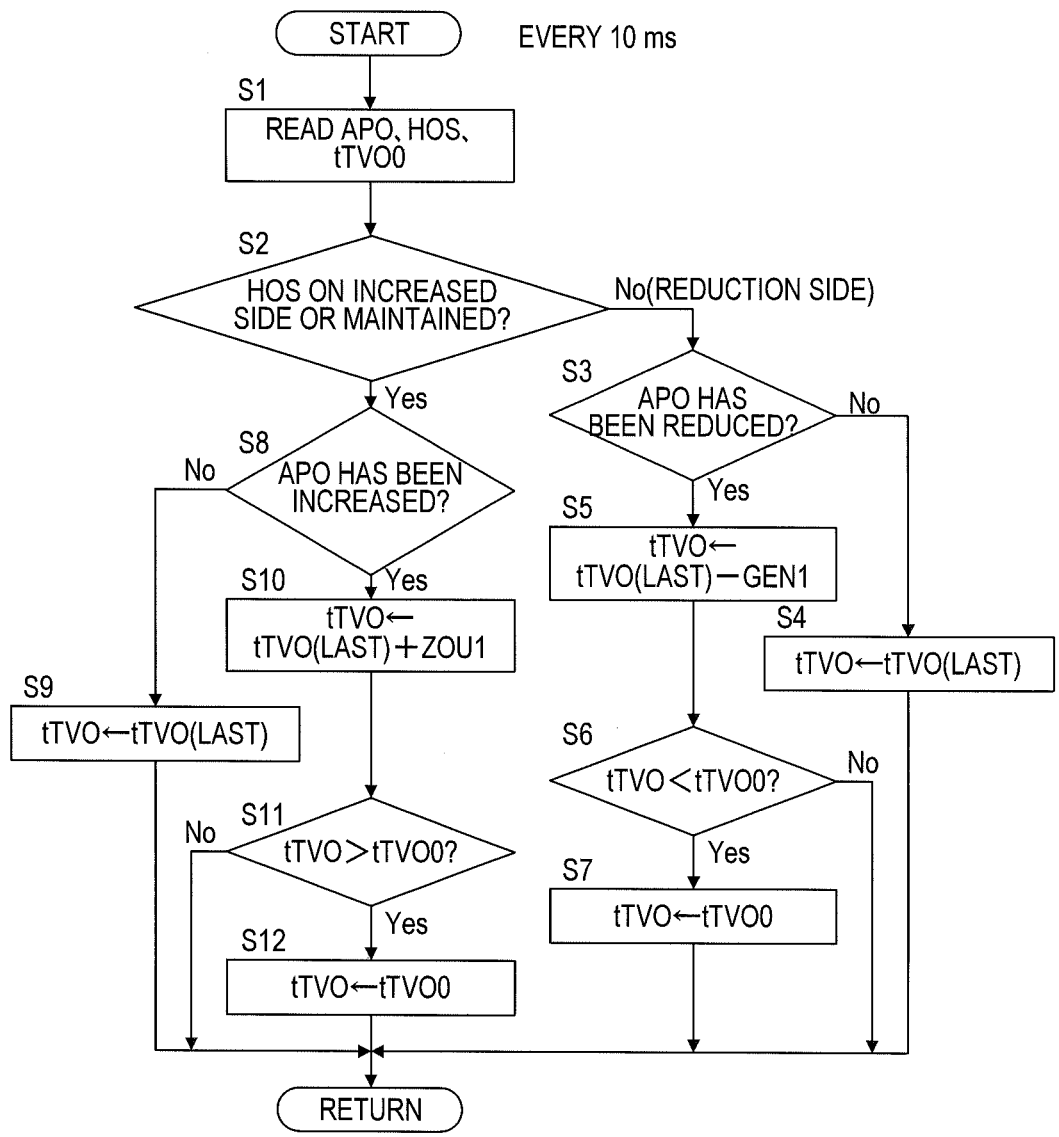
FIG. 17 is a flow chart showing the calculation of the target throttle opening.

A flow chart of FIG. 17 is for calculating the target throttle opening tTVO and the engine controller 41 executes a control of the flow chart at regular time intervals (e.g. every 10 ms).

In Step 1, the accelerator pedal opening APO detected by the accelerator pedal opening sensor 48, the correction amount HOS and the basic throttle opening tTVO0 are read. The correction amount HOS and the basic throttle opening tTVO0 are already calculated by the control of FIG. 10.

In Steps 2, 3, whether or not the correction amount HOS is on an increase side, on a reduction side or maintained is determined. For example, the current value and the last value of the correction amount are compared and the correction amount is determined to be on the increase side if the current value of the correction amount is larger than the last value, to be on the reduction side if the current value of the correction amount is, conversely, smaller than the last value and to be maintained if the current value of the correction amount HOS is equal to the last value.

If the correction amount HOS is on the reduction side, a transition is made from Step 2 to Step 3 to determine whether or not the accelerator pedal opening APO has been reduced. The current value and the last value of the accelerator pedal opening APO are also compared and the accelerator pedal opening APO is determined to have been increased if the current value of the accelerator pedal opening APO is larger than the last value and to have been reduced if the current value of the accelerator pedal opening APO is, conversely, smaller than the last value. Further, if the current value of the accelerator pedal opening APO is equal to the last value, the accelerator pedal opening APO is determined to have been maintained. A transition is made from Step 3 to Step 4 to set the value of tTVO (last), which is the last value of the target throttle opening, as it is as the target throttle opening tTVO if the accelerator pedal opening APO has been maintained or increased although the correction amount HOS is on the reduction side. The operation of Step 4 is repeated to maintain the target throttle opening tTVO if the accelerator pedal opening APO has been maintained or increased although the correction amount HOS is on the reduction side. This is equivalent to the operation during the period from t3 to t4 in FIG. 8.

On the other hand, if the accelerator pedal opening APO has been reduced in Step 3, Step 5 follows and the target throttle opening tTVO is reduced by a reduction amount GEN1 [%] by the following equation.

$$tTVO=tTVO(\text{last})-GEN1 \quad (16)$$

tTVO (last) is the last value of tTVO and GEN1 is the reduction amount. The reduction amount GEN1 of the equation (16) is suitably determined in advance. The equation (16) is equivalent to the operation during the period from t4 to t5 in FIG. 8.

In Step 6, the target throttle opening tTVO and the basic throttle opening tTVO0 are compared. The process this time is finished by skipping Step 7 unless the target throttle opening tTVO is below the basic throttle opening tTVO0.

On the other hand, if the target throttle opening tTVO is below the basic throttle opening tTVO0 in Step 6, Step 7 follows and the target throttle opening tTVO is limited to the basic throttle opening tTVO0. This is equivalent to the operation after t5 in FIG. 8.

If the correction amount HOS is on the increase side or maintained, Step 8 follows and whether or not the accelerator pedal opening APO has been increased is determined. A transition is made from Step 8 to Step 9 to set the value of tTVO (last), which is the last value of the target throttle opening, as it is as the target throttle opening tTVO if the accelerator pedal opening APO has been maintained or reduced although the correction amount HOS is on the increase side. The operation of Step 9 is repeated to maintain the target throttle opening tTVO if the accelerator pedal opening APO has been maintained or reduced although the correction amount HOS is on the increase side. This is equivalent to the operation during the period from t12 to t14 in FIG. 9.

On the other hand, if the accelerator pedal opening APO has been increased in Step 8, Step 10 follows and the target throttle opening tTVO is increased by an increase amount ZOU1 [%] by the following equation.

$$tTVO=tTVO(\text{last})+ZOU1 \quad (17)$$

tTVO (last) is the last value of tTVO and ZOU1 is the increase amount. The increase amount ZOU1 of the equation (17) is suitably determined in advance. The equation (17) is equivalent to the operation during a period from t14 to t15 in FIG. 9.

In Step 11, the target throttle opening tTVO and the basic throttle opening tTVO0 are compared. The process this time is finished by skipping Step 12 unless the target throttle opening tTVO is above the basic throttle opening tTVO0.

On the other hand, if the target throttle opening tTVO is above the basic throttle opening tTVO0 in Step 11, Step 12 follows and the target throttle opening tTVO is limited to the basic throttle opening tTVO0. This is equivalent to the operation after t15 in FIG. 9.

Figure 18:
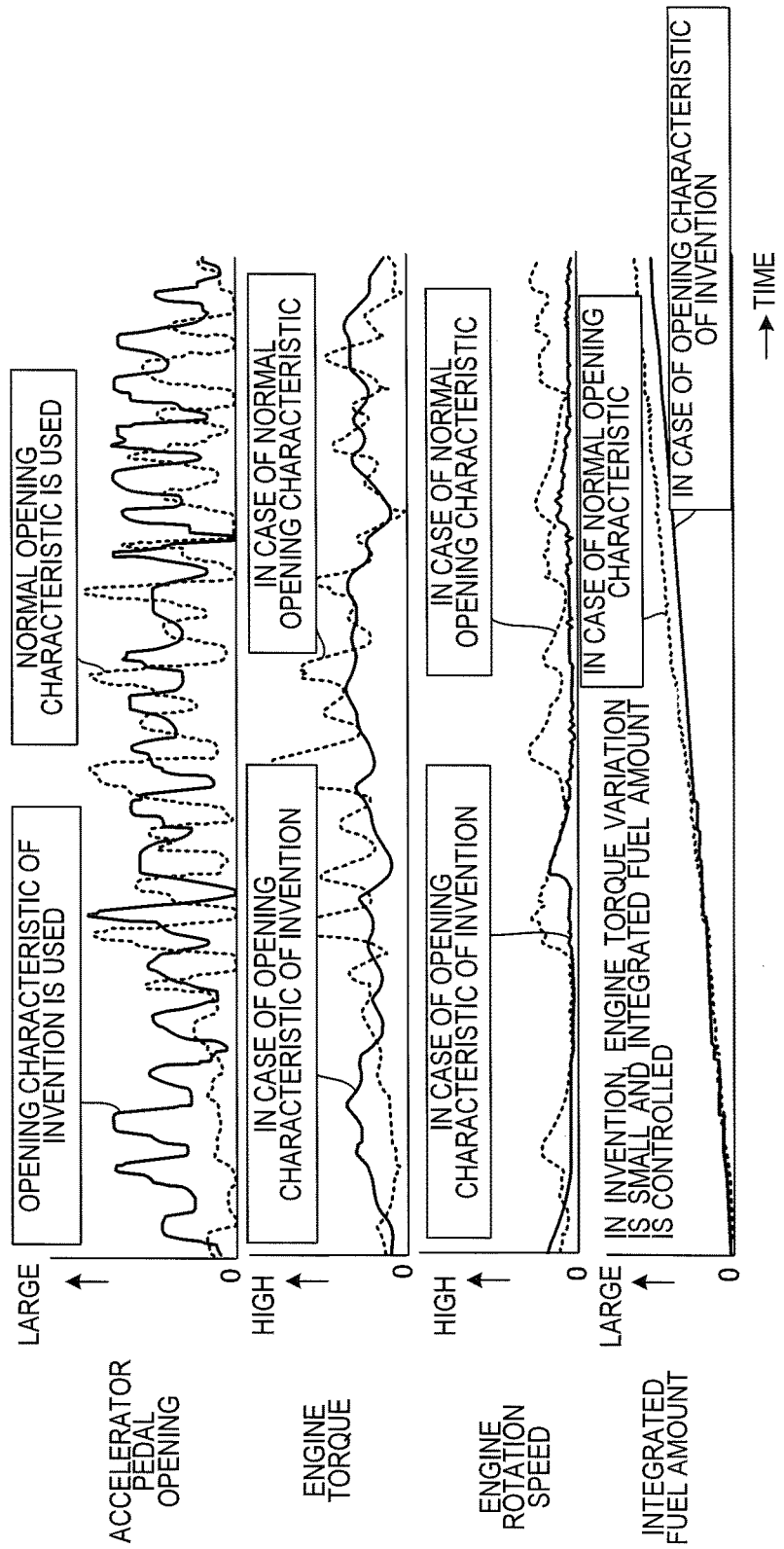
FIG. 18 shows experiment data of the accelerator pedal opening, an engine torque, an engine rotation speed and integrated fuel during steady running according to the first embodiment.

FIG. 18 shows data of the accelerator pedal opening, engine torque, engine rotation speed and integrated fuel at the time of running at a constant speed while intentionally fluttering the accelerator pedal. According to the present embodiment, fuel economy is found to be improved due to a small variation of the engine torque and less integrated fuel. Further, experiment data on acceleration in relation to accelerator pedal opening at the time of applying the present embodiment is shown in a superimposed manner in FIG. 2.

Figure 26:
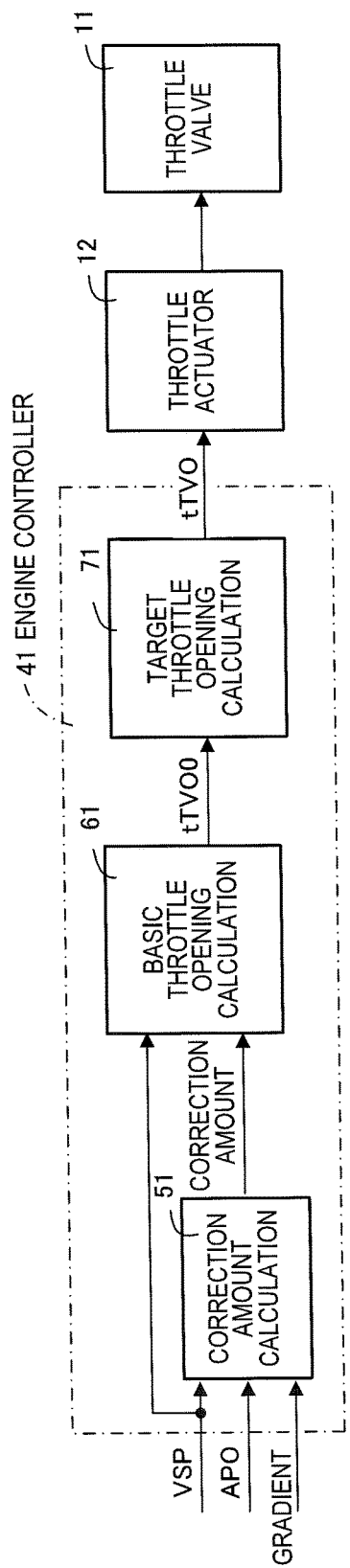
FIG. 26 is a control block diagram of the entire control system of the first embodiment targeted at a gasoline engine vehicle.

FIG. 26 is a control block diagram of the entire control system of the first embodiment. The details of the correction amount calculation unit 51 and the basic throttle opening calculation unit 61 in FIG. 26 are shown in FIG. 10. Further, the details of the target throttle opening calculation unit 71 are shown in the flow chart of FIG. 17.

Here, functions and effects of the present embodiment are described.

In the present embodiment, the gasoline engine 1 of the vehicle includes the throttle valve 11 capable of adjusting the intake air amount into the engine 1 and the throttle motor 12 (throttle actuator) for driving this throttle valve 11 according to a control amount. In the output control device for vehicle, the engine controller 41 (constant-speed opening characteristic setting means) sets the constant-speed opening characteristic α. The constant-speed opening characteristic α is composed of the opening characteristic β (second opening characteristic) and the opening characteristic γ (third opening characteristic that returns to the first opening characteristic). The normal opening characteristic G (first opening characteristic) is a characteristic of the throttle opening necessary for constant speed running and represented by a polygonal line approximate to a straight line of an increasing function on a plane with two axes of the accelerator pedal opening and the throttle opening. The opening characteristic β (second opening characteristic) has a smaller gradient than that of the polygonal line approximate to the straight line in the predetermined accelerator pedal opening range F on a side larger than the point H (predetermined point) on the normal opening characteristic G as the base point. The opening characteristic γ becomes an increasing function having a larger gradient than the opening characteristic β (second opening characteristic) and returns to the normal opening characteristic G in a region where the accelerator pedal opening is larger than in the predetermined accelerator pedal opening range F. The engine controller 41 (throttle actuator control means) controls the throttle motor 12 during constant speed running (during running at a constant speed) using the normal opening characteristic G and the constant-speed opening characteristic α set by the constant-speed opening characteristic setting means. The present inventors found out that the accelerator pedal opening range in which the vehicle speed is adjusted to achieve the constant speed is the predetermined accelerator pedal opening range F on the side larger than the point H on the normal opening characteristic G as the base point. According to the present embodiment, unnecessary acceleration and deceleration of a driver to maintain the constant speed are suppressed by setting the opening characteristic β having a smaller gradient than that of the polygonal line approximate to the straight line of the normal opening characteristic G, i.e. the opening characteristic β in which the vehicle speed is easily adjusted, in this accelerator pedal opening range F. Thus, fuel economy can be improved during constant speed running.

According to the present embodiment, the output control device includes a plurality of constant-speed opening characteristics α1 to α4 in which the point H (predetermined point) is shifted to the larger side of the accelerator pedal opening and the larger side of the throttle opening on the normal opening characteristic G (first opening characteristic) with an increase in the vehicle speed with the width of the predetermined accelerator pedal opening range F kept constant. The output control device includes the vehicle speed sensor 47 (vehicle speed detection means) for detecting the vehicle speed and selects the constant-speed opening characteristic corresponding to the vehicle speed detected by this vehicle speed sensor 47 from the plurality of constant-speed opening characteristics α1 to α4. The output control device controls the throttle motor 12 (throttle actuator) during steady running in which the detected vehicle speed is the targeted constant speed, using the selected constant-speed opening characteristic and the normal opening characteristic G. Thus, even if the targeted vehicle speed differs during steady running, fuel economy can be improved during each steady running since the opening characteristic β1 to β4 in which the vehicle speed is easily adjusted is set for each vehicle speed.

According to the present embodiment, the output control device includes a plurality of constant-speed opening characteristics α1, α5 and α6 in which the point H (predetermined point) is shifted to the larger side of the accelerator pedal opening and the larger side of the throttle opening on the normal opening characteristic G (first opening characteristic) with an increase in the road surface gradient of the uphill road with the width of the predetermined accelerator pedal opening range F kept constant. The output control device includes the road surface gradient estimation means (navigation system and engine controller 41) for estimating the road surface gradient of the uphill road on which the vehicle is running. The output control device selects the constant-speed opening characteristic corresponding to the magnitude of the road surface gradient estimated by this road surface gradient estimation means from the plurality of constant-speed opening characteristics α1, α5 and α6. The output control device controls the throttle motor 12 (throttle actuator) during steady running at the estimated road surface gradient using the selected constant-speed opening characteristic and the normal opening characteristic G. Thus, even if the road surface gradient differs during uphill running at a constant speed, fuel economy can be improved during each uphill running at a constant speed since the opening characteristic β1, β5, β6 in which the vehicle speed is easily adjusted is set for each road surface gradient of the uphill road.

If the basic throttle opening tTVO0 is given as it is to the throttle motor 12, the vehicle is decelerated or accelerated although the accelerator pedal opening is constant (although a road environment remains unchanged), whereby a sense of incongruity is caused during running. However, according to the present embodiment, the basic throttle opening calculation unit 61 (basic throttle opening calculation means) calculates the throttle opening obtained using the constant-speed opening characteristic as the basic throttle opening tTVO0. The target throttle opening setting means (see FIG. 17) maintains the value immediately before the basic throttle opening tTVO0 changes when the basic throttle opening tTVO0 changes although the accelerator pedal opening remains unchanged, and thereafter sets a value, which changes in the same direction as the accelerator pedal opening, when the accelerator pedal opening changes. The engine controller 41 (throttle actuator control means) controls the throttle motor 12 (throttle actuator) according to the target throttle opening tTVO set by this target throttle opening setting means. Thus, in accordance with the actual accelerator operation, the target throttle opening tTVO is reduced if the accelerator pedal opening is reduced and is increased if the accelerator pedal opening is increased. This eliminates a sense of incongruity in driving during steady running and natural vehicle behaviors can be obtained.

According to the present embodiment, the basic correction amount calculation means (see 52, 53 and 54 of FIG. 10) calculates the basic correction amount HOS having a value, which increases with an increase in the vehicle speed and increases with an increase in the accelerator pedal opening, based on the vehicle speed sensor (vehicle speed detection means) for detecting the vehicle speed, the accelerator pedal opening sensor 48 (accelerator pedal opening detection means) for detecting the accelerator pedal opening, the vehicle speed detected by the vehicle speed sensor 47 and the accelerator pedal opening detected by the accelerator pedal opening sensor 48. A leaf-like opening setting means (62 of FIG. 10, see FIG. 16) sets one opening characteristic having a leaf-like shape as a whole. The leaf-like opening characteristic is a characteristic, instead of the plurality of constant-speed opening characteristics, which includes the upper virtual curve η and the lower virtual curve θ and having the values of two virtual throttle openings for one accelerator pedal opening in the predetermined accelerator pedal opening range V on a plane with two axes of the accelerator pedal opening and the throttle opening, and is the normal opening characteristic in regions outside the predetermined accelerator pedal opening range V. A first basic throttle opening calculation means (see 61 of FIG. 10) calculates the values of the two virtual throttle openings using the leaf-like opening characteristic if the accelerator pedal opening detected by the accelerator pedal opening sensor 48 is in the predetermined accelerator pedal opening range V, and calculates the throttle opening by interpolating between the calculated values of the two virtual throttle openings as the basic throttle opening tTVO0 using the calculated basic correction amount HOS. A second basic throttle opening calculation means (see 61 of FIG. 10) calculates the throttle opening obtained using the normal opening characteristic G as it is as the basic throttle opening tTVO0 when the accelerator pedal opening detected by the accelerator pedal opening sensor 48 is in a region outside the predetermined accelerator pedal opening range V. The output control device controls the throttle motor 12 (throttle actuator) during steady running in which the detected vehicle speed is targeted, using the basic throttle opening tTVO0 calculated by the first basic throttle opening calculation means and basic throttle opening tTVO0 calculated by the second basic throttle opening calculation means. Thus, besides obtaining the opening characteristic in which the vehicle speed is easily adjusted for each vehicle speed, it becomes unnecessary to store a plurality of constant-speed opening characteristics for vehicle speeds, whereby the memory capacity can be drastically reduced.

According to the present embodiment, the output control device includes the road surface gradient estimation means (navigation system and engine controller 41) for estimating the road surface gradient of the uphill road on which the vehicle is running. A gradient correction amount calculation means (55 of FIG. 10, see FIG. 14) calculates a gradient correction amount having a value, which increases with an increase in the road surface gradient, based on the magnitude of the road surface gradient estimated by the road surface gradient estimation means. A correction means (see 56 of FIG. 10) corrects the basic correction amount using the calculated gradient correction amount. The output control device controls the throttle motor 12 (throttle actuator) during steady running at the estimated road surface gradient, using the corrected basic correction amount. Thus, it is possible to obtain the opening characteristic, in which the vehicle speed is easily adjusted, for each road surface gradient of the uphill road.

Second Embodiment

Figure 19:
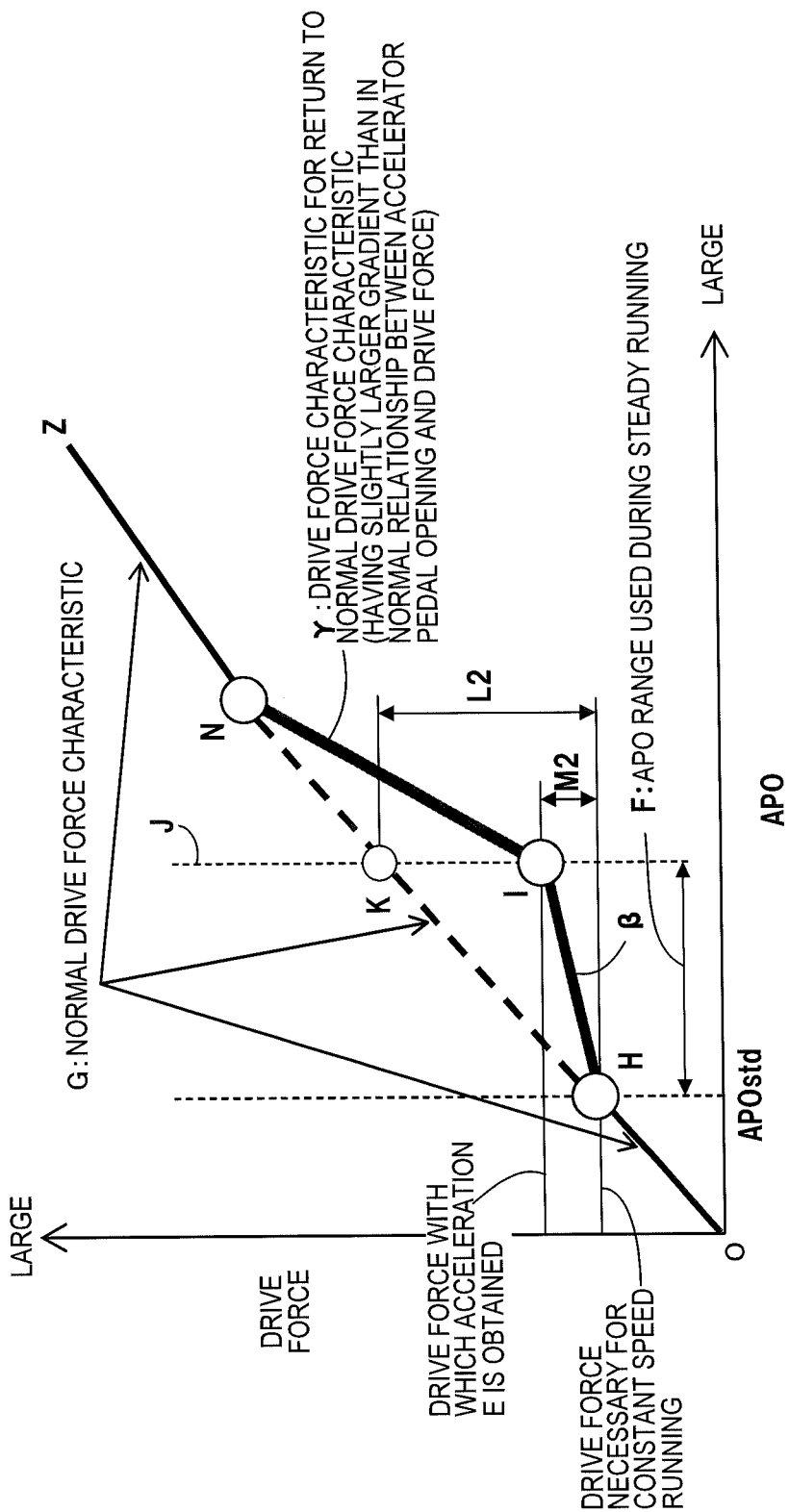
FIG. 19 is a characteristic diagram of throttle opening in relation to accelerator pedal opening according to a second embodiment.
Figure 20:
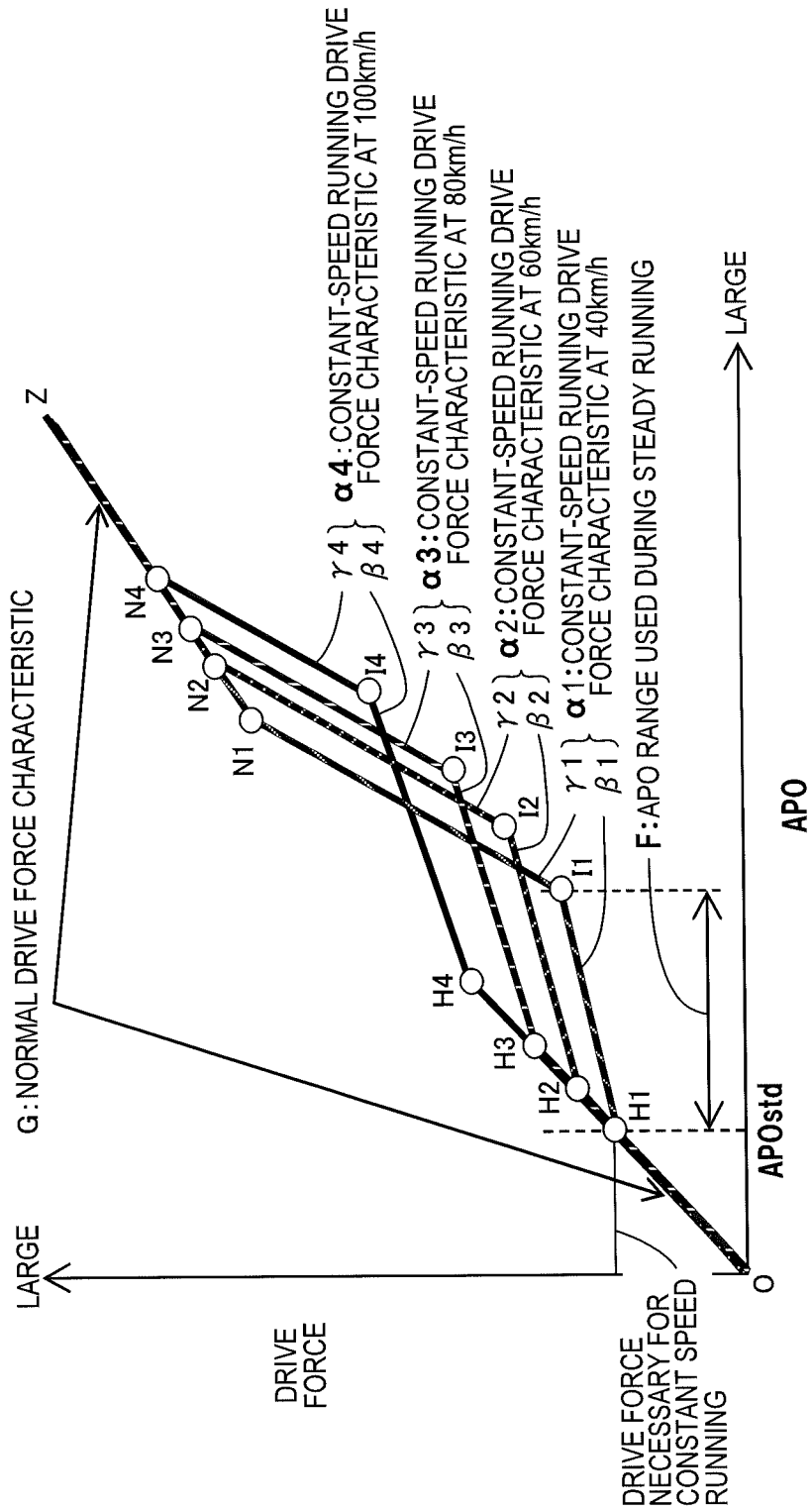
FIG. 20 is a characteristic diagram of throttle opening in relation to accelerator pedal opening at each vehicle speed according to the second embodiment.
Figure 21:
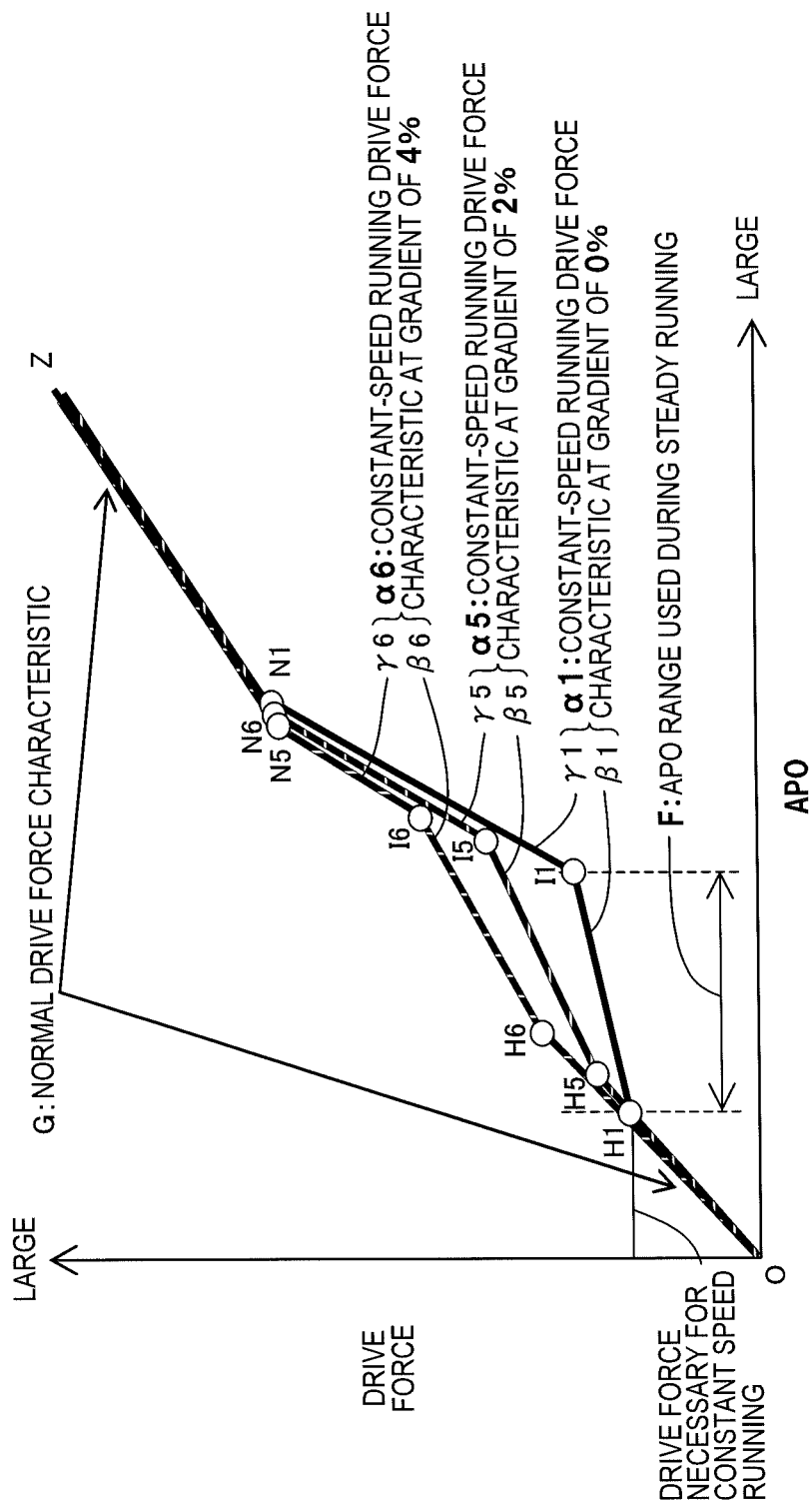
FIG. 21 is a characteristic diagram of throttle opening in relation to accelerator pedal opening at each road surface gradient during uphill running according to the second embodiment.

FIG. 19 is a characteristic diagram of drive force in relation to accelerator pedal opening according to a second embodiment, FIG. 20 is a characteristic diagram of drive force in relation to accelerator pedal opening at each vehicle speed according to the second embodiment, and FIG. 21 is a characteristic diagram of drive force in relation to accelerator pedal opening at each road surface gradient during uphill road running according to the second embodiment. The same parts as in FIGS. 3, 4 and 7 of the first embodiment are shown in a similar manner.

Figure 27:
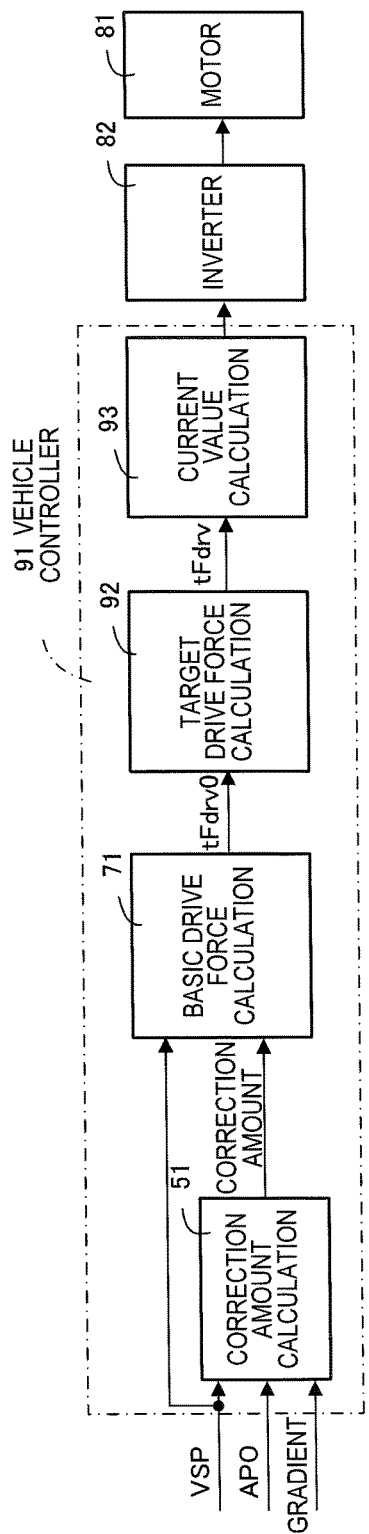
FIG. 27 is a control block diagram of the entire control system of the second embodiment targeted at an electric vehicle.
Figure 28:
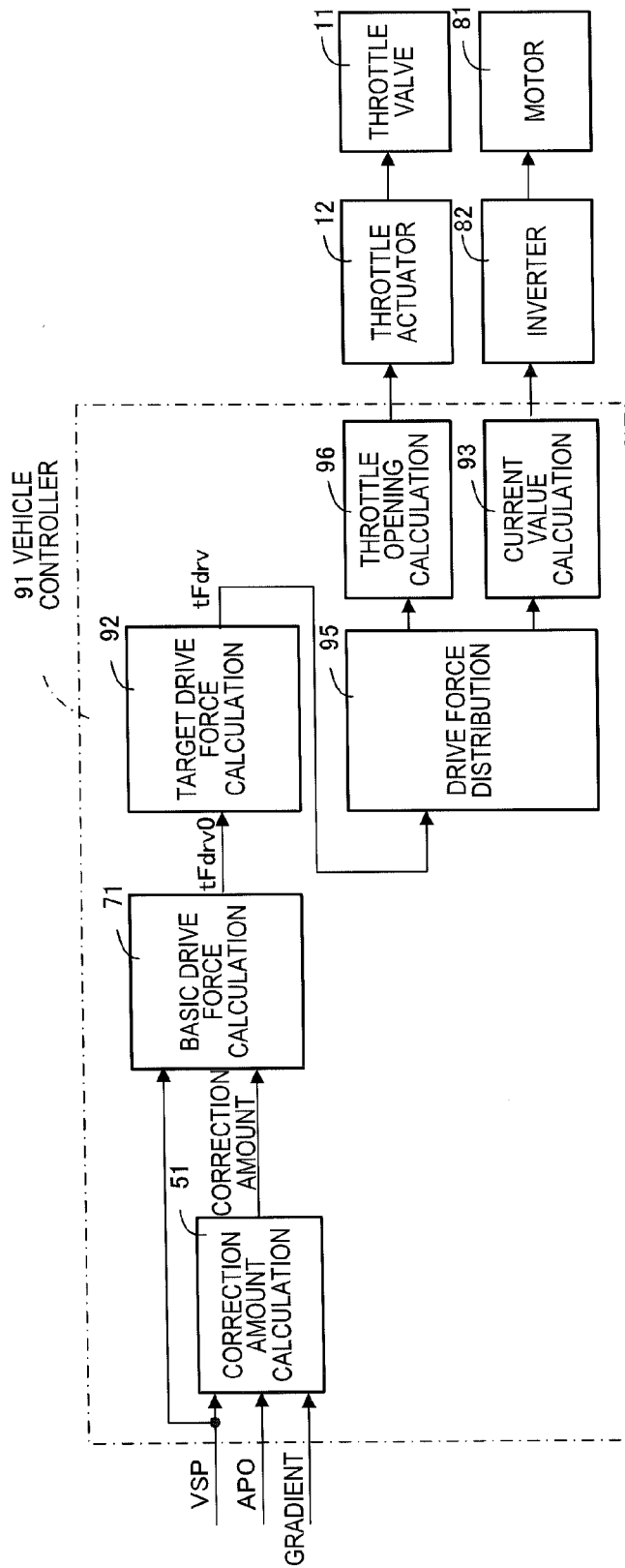
FIG. 28 is a control block diagram of the entire control system of the second embodiment targeted at a hybrid vehicle.

Further, FIG. 27 is a control block diagram of the entire control system of the second embodiment targeted at an electric vehicle, and FIG. 28 is a control block diagram of the entire control system of the second embodiment targeted at a hybrid vehicle. The same parts as in FIG. 26 of the first embodiment are shown in a similar manner.

The first embodiment is targeted at the gasoline engine vehicle. The second embodiment is targeted at electric and hybrid vehicles. In the gasoline engine, the parameter for controlling the output is the throttle opening. However, in the electric and hybrid vehicles, the throttle opening is replaced by a drive force. Thus, in the second embodiment, the throttle opening has only to be replaced by the drive force as shown in FIGS. 19, 20 and 21.

In FIG. 19, a characteristic of a drive force necessary for constant speed running represented by a polygonal line approximate to a straight line of an increasing function (or one straight line) is set as a normal opening characteristic G (first drive force characteristic). A drive force characteristic β (second drive force characteristic) having a smaller gradient than that of the polygonal line approximate to the straight line in a predetermined accelerator pedal opening range F is set on a side larger than a point H on this normal opening characteristic G as a base point. Further, a drive force characteristic γ (third drive force characteristic) is set which becomes an increasing function having a larger gradient than the drive force characteristic β (second drive force characteristic) and returns to the normal opening characteristic G in a region where the accelerator pedal opening is larger than in the predetermined accelerator pedal opening range F. A constant-speed drive force characteristic α is composed of these drive force characteristics β, γ. In electric and hybrid vehicles, an inverter 82 is controlled during constant speed running using the normal opening characteristic G and this constant-speed drive force characteristic α. Here, in FIG. 3, a polygonal line G approximate to a straight line which passes through an origin O, becomes an increasing function and reaches a point Z is a characteristic representing a normal relationship between the accelerator pedal opening and the drive force. In the second embodiment, this characteristic is referred to as a "normal drive force characteristic".

In FIG. 20, there are a plurality of constant-speed drive force characteristics (α1 to α4) in which the point H is shifted to a larger side of the accelerator pedal opening and a larger side of the throttle opening on the normal drive force characteristic G with an increase in a vehicle speed with a width of the predetermined accelerator pedal opening range F kept constant. In the second embodiment, the constant-speed drive force characteristic corresponding to the vehicle speed detected by a vehicle speed sensor 47 is selected from the plurality of constant-speed drive force characteristics (α1 to α4) and the inverter 82 is controlled during steady running in which the detected vehicle speed is targeted, using the selected constant-speed drive force characteristic and the normal drive force characteristic G.

In FIG. 21, there are a plurality of constant-speed drive force characteristics α1, α5 and α6 in which the point H is shifted to the larger side of the accelerator pedal opening and the larger side of the throttle opening on the normal drive force characteristic G with an increase in a road surface gradient of an uphill road with the width of the predetermined accelerator pedal opening range F kept constant. The constant-speed drive force characteristic corresponding to the magnitude of the estimated road surface gradient is selected from the plurality of constant-speed drive force characteristics and the inverter 52 is controlled during steady running at the estimated road surface gradient using the selected constant-speed drive force characteristic and the normal drive force characteristic G.

Figure 22:
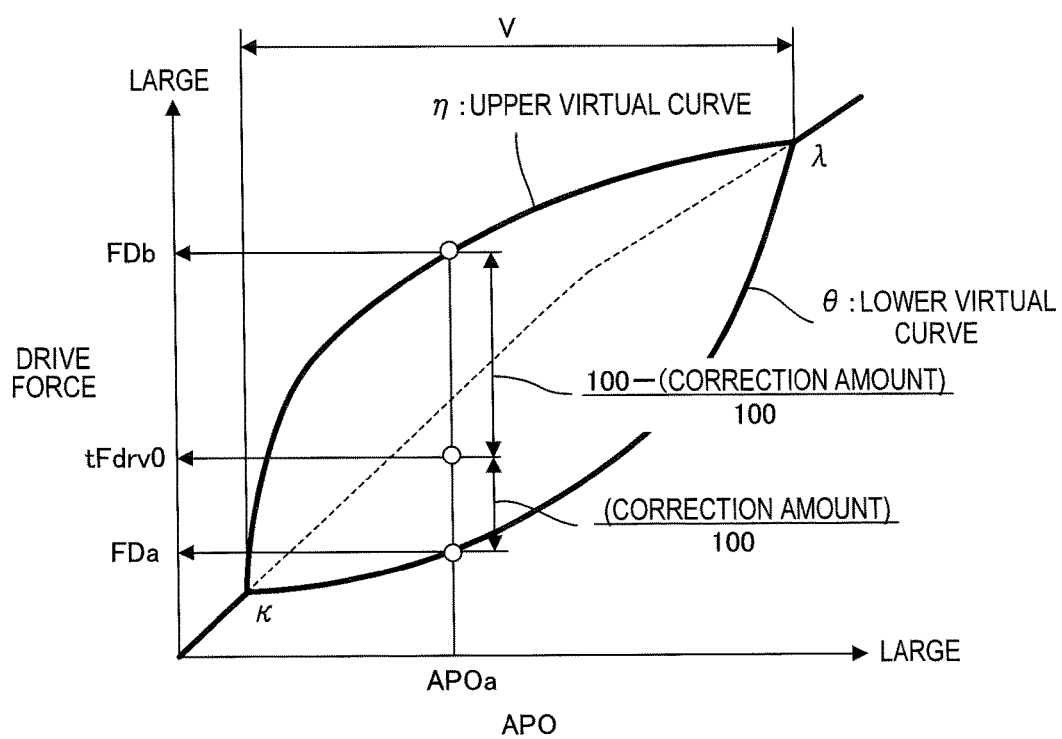
FIG. 22 is a drive force characteristic diagram having two values in a predetermined range of the accelerator pedal opening.

Also in the second embodiment, a characteristic including an upper virtual curve η and a lower virtual curve θ and having the values of two virtual drive forces for one accelerator pedal opening in a predetermined accelerator pedal opening range V is obtained as shown in FIG. 22. Further, the normal drive force characteristic G is used in regions of the accelerator pedal opening up to a point κ and from a point λ (regions outside the predetermined accelerator pedal opening range V). These two drive force characteristics constitute one leaf-like drive force characteristic as a whole.

The drive force is calculated as follows using the drive force characteristic having a leaf-like shape as a whole. For example, if the accelerator pedal opening is a predetermined value APOa, a value FDa of a virtual drive force on the lower virtual curve θ and a value FDb of a virtual drive force on the upper virtual curve η are obtained from APOa using the leaf-like opening characteristic shown in FIG. 22. From these two values FDa, FDb of the virtual drive forces and a correction amount, a basic drive force tFdrv0 is calculated by the following equation.

$$tFdrv0 = (FDb - FDa) \times \text{correction amount}/100 + FDa \quad (18)$$

Figure 23:
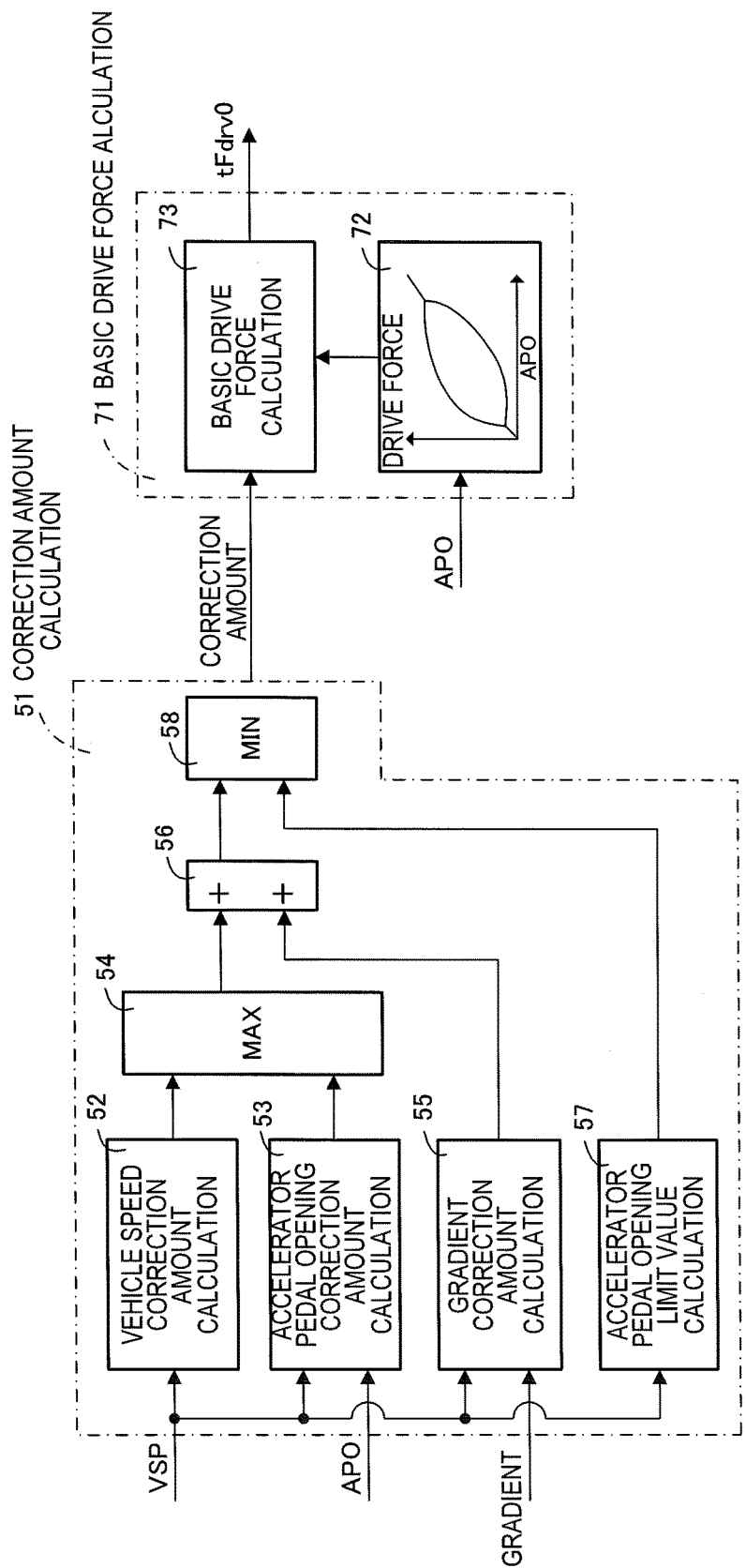
FIG. 23 is a control block diagram of the second embodiment.

FIG. 23 is a control block diagram of the second embodiment. The same components as in FIG. 10 of the first embodiment are denoted by the same reference signs. Components different from the first embodiment are mainly described. A vehicle controller 91 executes a control using a program corresponding to the control block diagram and a flow chart (to be described later). For example, the vehicle controller 91 is configured by a microcomputer including a central processing unit (CPU), a read only memory (ROM), a random access memory (RAM) and an input/output interface (I/O interface). It is also possible to configure the vehicle controller 91 by a plurality of microcomputers. A memory of the vehicle controller 91 stores reference tables (or reference maps) and the program to be described later.

In FIG. 23, a basic drive force calculation unit 71 is composed of a virtual drive force calculation unit 72 and a basic drive force calculation unit 73.

Figure 24:
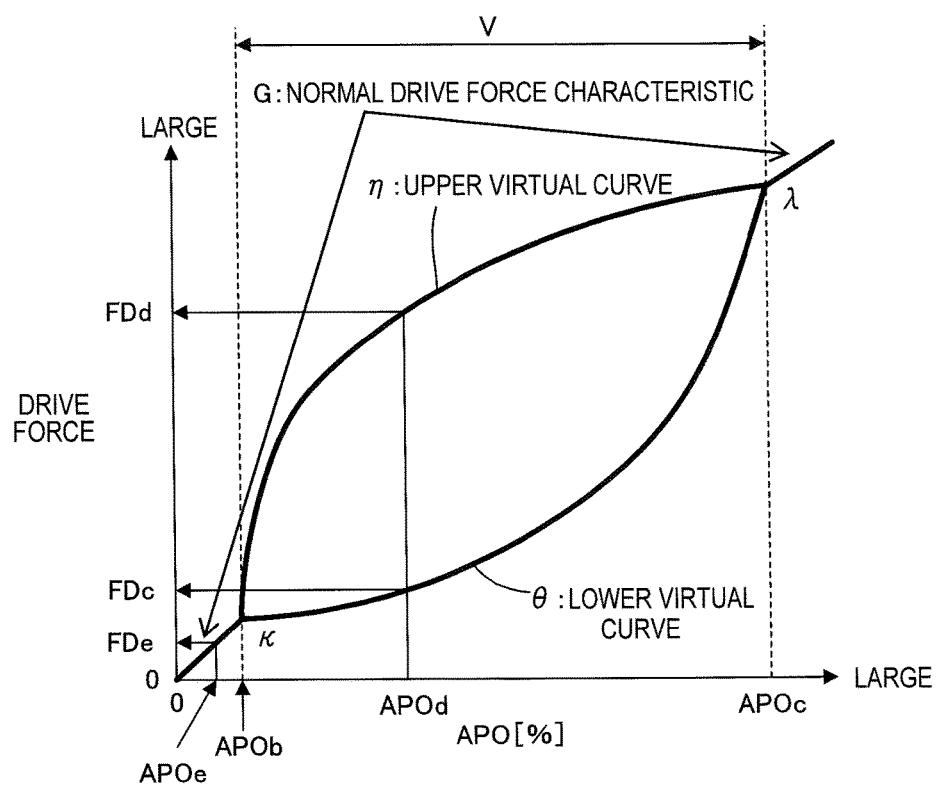
FIG. 24 is a drive force characteristic diagram having two values in a predetermined range of the accelerator pedal opening.

The basic drive force calculation unit 72 calculates a value on the lower virtual curve θ and a value on the upper virtual curve η if the accelerator pedal opening APO is in the predetermined accelerator pedal opening range V (APOb<APO<APOc) by retrieving a reference table with the contents of FIG. 24 based on the accelerator pedal opening APO. For example, if the accelerator pedal opening APO is a predetermined value APOd, a first virtual drive force FDc [N] as a value on the lower virtual curve θ and a second virtual drive force FDd [N] as a value on the upper virtual curve η are calculated. The reference table (FIG. 24) defining a relationship between the accelerator pedal opening APO and the drive force (including the first virtual drive force FDc and the second virtual drive force FDd) is stored in the memory of the vehicle controller 91.

On the other hand, the drive force is calculated from the normal drive force characteristic G as a linear characteristic if the accelerator pedal opening APO is not larger than the predetermined APOb and if the accelerator pedal opening APO is not smaller than the predetermined APOc (if the accelerator pedal opening APO is in a region outside the predetermined accelerator pedal opening range V). For example, a drive force FDe [N] is calculated if the accelerator pedal opening APO is a predetermined value APOe. The linear characteristic is the normal opening characteristic G. FIG. 24 shows basically the same characteristic as FIG. 22.

The basic drive force calculation unit 73 calculates the basic drive force tFdrv0 [N] by the following equation using the values FDc, FDd of the above two virtual drive forces and a correction amount HOS from a correction amount calculation unit 51 if the accelerator pedal opening APO is in the predetermined accelerator pedal opening range V (APOb<APO<APOc).

$$tFdrv0 = (FDd - FDc) \times HOS/100 + FDc \quad (19)$$

The equation (19) sets a value calculated by interpolating the values (FDd, FDc) of two upper and lower virtual drive forces at the same accelerator pedal opening APO using the correction amount HOS as the basic drive force as shown in FIG. 22. By the equation (19), the basic drive force tFdrv0 increases with an increase in the correction amount HOS on the condition that the accelerator pedal opening APO is the same. As just described, the basic drive force calculation unit 73 can obtain the basic drive force tFdrv0 from the correction amount HOS and the reference table of FIG. 24 in the same manner as the basic drive force tFdrv0 is obtained from the reference tables of FIGS. 20 and 21 while reducing the memory capacity.

On the other hand, the basic drive force calculation unit 73 sets the value of the above drive force FDe as it is as the basic drive force tFdrv0 [N] if the accelerator pedal opening APO is not larger than the predetermined APOb and if the accelerator pedal opening APO is not smaller than the predetermined APOc (if the accelerator pedal opening APO is in a region outside the predetermined accelerator pedal opening range V).

Figure 25:
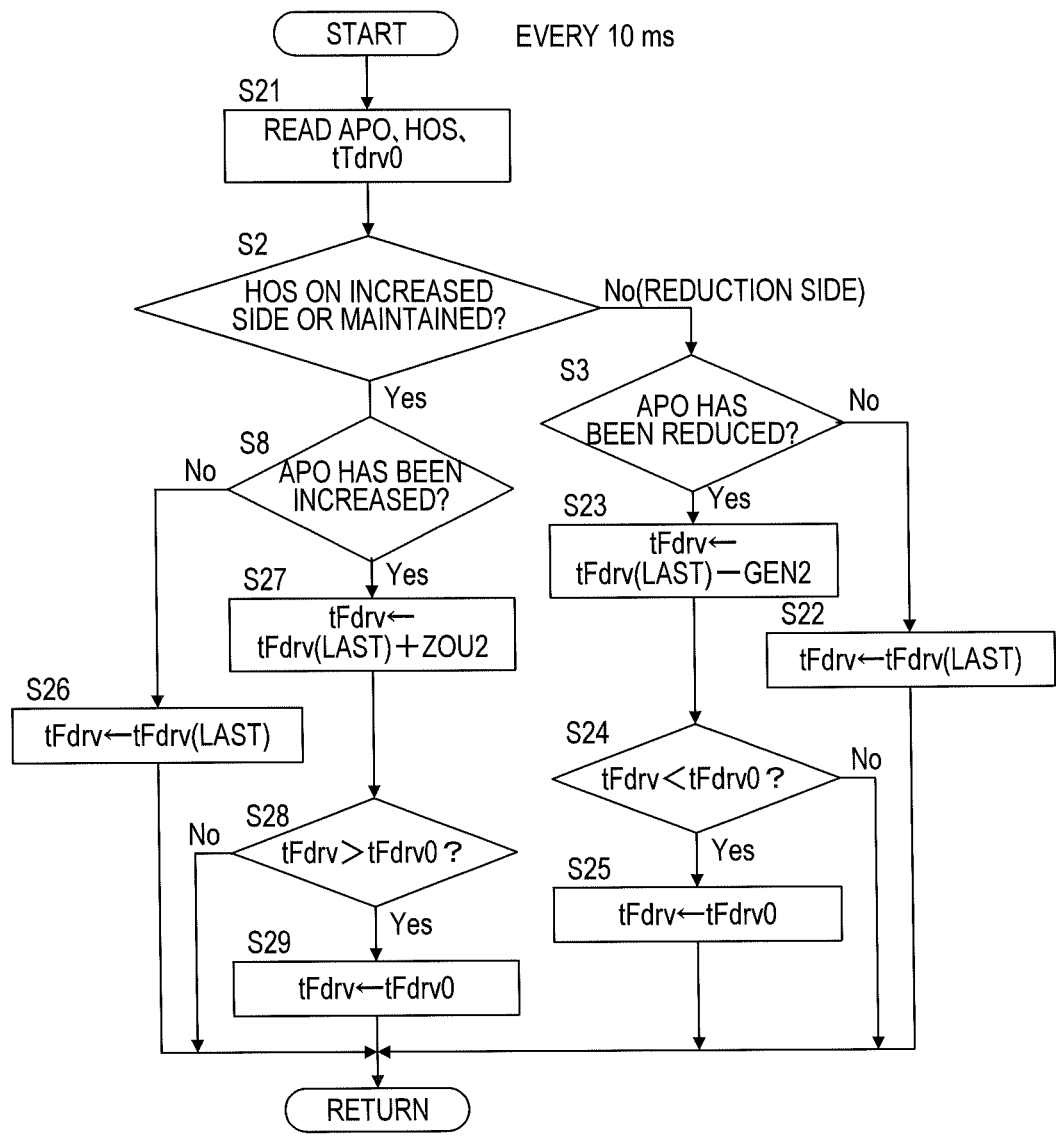
FIG. 25 is a flow chart showing the calculation of a target throttle opening according to the second embodiment.

A flow chart of FIG. 25 is for calculating a target drive force tFdrv and the vehicle controller 91 executes a control of the flow chart at regular time intervals (e.g. every 10 ms). The same parts as in FIG. 17 of the first embodiment are denoted by the same Step numbers. Parts different from the first embodiment are mainly described.

In Step 21, the accelerator pedal opening APO, the correction amount and the basic drive force tFdrv0 are read. The correction amount HOS and the basic drive force tFdrv0 are already calculated in FIG. 23.

In Steps 2, 3, whether or not the correction amount HOS is on an increase side, on a reduction side or maintained is determined.

If the correction amount HOS is on the reduction side, a transition is made from Step 2 to Step 3 to determine whether or not the accelerator pedal opening APO has been reduced. A transition is made from Step 3 to Step 22 to set the value of tFdrv (last), which is the last value of the target drive force, as it is as the target drive force tFdrv [N] if the accelerator pedal opening APO has been maintained or increased although the correction amount HOS is on the reduction side. The operation of Step 22 is repeated to maintain the target drive force tFdrv if the accelerator pedal opening APO has been maintained or increased although the correction amount HOS is on the reduction side.

On the other hand, if the accelerator pedal opening APO has been reduced in Step 3, Step 23 follows and the target drive force tFdrv is reduced by a reduction amount GEN2 [N] by the following equation.

$$tFdrv = tFdrv(\text{last}) - GEN2 \tag{20}$$

tFdrv (last) is the last value of tFdrv and GEN2 is the reduction amount. The reduction amount GEN2 of the equation (20) is suitably determined in advance.

In Step 24, the target drive force tFdrv and the basic drive force tFdrv0 are compared. The process this time is finished by skipping Step 25 unless the target drive force tFdrv is below the basic drive force tFdrv0.

On the other hand, if the target drive force tFdrv is below the basic drive force tFdrv0 in Step 24, Step 25 follows and the target drive force tFdrv is limited to the basic drive force tFdrv0.

If the correction amount HOS is on the increase side or maintained, Step 8 follows and whether or not the accelerator pedal opening APO has been increased is determined. A transition is made from Step 8 to Step 26 to set the value of tFdrv (last), which is the last value of the target drive force, as it is as the target drive force tFdrv [N] if the accelerator pedal opening APO has been maintained or reduced although the correction amount HOS is on the increase side. The operation of Step 26 is repeated to maintain the target drive force tFdrv if the accelerator pedal opening APO has been maintained or reduced although the correction amount HOS is on the increase side.

On the other hand, if the accelerator pedal opening APO has been increased in Step 8, Step 27 follows and the target drive force tFdrv is increased by an increase amount ZOU2 [N] by the following equation.

$$tFdrv = tFdrv(\text{last}) + ZOU2 \tag{21}$$

tFdrv (last) is the last value of tFdrv and ZOU2 is the increase amount. The increase amount ZOU2 of the equation (21) is suitably determined in advance.

In Step 28, the target drive force tFdrv and the basic drive force tFdrv0 are compared. The process this time is finished by skipping Step 29 unless the target drive force tFdrv is above the basic drive force tFdrv0.

On the other hand, if the target drive force tFdrv is above the basic drive force tFdrv0 in Step 28, Step 29 follows and the target drive force tFdrv is limited to the basic drive force tFdrv0.

FIG. 27 is the control block diagram of the entire control system of the second embodiment targeted at the electric vehicle. The electric vehicle includes a motor 81 for driving rear wheels or front wheels and the inverter 82 for supplying a current to this motor 81 as shown in FIG. 27. The vehicle controller 91 (constant-speed drive force characteristic setting means, inverter control means) includes the correction amount calculation unit 51, the basic drive force calculation unit 71, a target drive force calculation unit 92 and a current value calculation unit 93. The details of the correction amount calculation unit 51 and the basic drive force calculation unit 71 in FIG. 27 are shown in FIG. 23. Further, the detail of the target drive force calculation unit 91 is shown in the flow chart of FIG. 25.

In FIG. 27, the current value calculation unit 93 calculates a command current value of a current to be supplied to the motor 81 in proportion to the target drive force tFdrv and outputs this command current value to the inverter 82.

FIG. 28 is the control block diagram of the entire control system of the second embodiment targeted at the hybrid vehicle. Since the hybrid vehicle includes an engine, a throttle valve 11 and a throttle actuator 12 are provided in addition to the motor 81 and the inverter 82 as shown in FIG. 28. The vehicle controller 91 includes a drive force distribution unit 95 and a throttle opening calculation unit 96 in addition to the correction amount calculation unit 51, the basic drive force calculation unit 71, the target drive force calculation unit 92 and the current value calculation unit 93. The details of the correction amount calculation unit 51 and the basic drive force calculation unit 71 in FIG. 28 are shown in FIG. 23. Further, the detail of the target drive force calculation unit 92 is shown in the flow chart of FIG. 25.

In FIG. 28, if all the target drive force cannot be covered by a motor drive force, the drive force distribution unit 95 distributes a differential drive force to the engine. The throttle opening calculation unit 96 calculates a throttle opening at which the engine generates the differential drive force, and outputs a command value corresponding to the calculated throttle opening to the throttle actuator 12.

According to the second embodiment, the electric or hybrid vehicle as an alternative to the vehicle with the gasoline engine includes the motor 81 capable of adjusting the drive force of the vehicle and the inverter 82 for driving this motor 81 according to a control amount. The vehicle controller 91 (constant-speed drive force characteristic setting means) sets the constant-speed drive force characteristic α. The constant-speed drive force characteristic α is composed of the drive force characteristic β (second drive force characteristic) and the drive force characteristic γ (third drive force characteristic). The normal drive force characteristic G (first drive force characteristic) is a characteristic of the drive force necessary for constant speed running and represented by a polygonal line approximate to a straight line of an increasing function (or one straight line) on a plane with two axes of the accelerator pedal opening and the drive force. The drive force characteristic β (second drive force characteristic) has a smaller gradient than that of the polygonal line approximate to the straight line in the predetermined accelerator pedal opening range F on a side larger than the point H (predetermined point) on the normal drive force characteristic G as the base point. The drive force characteristic γ (third drive force characteristic) becomes an increasing function with a larger gradient than the drive force characteristic β (second drive force characteristic) and returns to the normal drive force characteristic G in a region where the accelerator pedal opening is larger than in the predetermined accelerator pedal opening range F. The vehicle controller 91 (inverter control means) controls the inverter 82 during constant speed running using the normal drive force characteristic G and the constant-speed drive force characteristic α set by the constant-speed drive force characteristic setting means. Unnecessary acceleration and deceleration of a driver to maintain the constant speed are suppressed by setting the second drive force characteristic having a smaller gradient than that of the straight line or the polygonal line of the first drive force characteristic, i.e. the second drive force characteristic in which the vehicle speed is easily adjusted, in the accelerator pedal opening range. Thus, fuel economy can be improved during steady running in which the constant speed is targeted.

According to the second embodiment, an output control device includes a plurality of constant-speed drive force characteristics α1 to α4 in which the point H (predetermined point) is shifted to the larger side of the accelerator pedal opening and the larger side of the drive force on the normal drive force characteristic G (first drive force characteristic) with an increase in the vehicle speed with the width of the predetermined accelerator pedal opening range F kept constant. The output control device includes the vehicle speed sensor 47 (vehicle speed detection means) for detecting the vehicle speed and selects the constant-speed drive force characteristic corresponding to the vehicle speed detected by this vehicle speed sensor 47 from the plurality of constant-speed drive force characteristics α1 to α4. The output control device controls the inverter 82 during steady running in which the detected vehicle speed is targeted, using the selected constant-speed drive force characteristic and the normal drive force characteristic G. Thus, even if the targeted vehicle speed differs during steady running, fuel economy can be improved during each steady running since a drive force characteristic β1 to β4 in which the vehicle speed is easily adjusted is set for each vehicle speed.

According to the second embodiment, the output control device includes a plurality of constant-speed drive force characteristics α1, α5 and α6 in which the point H (predetermined point) is shifted to the larger side of the accelerator pedal opening and the larger side of the drive force on the normal drive force characteristic G (first drive force characteristic) with an increase in the road surface gradient of the uphill road with the width of the predetermined accelerator pedal opening range F kept constant. The output control device includes a road surface gradient estimation means (navigation system and vehicle controller 91) for estimating the road surface gradient of the uphill road on which the vehicle is running. The output control device selects the constant-speed drive force characteristic corresponding to the magnitude of the road surface gradient estimated by this road surface gradient estimation means from the plurality of constant-speed drive force characteristics α1, α5 and α6. The output control device controls the inverter 82 during steady running at the estimated road surface gradient using the selected constant-speed drive force characteristic and the normal drive force characteristic G. Thus, even if the road surface gradient differs during uphill running in which a constant speed is targeted, fuel economy can be improved during each uphill running since a second opening characteristic β1, β5, β6 in which the vehicle speed is easily adjusted is set for each road surface gradient of the uphill road.

Third Embodiment

Figure 29:
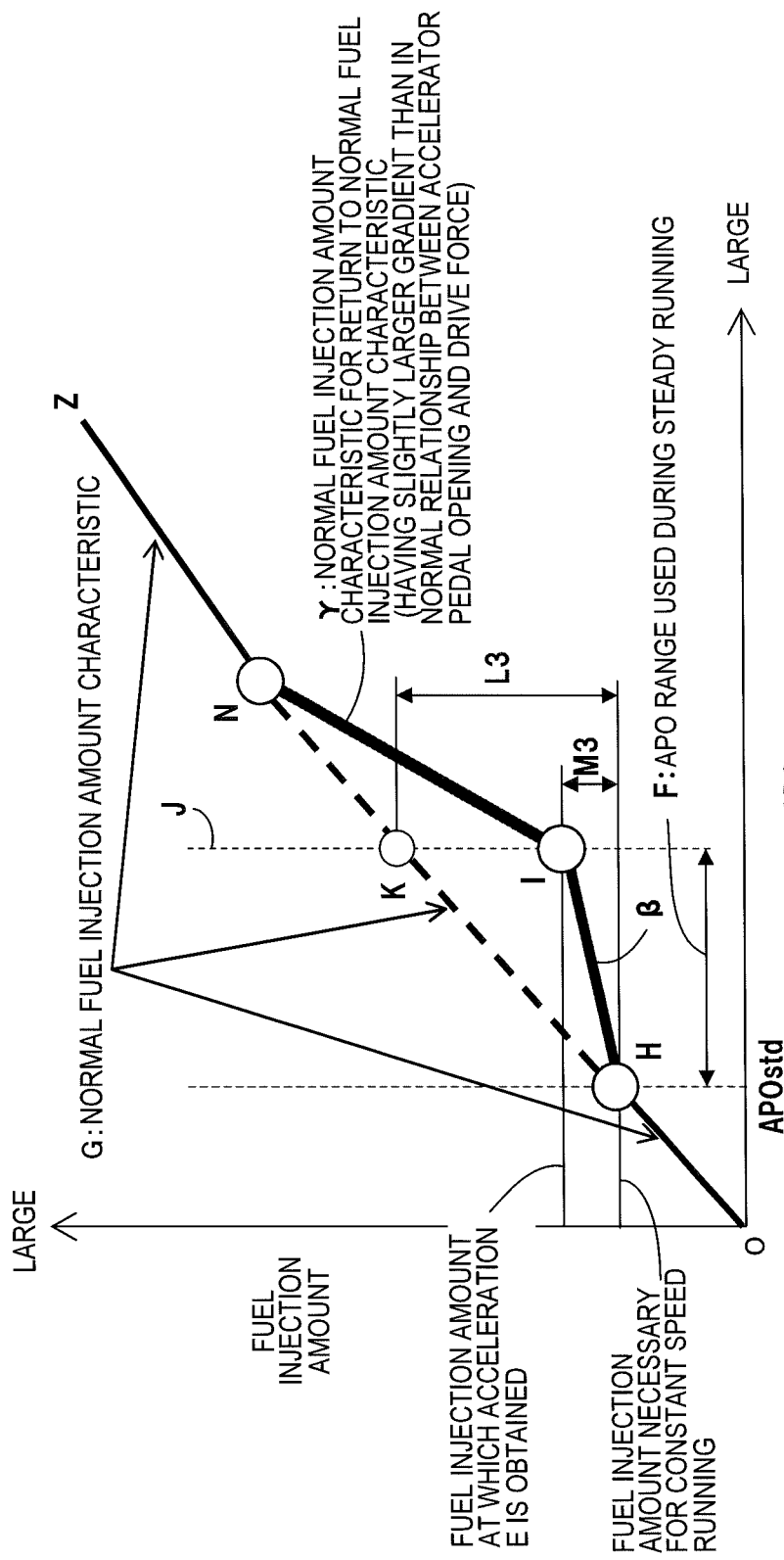
FIG. 29 is a characteristic diagram of fuel injection amount in relation to accelerator pedal opening according to a third embodiment.
Figure 30:
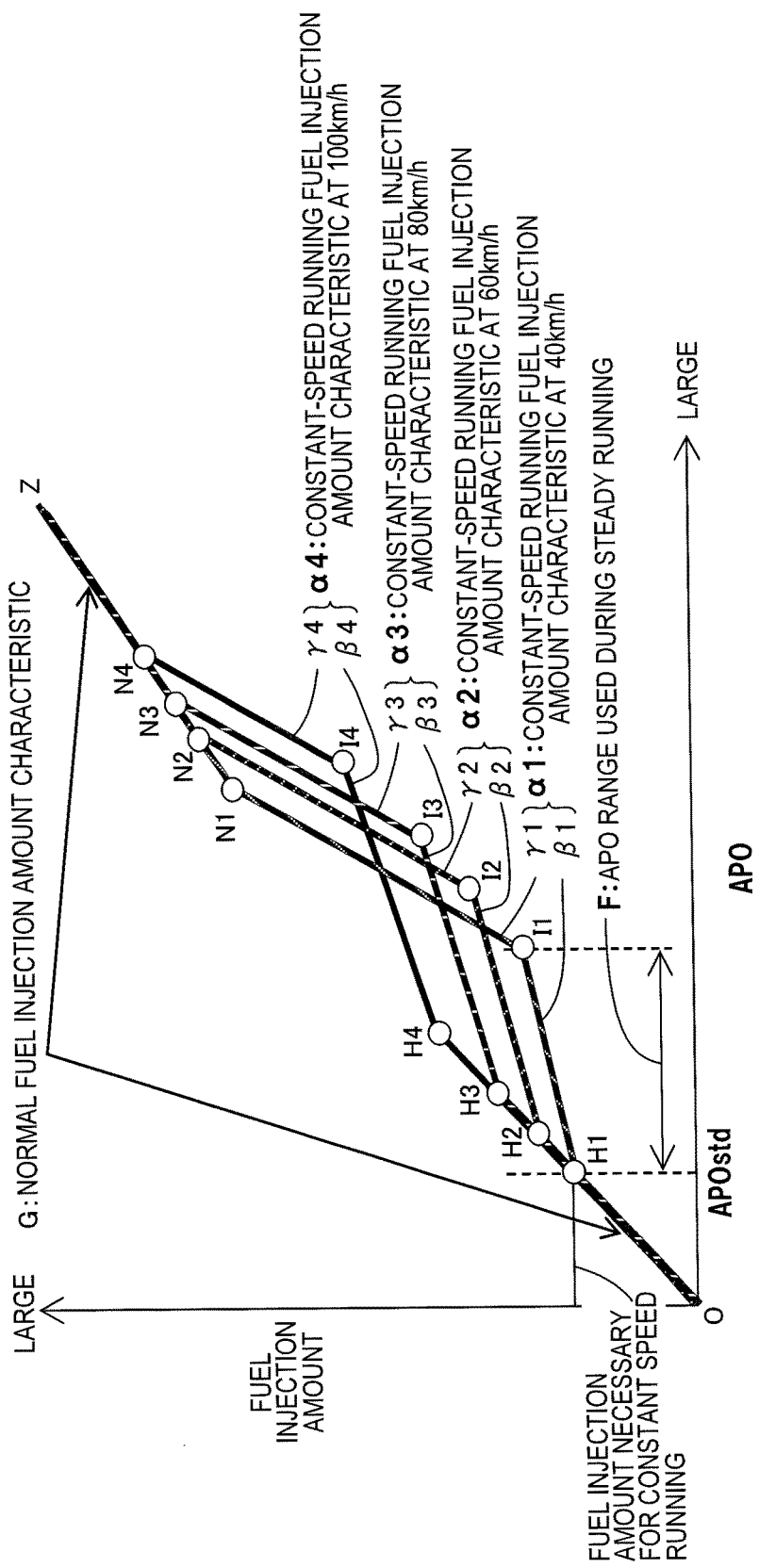
FIG. 30 is a characteristic diagram of fuel injection amount in relation to accelerator pedal opening at each vehicle speed according to the third embodiment.
Figure 31:
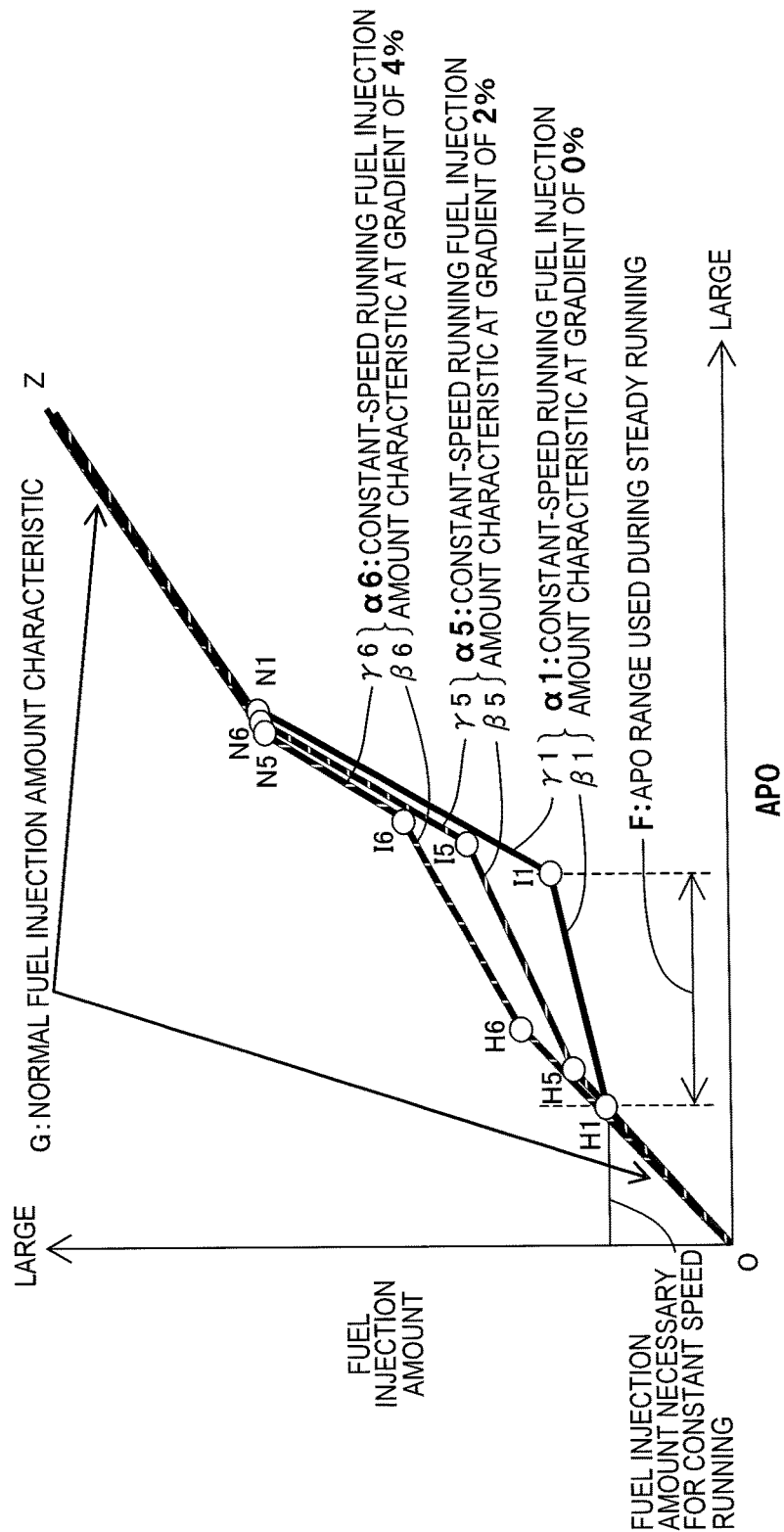
FIG. 31 is a characteristic diagram of fuel injection amount in relation to accelerator pedal opening at each road surface gradient during uphill running according to the third embodiment.

FIG. 29 is a characteristic diagram of fuel injection amount in relation to accelerator pedal opening according to a third embodiment, FIG. 30 is a characteristic diagram of fuel injection amount in relation to accelerator pedal opening at each vehicle speed according to the third embodiment, and FIG. 31 is a characteristic diagram of fuel injection amount in relation to accelerator pedal opening at each road surface gradient during uphill road running according to the third embodiment. The same parts as in FIGS. 3, 4 and 7 of the first embodiment are shown in a similar manner.

The first embodiment is targeted at the gasoline engine vehicle. The third embodiment is targeted at a diesel engine vehicle. In the gasoline engine, the parameter for controlling the output is the throttle opening. However, in the diesel engine vehicle, the throttle opening is replaced by a fuel injection amount. Thus, in the third embodiment, the throttle opening has only to be replaced by the fuel injection amount as shown in FIGS. 29, 30 and 31.

In FIG. 29, a characteristic of a drive force necessary for constant speed running represented by a polygonal line approximate to a straight line of an increasing function (or one straight line) is set as a normal fuel injection amount characteristic G (first fuel injection amount characteristic). A fuel injection amount characteristic β (second fuel injection amount characteristic) having a smaller gradient than that of the polygonal line approximate to the straight line in a predetermined accelerator pedal opening range F is set on a side larger than a point H on this normal fuel injection amount characteristic G as a base point. Further, a fuel injection amount characteristic γ (third fuel injection amount characteristic) is set which becomes an increasing function having a larger gradient than the fuel injection amount characteristic β (second fuel injection amount characteristic) and returns to the normal fuel injection amount characteristic G in a region where the accelerator pedal opening is larger than in the predetermined accelerator pedal opening range F. A constant-speed fuel injection amount characteristic α is composed of these fuel injection amount characteristics β, γ. In the diesel engine vehicle, a fuel injector 101 (see FIG. 32) is controlled during steady running using the normal fuel injection amount characteristic G and this constant-speed fuel injection amount characteristic α. Here, in FIG. 29, a polygonal line G approximate to a straight line which passes through an origin O, becomes an increasing function and reaches a point Z is a characteristic representing a normal relationship between the accelerator pedal opening and the fuel injection amount. In the third embodiment, this characteristic is referred to as a "normal fuel injection amount characteristic".

In FIG. 30, there are a plurality of constant-speed fuel injection amount characteristics (α1 to α4) in which the point H is shifted to a larger side of the accelerator pedal opening and a larger side of the throttle opening on the normal fuel injection amount characteristic G with an increase in a vehicle speed with a width of the predetermined accelerator pedal opening range F kept constant. In the third embodiment, the constant-speed fuel injection amount characteristic corresponding to the vehicle speed detected by a vehicle speed sensor 47 is selected from the plurality of constant-speed fuel injection amount characteristics (α1 to α4) and the fuel injector 101 is controlled during steady running in which the detected vehicle speed is targeted, using the selected constant-speed fuel injection amount characteristic and the normal fuel injection amount characteristic G.

In FIG. 31, there are a plurality of constant-speed fuel injection amount characteristics α1, α5 and α6 in which the point H is shifted to the larger side of the accelerator pedal opening and the larger side of the throttle opening on the normal fuel injection amount characteristic G with an increase in a road surface gradient of an uphill road with the width of the predetermined accelerator pedal opening range F kept constant. The constant-speed fuel injection amount characteristic corresponding to the magnitude of an estimated road surface gradient is selected from the plurality of constant-speed fuel injection amount characteristics and the fuel injector 101 is controlled during steady running at the estimated road surface gradient using the selected constant-speed fuel injection amount characteristic and the normal fuel injection amount characteristic G.

Figure 32:
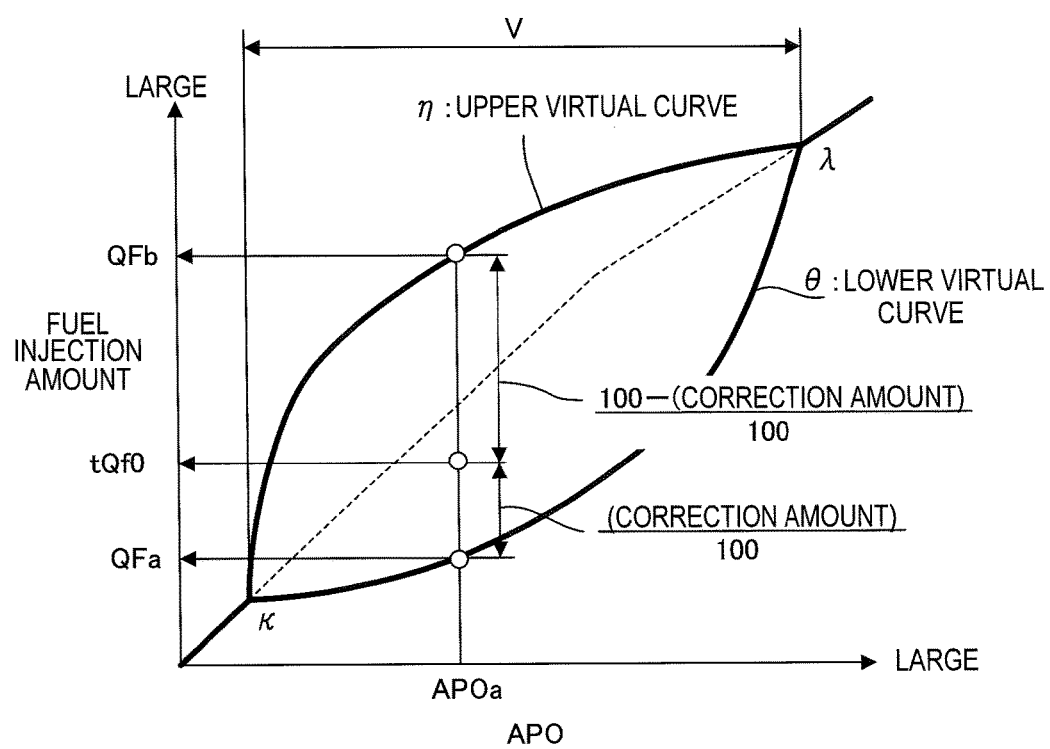
FIG. 32 is a drive force characteristic diagram having two values in a predetermined range of the accelerator pedal opening.

Also in the third embodiment, a characteristic including an upper virtual curve η and a lower virtual curve θ and having the values of two virtual fuel injection amounts for one accelerator pedal opening in a predetermined accelerator pedal opening range V is obtained as shown in FIG. 32. Further, the normal fuel injection amount characteristic G is used in regions of the accelerator pedal opening up to a point κ and from a point λ (regions outside the predetermined accelerator pedal opening range V). These two fuel injection amount characteristics constitute one leaf-like fuel injection amount characteristic as a whole.

The fuel injection amount is calculated as follows using the fuel injection amount characteristic having a leaf-like shape as a whole. For example, if the accelerator pedal opening is a predetermined value APOa, a value QFa of a virtual fuel injection amount on the lower virtual curve θ and a value QFb of a virtual fuel injection amount on the upper virtual curve η are obtained from APOa using the leaf-like opening characteristic shown in FIG. 32. From these two values QFa, QFb of the virtual fuel injection amounts and a correction amount, a basic fuel injection amount tQf0 is calculated by the following equation.

$$tQf0=(QFb-QFa)\times \text{correction amount}/100+QFa \quad (22)$$

Figure 33:
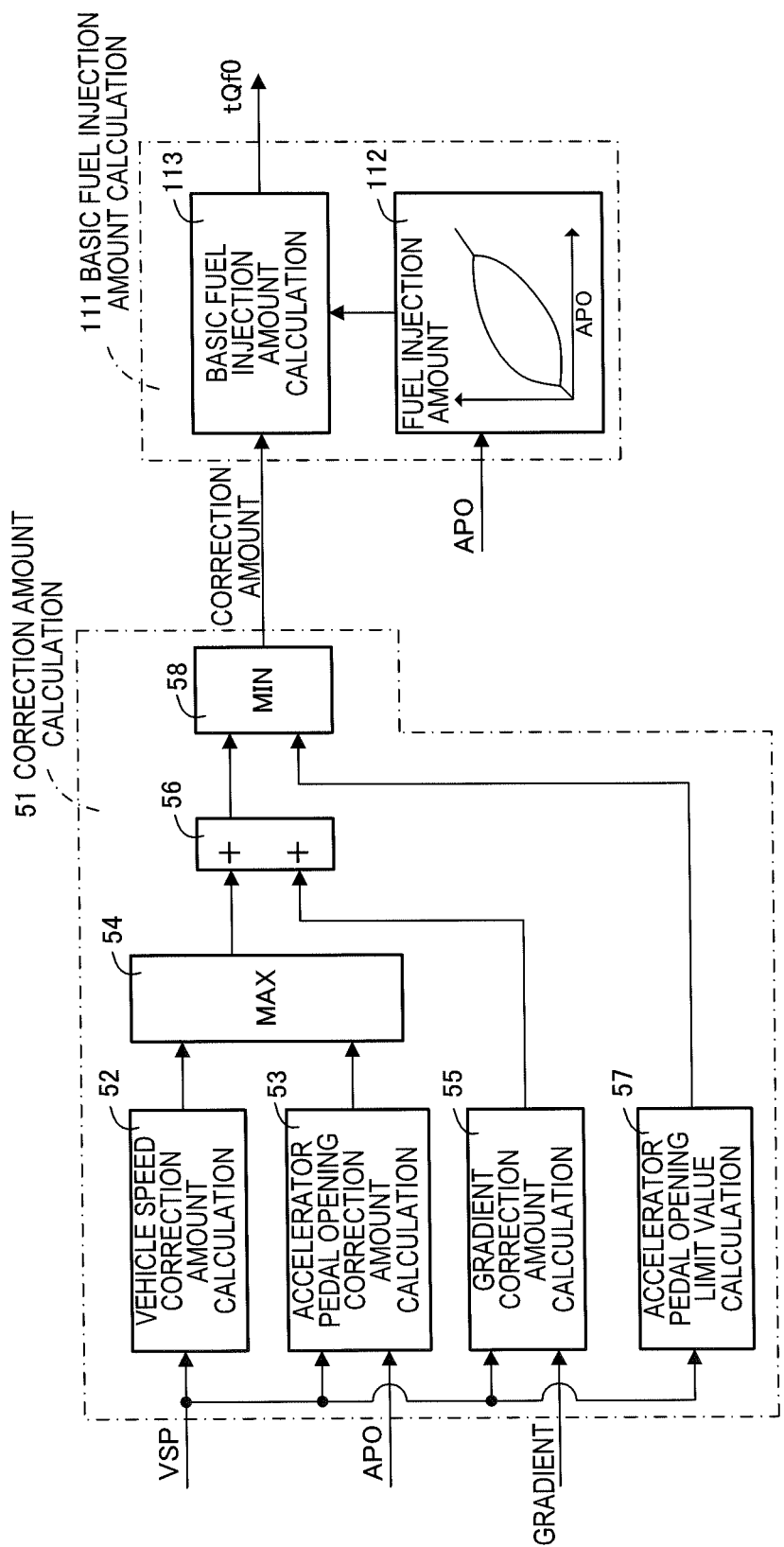
FIG. 33 is a control block diagram of the third embodiment.

FIG. 33 is a control block diagram of the third embodiment. The same components as in FIG. 10 of the first embodiment are denoted by the same reference signs. Components different from the first embodiment are mainly described. An engine controller 121 executes a control using a program corresponding to the control block diagram and a flow chart (to be described later). For example, the engine controller 121 is configured by a microcomputer including a central processing unit (CPU), a read only memory (ROM), a random access memory (RAM) and an input/output interface (I/O interface). It is also possible to configure the engine controller 121 by a plurality of microcomputers. A memory of the engine controller 121 stores reference tables (or reference maps) and the program to be described later.

In FIG. 33, a basic fuel injection amount calculation unit 111 is composed of a virtual fuel injection amount calculation unit 112 and a basic fuel injection amount calculation unit 113.

Figure 34:
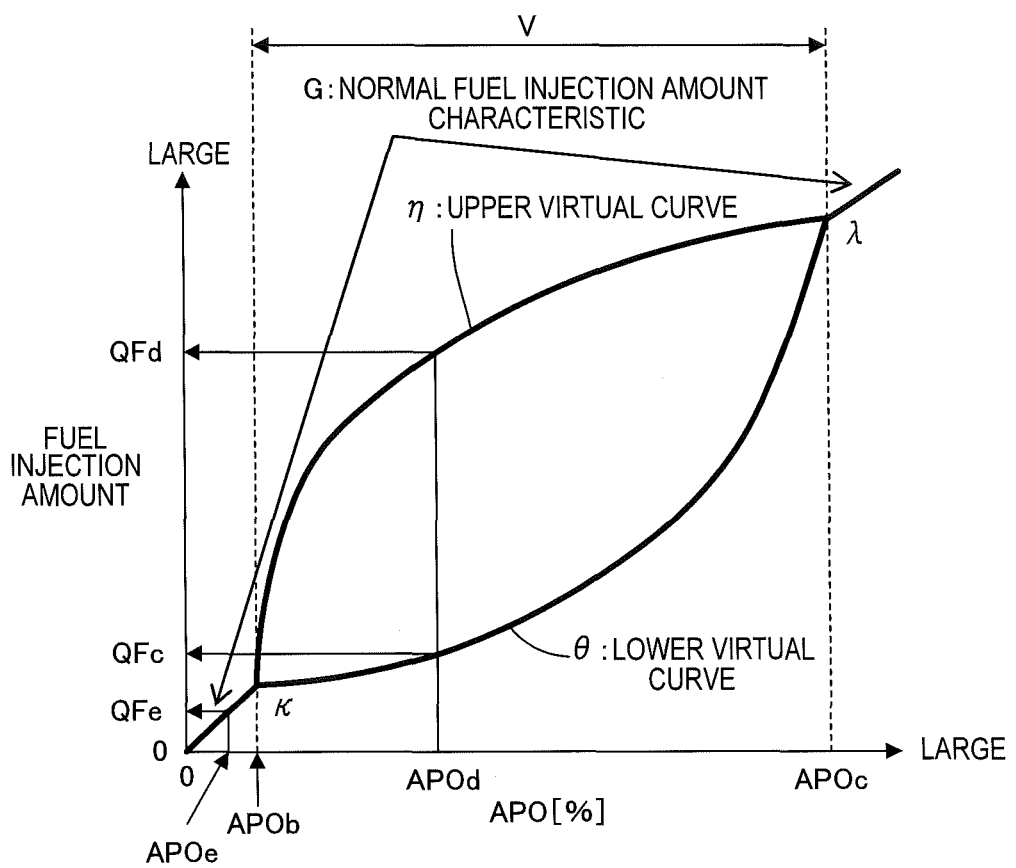
FIG. 34 is a drive force characteristic diagram having two values in a predetermined range of the accelerator pedal opening.

The basic fuel injection amount calculation unit 112 calculates a value on the lower virtual curve θ and a value on the upper virtual curve η if the accelerator pedal opening APO is in the predetermined accelerator pedal opening range V (APOb<APO<APOc) by retrieving a reference table with the contents of FIG. 34 based on the accelerator pedal opening APO. For example, if the accelerator pedal opening APO is a predetermined value APOd, a first virtual fuel injection amount QFc [Nm] as a value on the lower virtual curve 8 and a second virtual fuel injection amount QFd [Nm] as a value on the upper virtual curve η are calculated. The reference table (FIG. 34) defining a relationship between the accelerator pedal opening APO and the fuel injection amount (including the first virtual fuel injection amount QFc and the second virtual fuel injection amount QFd) is stored in the memory of the engine controller 121.

On the other hand, the fuel injection amount is calculated from the normal fuel injection amount characteristic G as a linear characteristic if the accelerator pedal opening APO is not larger than the predetermined APOb and if the accelerator pedal opening APO is not smaller than the predetermined APOc (if the accelerator pedal opening APO is in a region outside the predetermined accelerator pedal opening range V). For example, a fuel injection amount QFe [Nm] is calculated if the accelerator pedal opening APO is a predetermined value APOe. The linear characteristic is the normal opening characteristic G. FIG. 34 shows basically the same characteristic as FIG. 32.

The basic fuel injection amount calculation unit 113 calculates the basic fuel injection amount tQf0 [Nm] by the following equation using the values QFc, QFd of the above two virtual fuel injection amounts and a correction amount HOS from a correction amount calculation unit 51 if the accelerator pedal opening APO is in the predetermined accelerator pedal opening range V (APOb<APO<APOc).

$$tQf0=(QFd-QFc)\times HOS/100+QFc \quad (23)$$

The equation (23) sets a value calculated by interpolating the values (QFd, QFc) of two upper and lower virtual fuel injection amounts at the same accelerator pedal opening APO using the correction amount HOS as the basic fuel injection amount as shown in FIG. 32. By the equation (23), the basic fuel injection amount tQf0 increases with an increase in the correction amount HOS on the condition that the accelerator pedal opening APO is the same. As just described, the basic fuel injection amount calculation unit 113 can obtain the basic fuel injection amount tQf0 from the correction amount HOS and the reference table of FIG. 34 in the same manner as the basic fuel injection amount tQf0 is obtained from the reference tables of FIGS. 30 and 31 while reducing the memory capacity.

On the other hand, the basic fuel injection amount calculation unit 113 sets the value of the above fuel injection amount QFe as it is as the basic fuel injection amount tQf0 [Nm] if the accelerator pedal opening APO is not larger than the predetermined APOb and if the accelerator pedal opening APO is not smaller than the predetermined APOc (i.e. if the accelerator pedal opening APO is in a region outside the predetermined accelerator pedal opening range V).

Figure 35:
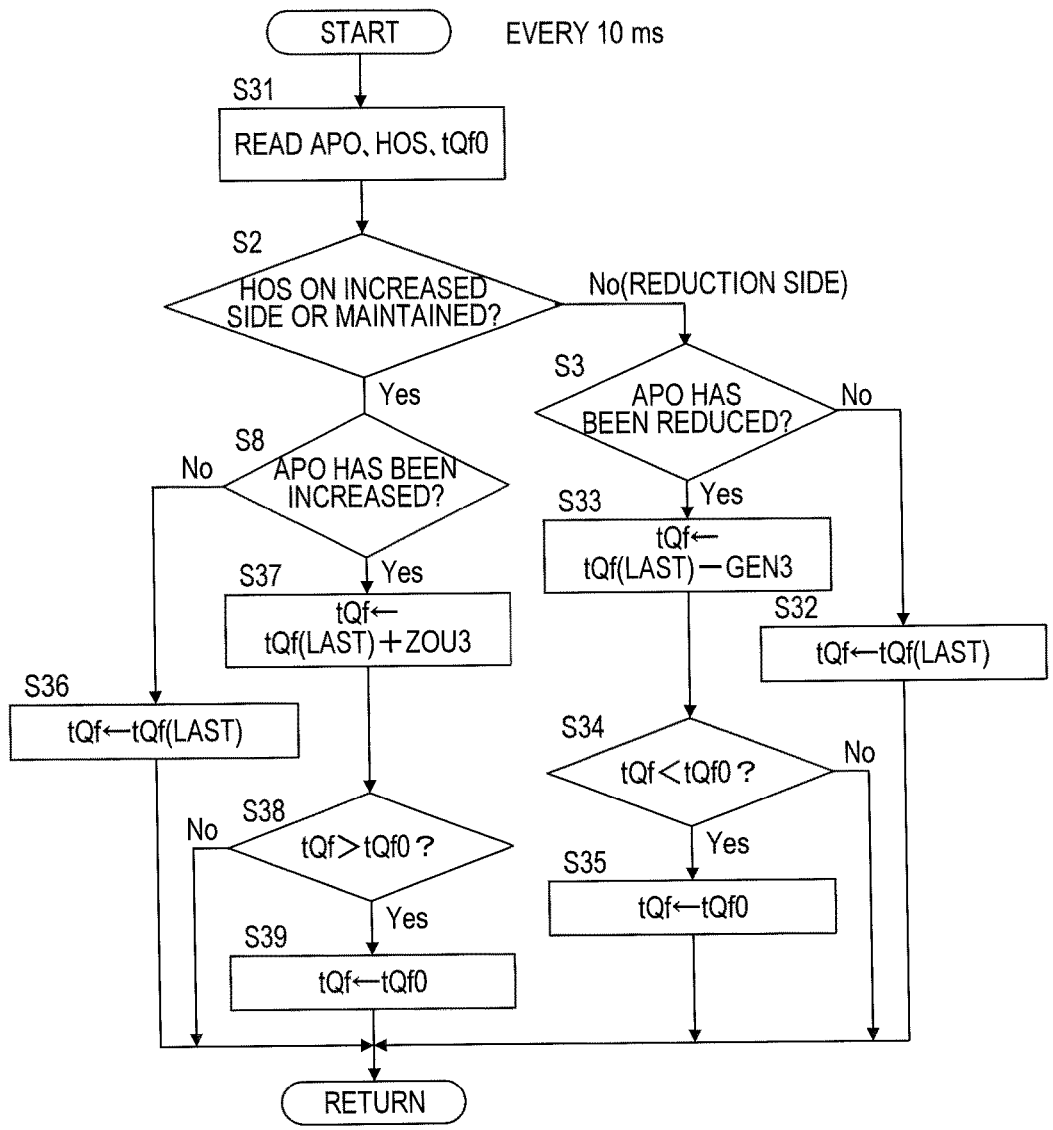
FIG. 35 is a flow chart showing the calculation of a target fuel injection amount according to the third embodiment.

A flow chart of FIG. 35 is for calculating a target fuel injection amount tQf and the engine controller 121 executes a control of the flow chart at regular time intervals (e.g. every 10 ms). The same parts as in FIG. 17 of the first embodiment are denoted by the same Step numbers. Parts different from the first embodiment are mainly described.

In Step 31, the accelerator pedal opening APO, the correction amount and the basic fuel injection amount tQf0 are read. The correction amount HOS and the basic fuel injection amount tQf0 are already calculated in FIG. 33.

In Steps 2, 3, whether or not the correction amount HOS is on an increase side, on a reduction side or maintained is determined.

If the correction amount HOS is on the reduction side, a transition is made from Step 2 to Step 3 to determine whether or not the accelerator pedal opening APO has been reduced. A transition is made from Step 3 to Step 32 to set the value of tQf (last), which is the last value of the target fuel injection amount, as it is as the target fuel injection amount tQf [mg/cycle] if the accelerator pedal opening APO has been maintained or increased although the correction amount HOS is on the reduction side. The operation of Step 32 is repeated to maintain the target fuel injection amount tQf if the accelerator pedal opening APO has been maintained or increased although the correction amount HOS is on the reduction side.

On the other hand, if the accelerator pedal opening APO has been reduced in Step 3, Step 33 follows and the target fuel injection amount tQf is reduced by a reduction amount GEN3 [mg/cycle] by the following equation.

$$tQf=tQf(\text{last})-GEN3 \quad (24)$$

tQf (last) is the last value of tQf and GEN3 is the reduction amount. The reduction amount GEN3 of the equation (24) is suitably determined in advance.

In Step 34, the target fuel injection amount tQf and the basic fuel injection amount tQf0 are compared. The process this time is finished by skipping Step 35 unless the target fuel injection amount tQf is below the basic fuel injection amount tQf0.

On the other hand, if the target fuel injection amount tQf is below the basic fuel injection amount tQf0 in Step 34, Step 35 follows and the target fuel injection amount tQf is limited to the basic fuel injection amount tQf0.

If the correction amount HOS is on the increase side or maintained, Step 8 follows and whether or not the accelerator pedal opening APO has been increased is determined. A transition is made from Step 8 to Step 36 to set the value of tQf (last), which is the last value of the target fuel injection amount, as it is as the target fuel injection amount tQf [mg/cycle] if the accelerator pedal opening APO has been maintained or reduced although the correction amount HOS is on the increase side. The operation of Step 36 is repeated to maintain the target fuel injection amount tQf if the accelerator pedal opening APO has been maintained or reduced although the correction amount HOS is on the increase side.

On the other hand, if the accelerator pedal opening APO has been increased in Step 8, Step 37 follows and the target fuel injection amount tQf is increased by an increase amount ZOU3 [N] by the following equation.

$$tQf=tQf(\text{last})+ZOU3 \quad (25)$$

tQf (last) is the last value of tQf and ZOU3 is the increase amount. The increase amount ZOU3 of the equation (25) is suitably determined in advance.

In Step 38, the target fuel injection amount tQf and the basic fuel injection amount tQf0 are compared. The process this time is finished by skipping Step 39 unless the target fuel injection amount tQf is above the basic fuel injection amount tQf0.

On the other hand, if the target fuel injection amount tQf is above the basic fuel injection amount tQf0 in Step 38, Step 39 follows and the target fuel injection amount tQf is limited to the basic fuel injection amount tQf0.

Figure 36:
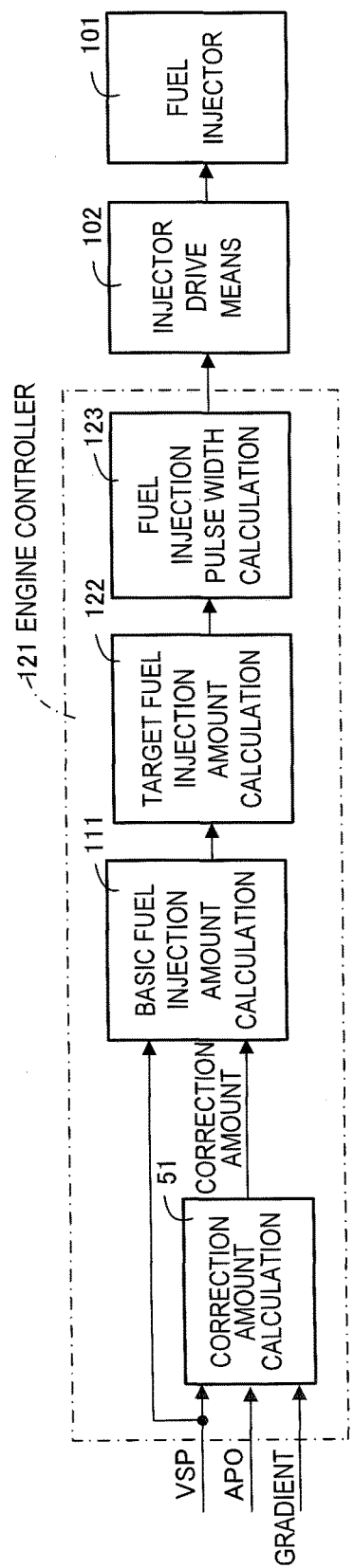
FIG. 36 is a control block diagram of the entire control system of the third embodiment targeted at a diesel engine vehicle.

FIG. 36 is a control block diagram of the entire control system of the third embodiment targeted at the diesel engine vehicle. The same components as in FIG. 26 of the first embodiment are similarly shown. The diesel engine vehicle includes the fuel injectors 101 as shown in FIG. 36. High-pressure fuel from a common rail fuel injection device is distributed and supplied to the fuel injector 101 disposed in each cylinder and an injector drive means 102 drives to open and close the fuel injector 101.

The engine controller 121 (constant-speed fuel injection amount characteristic setting means, drive means control means, constant-speed torque characteristic setting means) includes the correction amount calculation unit 51, the basic fuel injection amount calculation unit 111, a target fuel injection amount calculation unit 122 and a fuel injection pulse width calculation unit 123. The details of the correction amount calculation unit 51 and the basic fuel injection amount calculation unit 111 in FIG. 36 are shown in FIG. 33. Further, the detail of the target fuel injection amount calculation unit 122 is shown in the flow chart of FIG. 35.

In FIG. 36, the fuel injection pulse width calculation unit 123 calculates a fuel injection pulse width of main injection from the target fuel injection amount tQf and a fuel pressure of a common rail and outputs a signal of this fuel injection pulse width to the injector drive means 102.

According to the third embodiment, the diesel engine of the vehicle as an alternative to the vehicle with the gasoline engine includes the fuel injectors 101 capable of adjusting the fuel injection amount into the engine and the injector drive means 102 for controlling the fuel injection amounts from the fuel injectors 101 according to a control amount. The engine controller 121 (constant-speed fuel injection amount characteristic setting means) sets the constant-speed fuel injection amount characteristic $\alpha$. The constant-speed fuel injection amount characteristic $\alpha$ is composed of the fuel injection amount characteristic $\beta$ (second fuel injection amount characteristic) and the fuel injection amount characteristic $\gamma$ (third fuel injection amount characteristic). The normal fuel injection amount characteristic G (first fuel injection amount characteristic) is a characteristic of the fuel injection amount necessary for steady running and represented by a polygonal line approximate to a straight line of an increasing function (or one straight line) on a plane with two axes of the accelerator pedal opening and the fuel injection amount. The fuel injection amount characteristic $\beta$ (second fuel injection amount characteristic) has a smaller gradient than that of the polygonal line approximate to the straight line in the predetermined accelerator pedal opening range F on a side larger than the point H (predetermined point of an accelerator pedal opening APOstd) on the normal fuel injection amount characteristic G as the base point. The fuel injection amount characteristic $\gamma$ (third fuel injection amount characteristic) becomes an increasing function with a larger gradient than the fuel injection amount characteristic $\beta$ (second fuel injection amount characteristic) and returns to the normal fuel injection amount characteristic G in a region where the accelerator pedal opening is larger than in the predetermined accelerator pedal opening range F. The engine controller 121 (drive means control means) controls the injector drive means 102 during steady running using the normal fuel injection amount characteristic G and the constant-speed fuel injection amount characteristic α set by the constant-speed fuel injection amount characteristic setting means. Unnecessary acceleration and deceleration of a driver to maintain the constant speed are suppressed by setting the second fuel injection amount characteristic β having a smaller gradient than that of the polygonal line approximate to the straight line of the normal fuel injection amount characteristic G, i.e. the fuel injection amount characteristic β in which the vehicle speed is easily adjusted, in the accelerator pedal opening range F. Thus, fuel economy can be improved during steady running.

According to the third embodiment, an output control device includes a plurality of constant-speed fuel injection amount characteristics α1 to α4 in which the point H (predetermined point) is shifted to the larger side of the accelerator pedal opening and the larger side of the fuel injection amount on the normal fuel injection amount characteristic G (first fuel injection amount characteristic) with an increase in the vehicle speed with the width of the predetermined accelerator pedal opening range F kept constant. The output control device includes the vehicle speed sensor 47 (vehicle speed detection means) for detecting the vehicle speed and selects the constant-speed fuel injection amount characteristic corresponding to the vehicle speed detected by this vehicle speed sensor 47 from the plurality of constant-speed fuel injection amount characteristics α1 to α4. The output control device controls the injector drive means 102 during steady running in which the detected vehicle speed is targeted, using the selected constant-speed fuel injection amount characteristic and the normal fuel injection amount characteristic G. Thus, even if the targeted vehicle speed differs during steady running, fuel economy can be improved during each steady running since a fuel injection amount characteristic β1 to β4 in which the vehicle speed is easily adjusted is set for each vehicle speed.

According to the third embodiment, the output control device includes a plurality of constant-speed fuel injection amount characteristics α1, α5 and α6 in which the point H (predetermined point) is shifted to the larger side of the accelerator pedal opening and the larger side of the fuel injection amount on the normal fuel injection amount characteristic G with an increase in the road surface gradient of the uphill road with the width of the predetermined accelerator pedal opening range F kept constant. The output control device includes a road surface gradient estimation means (navigation system and engine controller 121) for estimating the road surface gradient of the uphill road on which the vehicle is running. The output control device selects the constant-speed fuel injection amount characteristic corresponding to the magnitude of the road surface gradient estimated by this road surface gradient estimation means from the plurality of constant-speed fuel injection amount characteristics α1, α5 and α6. The output control device controls the injector drive means 102 during steady running at the estimated road surface gradient using the selected constant-speed fuel injection amount characteristic and the normal fuel injection amount characteristic G. Thus, even if the road surface gradient differs during uphill running in which a constant speed is targeted, fuel economy can be improved during each uphill running since a second fuel injection amount characteristic β1, β5, β6 in which the vehicle speed is easily adjusted is set for each road surface gradient of the uphill road.

Fourth Embodiment

Figure 37:
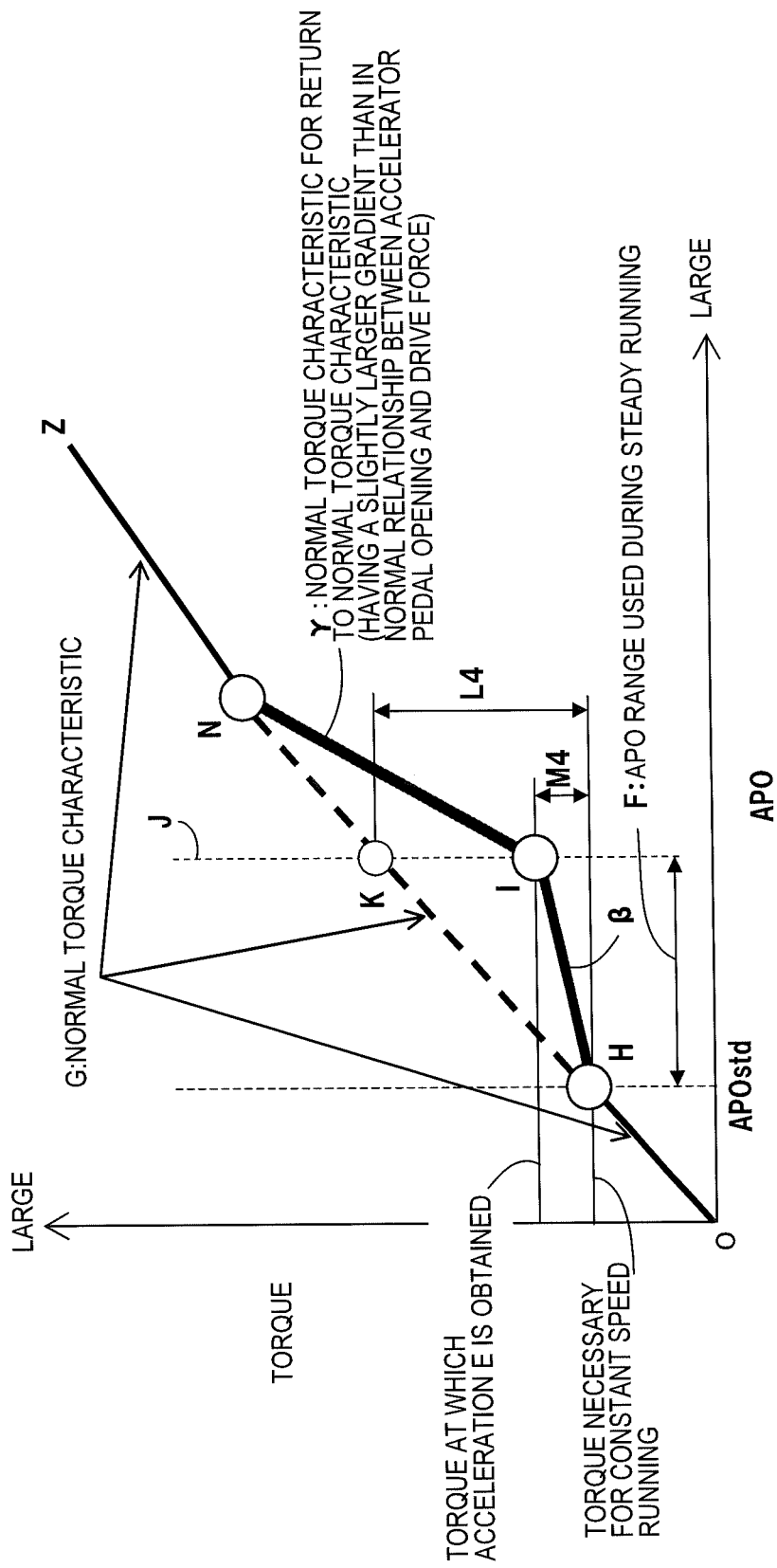
FIG. 37 is a characteristic diagram of torque in relation to accelerator pedal opening according to a fourth embodiment.
Figure 38:
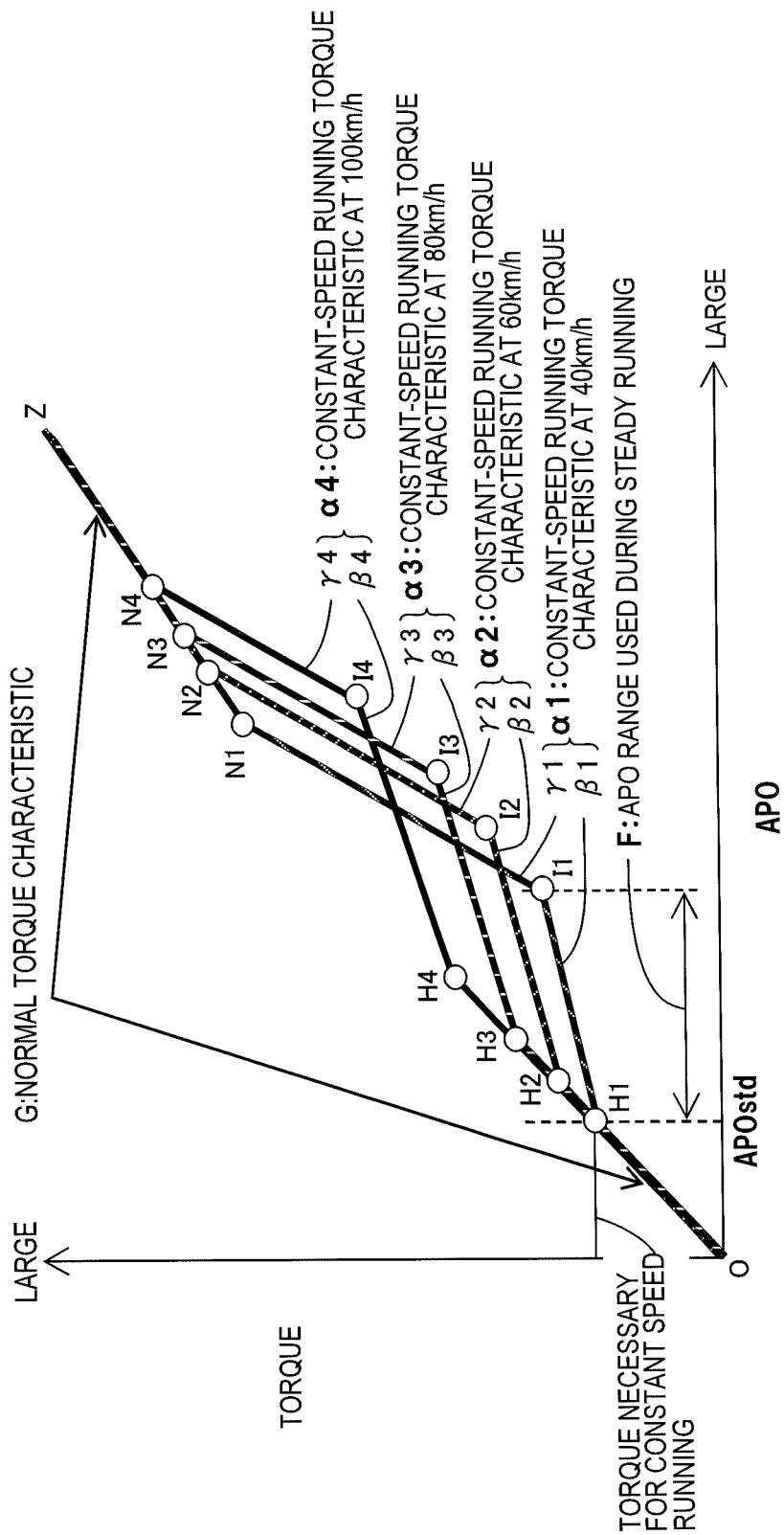
FIG. 38 is a characteristic diagram of torque in relation to accelerator pedal opening at each vehicle speed according to the fourth embodiment.
Figure 39:
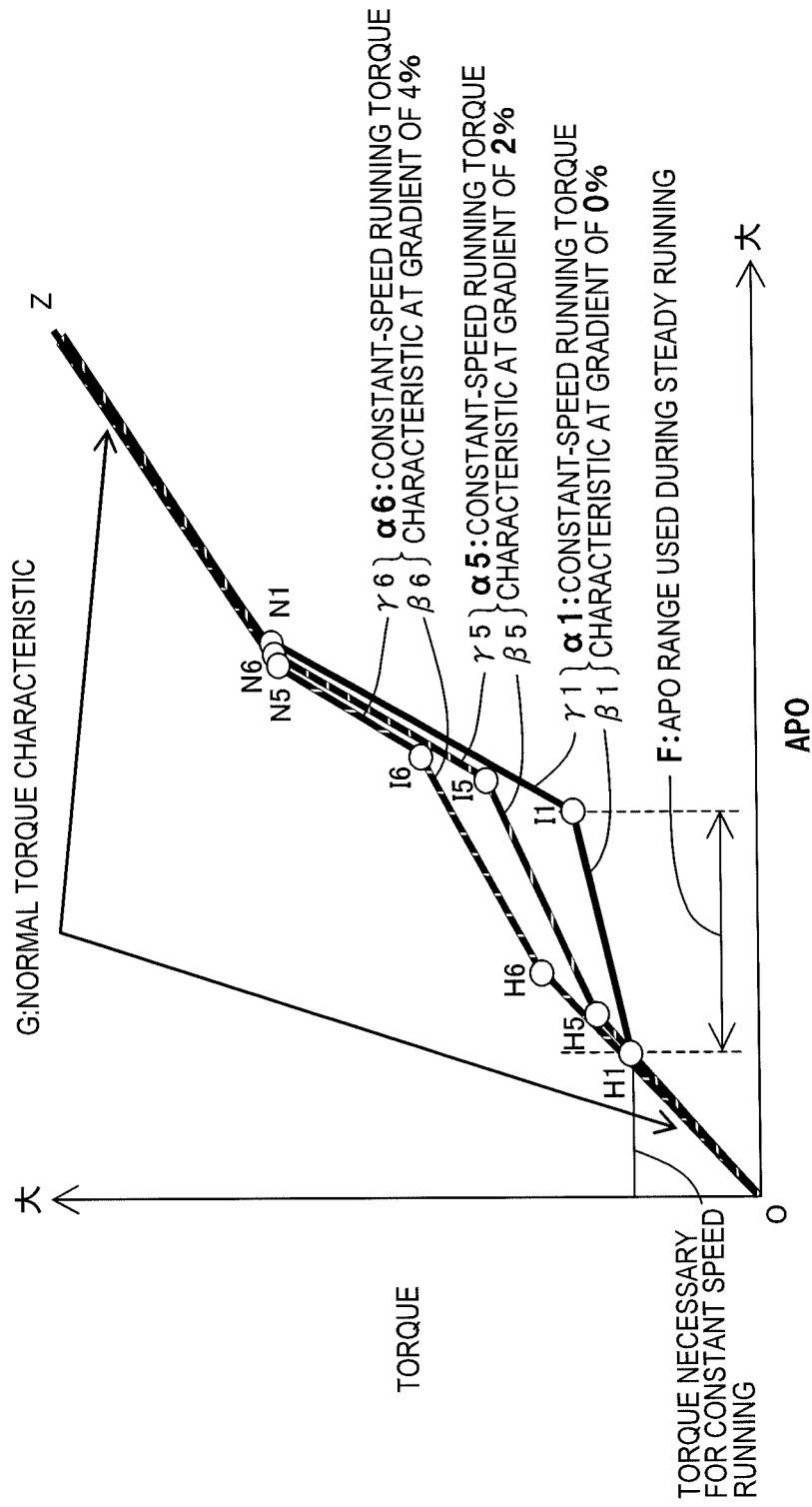
FIG. 39 is a characteristic diagram of torque in relation to accelerator pedal opening at each road surface gradient during uphill running according to the fourth embodiment.

FIG. 37 is a characteristic diagram of torque in relation to accelerator pedal opening according to a fourth embodiment, FIG. 38 is a characteristic diagram of torque in relation to accelerator pedal opening at each vehicle speed according to the fourth embodiment, and FIG. 39 is a characteristic diagram of torque in relation to accelerator pedal opening at each road surface gradient during uphill road running according to the fourth embodiment. The same parts as in FIGS. 3, 4 and 7 of the first embodiment are shown in a similar manner.

The first embodiment is targeted at the gasoline engine vehicle. The fourth embodiment is targeted at a diesel vehicle as in the third embodiment. In the diesel engine of the third embodiment, the parameter for controlling the output is the fuel injection amount. However, in the diesel engine vehicle of the fourth embodiment, the fuel injection amount is replaced by a torque. Thus, in the fourth embodiment, the fuel injection amount has only to be replaced by the torque as shown in FIGS. 37, 38 and 39. The "torque" mentioned here may be a torque generated by the engine or a torque required by the vehicle.

In FIG. 37, a characteristic of a torque necessary for constant speed running represented by a polygonal line approximate to a straight line of an increasing function (or one straight line) is set as a normal torque characteristic G (first torque characteristic). A torque characteristic β (second torque characteristic) having a smaller gradient than that of the polygonal line approximate to the straight line in a predetermined accelerator pedal opening range F is set on a side larger than a point H (point of an accelerator pedal opening APOstd) on this normal torque characteristic G as a base point. Further, a torque characteristic γ (third torque characteristic) is set which becomes an increasing function having a larger gradient than the torque characteristic β (second torque characteristic) and returns to the normal torque characteristic G in a region where the accelerator pedal opening is larger than in the predetermined accelerator pedal opening range F. A constant-speed torque characteristic α is composed of these torque characteristics β, γ. In the diesel engine vehicle, a fuel injector 101 is controlled during steady running using the normal torque characteristic G and this constant-speed torque characteristic α. Here, in FIG. 37, a polygonal line G approximate to a straight line which passes through an origin O, becomes an increasing function and reaches a point Z is a characteristic representing a normal relationship between the accelerator pedal opening and the torque. In the fourth embodiment, this characteristic is referred to as a "normal torque characteristic".

In FIG. 38, there are a plurality of constant-speed torque characteristics (α1 to α4) in which the point H is shifted to a larger side of the accelerator pedal opening and a larger side of the throttle opening on the normal torque characteristic G with an increase in a vehicle speed with a width of the predetermined accelerator pedal opening range F kept constant. In the third embodiment, the constant-speed torque characteristic corresponding to the vehicle speed detected by a vehicle speed sensor 47 is selected from the plurality of constant-speed torque characteristics (α1 to α4) and the fuel injector 101 is controlled during steady running in which the detected vehicle speed is targeted, using the selected constant-speed torque characteristic and the normal torque characteristic G.

In FIG. 39, there are a plurality of constant-speed torque characteristics ($\alpha 1$, $\alpha 5$ and $\alpha 6$) in which the point H is shifted to the larger side of the accelerator pedal opening and the larger side of the throttle opening on the normal torque characteristic G with an increase in a road surface gradient of an uphill road with the width of the predetermined accelerator pedal opening range F kept constant. The constant-speed torque characteristic corresponding to the magnitude of an estimated road surface gradient is selected from the plurality of constant-speed torque characteristics and the fuel injector 101 is controlled during steady running at the estimated road surface gradient using the selected constant-speed torque characteristic and the normal torque characteristic G.

Figure 40:
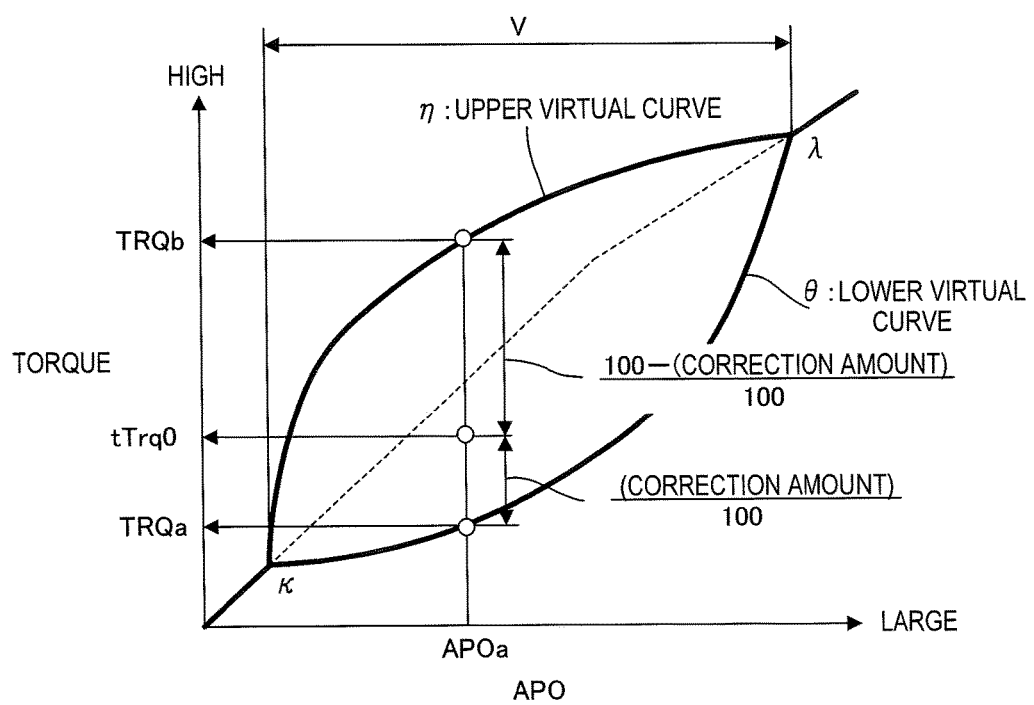
FIG. 40 is a drive force characteristic diagram having two values in a predetermined range of the accelerator pedal opening.

Also in the fourth embodiment, a characteristic including an upper virtual curve $\eta$ and a lower virtual curve and having the values of two virtual torques for one accelerator pedal opening $\theta$ in a predetermined accelerator pedal opening range V is obtained as shown in FIG. 40. Further, the normal torque characteristic G is used in regions of the accelerator pedal opening up to a point $\kappa$ and from a point $\lambda$ (regions outside the predetermined accelerator pedal opening range V). These two torque characteristics constitute one leaf-like torque characteristic as a whole.

The torque is calculated as follows using the torque characteristic having a leaf-like shape as a whole. For example, if the accelerator pedal opening is a predetermined value APOa, a value TRQa of a virtual torque on the lower virtual curve $\theta$ and a value TRQb of a virtual torque on the upper virtual curve $\eta$ are obtained from APOa using the leaf-like opening characteristic shown in FIG. 40. From these two values TRQa, TRQb of the virtual torques and a correction amount, a basic torque tTrq0 is calculated by the following equation.

$$tTrq0 = (TRQb - TRQa) \times \text{correction amount}/100 + TRQa \quad (26)$$

Figure 41:
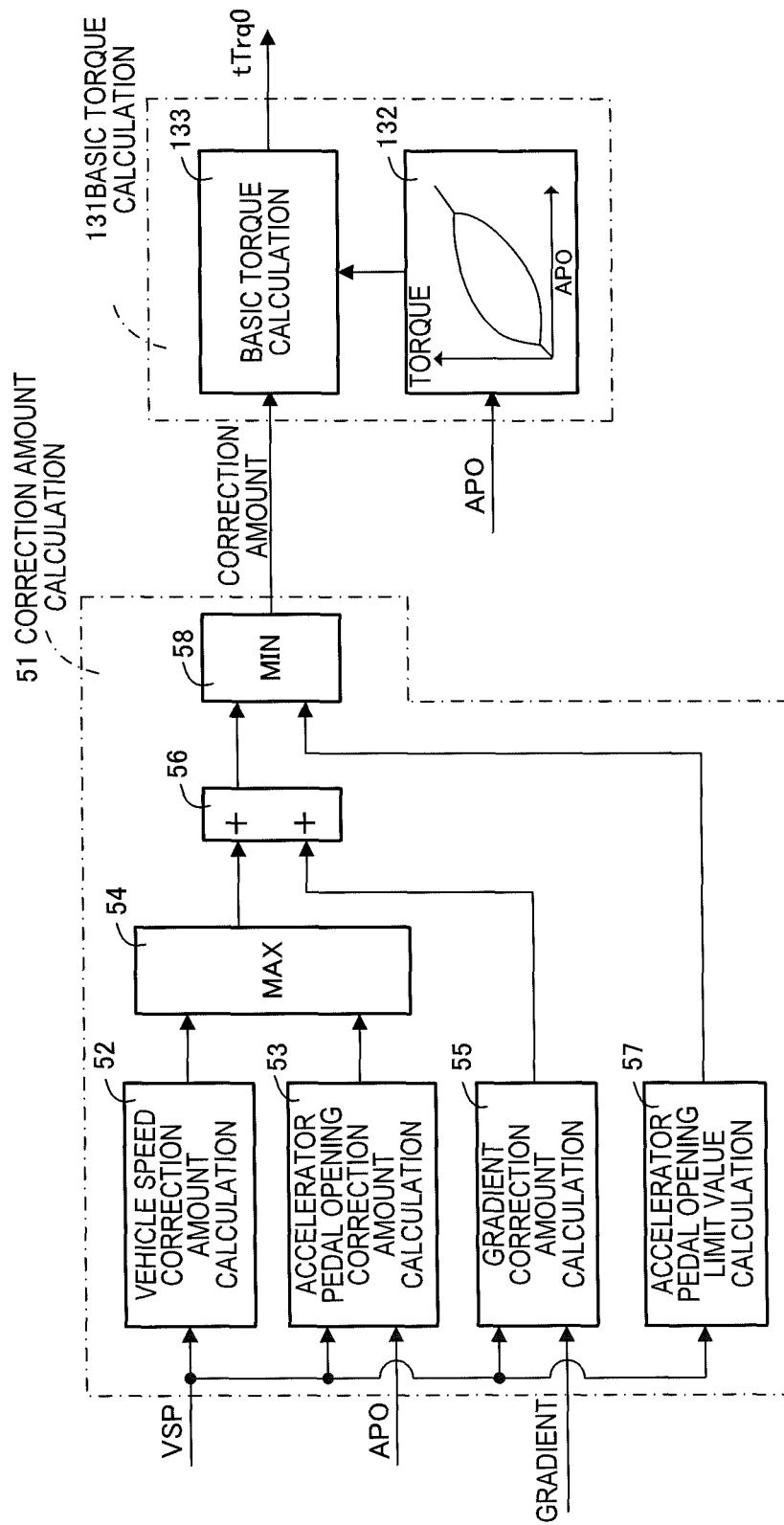
FIG. 41 is a control block diagram of the fourth embodiment.

FIG. 41 is a control block diagram of the third embodiment. The same components as in FIG. 33 of the third embodiment are denoted by the same reference signs. Components different from the third embodiment are mainly described.

In FIG. 41, a basic torque calculation unit 131 is composed of a virtual torque calculation unit 132 and a basic torque calculation unit 133.

Figure 42:
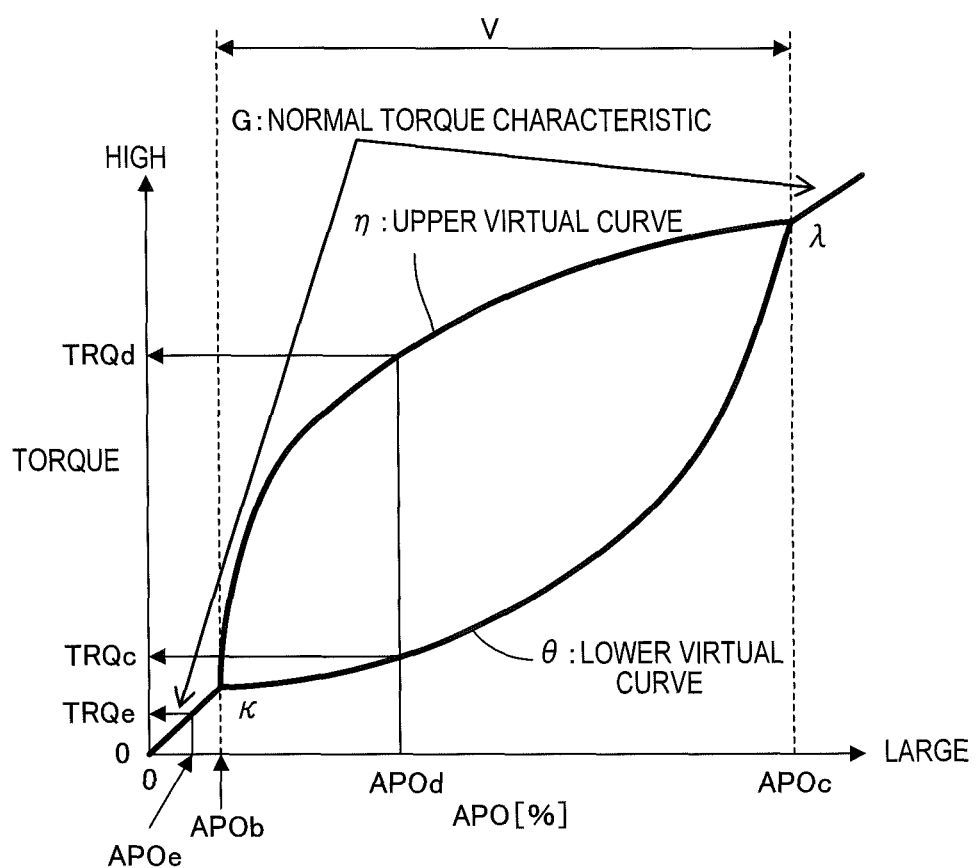
FIG. 42 is a drive force characteristic diagram having two values in a predetermined range of the accelerator pedal opening.

The basic torque calculation unit 132 calculates a value on the lower virtual curve $\theta$ and a value on the upper virtual curve $\eta$ if the accelerator pedal opening APO is in the predetermined accelerator pedal opening range V (APOb<APO<APOc) by retrieving a reference table with the contents of FIG. 42 based on the accelerator pedal opening APO. For example, if the accelerator pedal opening APO is a predetermined value APOd, a first virtual torque TRQc [Nm] as a value on the lower virtual curve $\theta$ and a second virtual torque TRQd [Nm] as a value on the upper virtual curve $\eta$ are calculated. The reference table (FIG. 42) defining a relationship between the accelerator pedal opening APO and the torque (including the first virtual torque TRQc and the second virtual torque TRQd) is stored in a memory of an engine controller 121.

On the other hand, the torque is calculated from the normal torque characteristic G as a linear characteristic if the accelerator pedal opening APO is not larger than the predetermined APOb and if the accelerator pedal opening APO is not smaller than the predetermined APOc. For example, a torque TRQe [Nm] is calculated if the accelerator pedal opening APO is a predetermined value APOe (i.e. if the accelerator pedal opening APO is in a region outside the predetermined accelerator pedal opening range V). The linear characteristic is the normal opening characteristic G. FIG. 42 shows basically the same characteristic as FIG. 40.

The basic torque calculation unit 133 calculates the basic torque tTrq0 [Nm] by the following equation using the values TRQc, TRQd of the above two virtual torques and a correction amount HOS from a correction amount calculation unit 51 if the accelerator pedal opening APO is in the predetermined accelerator pedal opening range V (APOb<APO<APOc).

$$tTrq0 = (TRQd - TRQc) \times HOS/100 + TRQc \quad (27)$$

The equation (27) sets a value calculated by interpolating the values (TRQd, TRQc) of two upper and lower virtual torques at the same accelerator pedal opening APO using the correction amount HOS as the basic torque as shown in FIG. 40. By the equation (27), the basic torque tTrq0 increases with an increase in the correction amount HOS on the condition that the accelerator pedal opening APO is the same. As just described, the basic fuel injection amount calculation unit 113 can obtain the basic torque tTrq0 from the correction amount HOS and the reference table of FIG. 42 in the same manner as the basic torque tTrq0 is obtained from the reference tables of FIGS. 38 and 39 while reducing the memory capacity.

On the other hand, the basic torque calculation unit 133 sets the value of the above torque TRQe as it is as the basic torque tTrq0 [Nm] if the accelerator pedal opening APO is not larger than the predetermined APOb and if the accelerator pedal opening APO is not smaller than the predetermined APOc (i.e. if the accelerator pedal opening APO is in a region outside the predetermined accelerator pedal opening range V).

Figure 43:
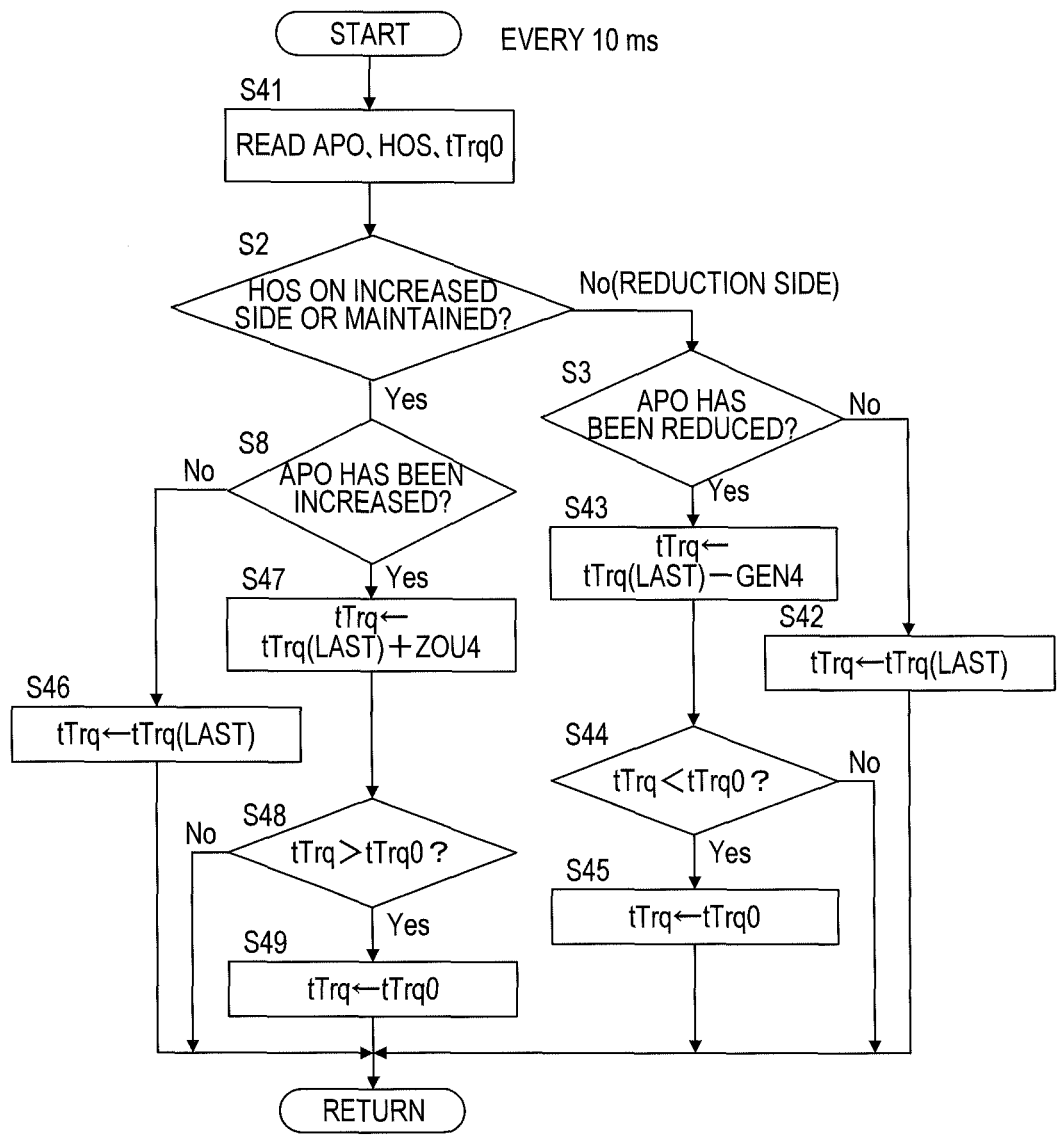
FIG. 43 is a flow chart showing the calculation of a target torque according to the fourth embodiment.

A flow chart of FIG. 43 is for calculating a target torque tTrq and the engine controller 121 executes a control of the flow chart at regular time intervals (e.g. every 10 ms). The same parts as in FIG. 17 of the first embodiment are denoted by the same Step numbers. Parts different from the first embodiment are mainly described.

In Step 41, the accelerator pedal opening APO, the correction amount and the basic torque tTrq0 are read. The correction amount HOS and the basic torque tTrq0 are already calculated in FIG. 41.

In Steps 2, 3, whether or not the correction amount HOS is on an increase side, on a reduction side or maintained is determined.

If the correction amount HOS is on the reduction side, a transition is made from Step 2 to Step 3 to determine whether or not the accelerator pedal opening APO has been reduced. A transition is made from Step 3 to Step 42 to set the value of tTrq (last), which is the last value of the target torque, as it is as the target torque tTrq [Nm] if the accelerator pedal opening APO has been maintained or increased although the correction amount HOS is on the reduction side. The operation of Step 42 is repeated to maintain the target torque tTrq if the accelerator pedal opening APO has been maintained or increased although the correction amount HOS is on the reduction side.

On the other hand, if the accelerator pedal opening APO has been reduced in Step 3, Step 43 follows and the target torque tTrq is reduced by a reduction amount GEN3 [Nm] by the following equation.

$$tTrq = tTrq(\text{last}) - GEN4 \quad (28)$$

tTrq (last) is the last value of tTrq and GEN4 is the reduction amount. The reduction amount GEN4 of the equation (28) is suitably determined in advance.

In Step 44, the target torque tTrq and the basic torque tTrq0 are compared. The process this time is finished by skipping Step 45 unless the target torque tTrq is below the basic torque tTrq0.

On the other hand, if the target torque tTrq is below the basic torque tTrq0 in Step 44, Step 45 follows and the target torque tTrq is limited to the basic torque tTrq0.

If the correction amount HOS is on the increase side or maintained, Step 8 follows and whether or not the accelerator pedal opening APO has been increased is determined. A transition is made from Step 8 to Step 46 to set the value of tTrq (last), which is the last value of the target torque, as it is as the target torque tTrq [Nm] if the accelerator pedal opening APO has been maintained or reduced although the correction amount HOS is on the increase side. The operation of Step 46 is repeated to maintain the target torque tTrq if the accelerator pedal opening APO has been maintained or reduced although the correction amount HOS is on the increase side.

On the other hand, if the accelerator pedal opening APO has been increased in Step 8, Step 47 follows and the target torque tTrq is increased by an increase amount ZOU4 [Nm] by the following equation.

$$tTrq = tTrq(\text{last}) + ZOU4 \tag{29}$$

tTrq (last) is the last value of tTrq and ZOU4 is the increase amount. The increase amount ZOU4 of the equation (29) is suitably determined in advance.

In Step 48, the target torque tTrq and the basic torque tTrq0 are compared. The process this time is finished by skipping Step 49 unless the target torque tTrq is above the basic torque tTrq0.

On the other hand, if the target torque tTrq is above the basic torque tTrq0 in Step 48, Step 49 follows and the target torque tTrq is limited to the basic torque tTrq0.

Figure 44:
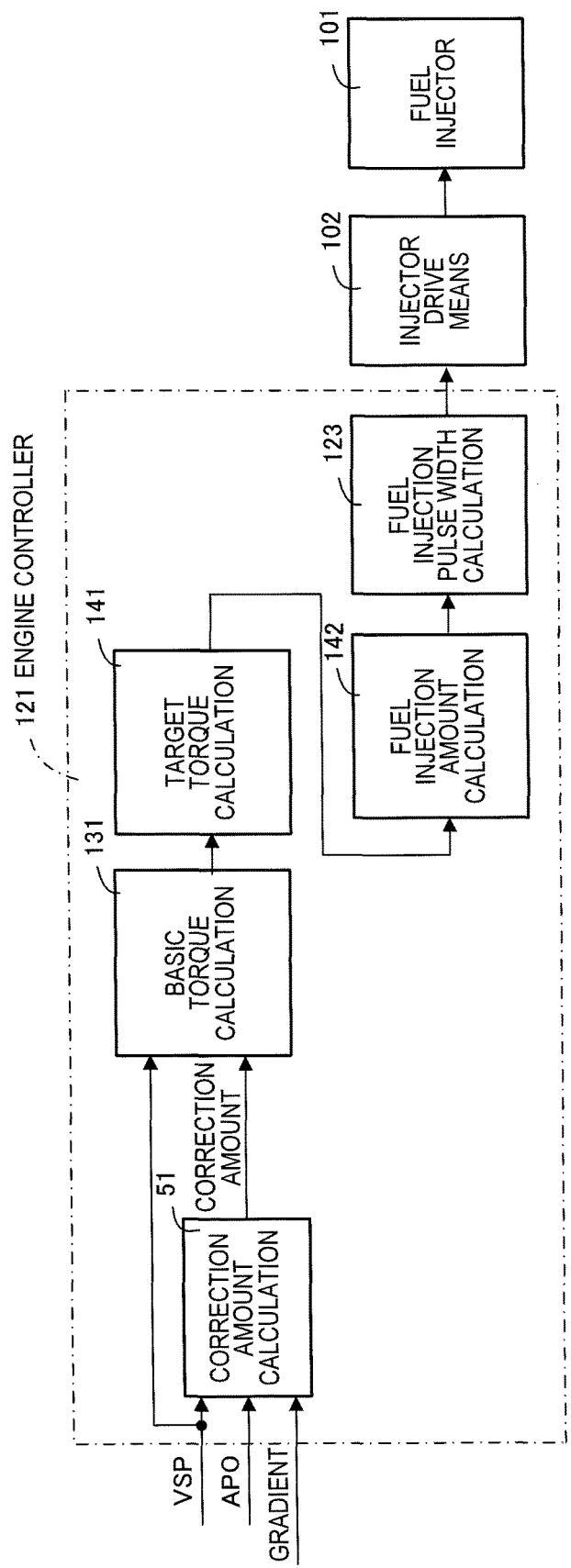
FIG. 44 is a control block diagram of the entire control system of the fourth embodiment targeted at a diesel engine vehicle.

FIG. 44 is a control block diagram of the entire control system of the fourth embodiment targeted at the diesel engine vehicle. The same components as in FIG. 36 of the third embodiment are similarly shown.

The engine controller 121 includes the correction amount calculation unit 51, the basic torque calculation unit 131, a target torque calculation unit 141, a fuel injection amount calculation unit 142 and a fuel injection pulse width calculation unit 123. The details of the correction amount calculation unit 51 and the basic torque calculation unit 131 in FIG. 44 are shown in FIG. 41. Further, the detail of the target torque calculation unit 141 is shown in the flow chart of FIG. 43.

In FIG. 44, the fuel injection amount calculation unit 142 calculates a fuel injection amount according to the target torque and outputs this calculated fuel injection amount to the fuel injection pulse width calculation unit 123. The fuel injection pulse width calculation unit 123 calculates a fuel injection width of main injection from this fuel injection amount and a fuel pressure of a common rail and outputs a signal of this fuel injection pulse width to an injector drive means 102.

According to the fourth embodiment, the diesel engine of the vehicle as an alternative to the vehicle with the engine includes the fuel injector 101 capable of adjusting the fuel injection amount into the engine and the injector drive means 102 for driving the fuel injection amounts from the fuel injector 101 according to a control amount. The engine controller 121 (constant-speed torque characteristic setting means) sets the constant-speed torque characteristic α. The constant-speed torque characteristic α is composed of the torque characteristic β (second torque characteristic) and the torque characteristic γ (third torque characteristic). The normal torque characteristic G (first torque characteristic) is a characteristic of the torque necessary for steady running and represented by a polygonal line approximate to a straight line of an increasing function (or one straight line) on a plane with two axes of the accelerator pedal opening and the torque. The torque characteristic β (second torque characteristic) has a smaller gradient than that of the polygonal line approximate to the straight line in the predetermined accelerator pedal opening range F on a side larger than the point H (predetermined point of the accelerator pedal opening APOstd) on the normal torque characteristic G as the base point. The torque characteristic γ (third torque characteristic) becomes an increasing function with a larger gradient than the torque characteristic β (second torque characteristic) and returns to the normal torque characteristic G in a region where the accelerator pedal opening is larger than in the predetermined accelerator pedal opening range F. The engine controller 111 (drive means control means) controls the injector drive means 102 during steady running using the normal torque characteristic G and the constant-speed torque characteristic α set by the constant-speed torque characteristic setting means. Unnecessary acceleration and deceleration of a driver to maintain the constant speed are suppressed by setting the second torque characteristic β having a smaller gradient than that of the polygonal line approximate to the straight line of the normal torque characteristic G, i.e. the torque characteristic β in which the vehicle speed is easily adjusted, in the accelerator pedal opening range F. Thus, fuel economy can be improved during steady running.

According to the fourth embodiment, an output control device includes a plurality of constant-speed torque characteristics α1 to α4 in which the point H (predetermined point) is shifted to the larger side of the accelerator pedal opening and the larger side of the torque on the normal torque characteristic G (first torque characteristic) with an increase in the vehicle speed with the width of the predetermined accelerator pedal opening range F kept constant. The output control device includes the vehicle speed sensor 47 (vehicle speed detection means) for detecting the vehicle speed and selects the constant-speed torque characteristic corresponding to the vehicle speed detected by this vehicle speed sensor 47 from the plurality of constant-speed torque characteristics α1 to α4. The output control device controls the injector drive means 102 during steady running in which the detected vehicle speed is targeted, using the selected constant-speed torque characteristic and the normal torque characteristic G. Thus, even if the targeted vehicle speed differs during steady running, fuel economy can be improved during each steady running since a torque characteristic β1 to β4 in which the vehicle speed is easily adjusted is set for each vehicle speed.

According to the fourth embodiment, the output control device includes a plurality of constant-speed torque characteristics α1, α5 and α6 in which the point H (predetermined point) is shifted to the larger side of the accelerator pedal opening and the larger side of the torque on the normal torque characteristic G (first torque characteristic) with an increase in the road surface gradient of the uphill road with the width of the predetermined accelerator pedal opening range F kept constant. The output control device includes a road surface gradient estimation means (navigation system and engine controller 121) for estimating the road surface gradient of the uphill road on which the vehicle is running. The output control device selects the constant-speed torque characteristic corresponding to the magnitude of the road surface gradient estimated by this road surface gradient estimation means from the plurality of constant-speed torque characteristics α1, α5 and α6. The output control device controls the injector drive means during steady running at the estimated road surface gradient using the selected constant-speed torque characteristic and the normal torque characteristic G. Thus, even if the road surface gradient differs during uphill running in which a constant speed is targeted, fuel economy can be improved during each uphill running at the constant speed since a torque characteristic β1, β5, β6 in which the vehicle speed is easily adjusted is set for each road surface gradient of the uphill road.

The present invention is not limited to the embodiments described above and various modifications and changes are possible within the scope of the technical concept of the present invention. It is apparent that those modifications and changes are also included in the technical scope of the present invention.

All the contents of Japanese Patent Application No. 2012-58478 filed on Mar. 15, 2012 are incorporated herein by reference.

The invention claimed is:

1. An output control device for a vehicle provided with a gasoline engine including a throttle valve capable of adjusting an intake air amount into the engine and a throttle actuator for driving the throttle valve according to a correlation between an accelerator pedal opening and a throttle opening, as a relationship of an increasing function, the output control device comprising:
a vehicle speed detection unit configured to detect a vehicle speed;
an accelerator pedal opening detection unit configured to detect an accelerator pedal opening;
a memory on which a map is stored, wherein the map is a two-dimensional map having throttle opening values as a first axis and accelerator pedal opening values as a second axis, and wherein the map comprises two curves defined by two throttle openings at every accelerator pedal opening value in a predetermined accelerator pedal opening range,
a basic correction amount calculation unit configured to calculate a basic correction amount having a value, which increases with an increase in the vehicle speed and with an increase in the accelerator pedal opening, based on the vehicle speed and the accelerator pedal opening;
a first basic throttle opening calculation unit configured to calculate, for the accelerator pedal opening detected by the accelerator pedal opening detection unit, a basic throttle opening based on the basic correction amount and the of two throttle openings chosen from the map according to the accelerator pedal opening; and
a throttle actuator controller configured to control the throttle actuator using the basic throttle opening.

2. The output control device for the vehicle according to claim 1,
wherein an upper curve and a lower curve corresponding to the two throttle openings at every accelerator pedal opening are provided in the predetermined accelerator pedal opening range; and
wherein the first basic throttle opening calculation unit is configured to calculate the basic throttle opening by interpolating the two throttle openings obtained from the map according to the accelerator pedal opening using the basic correction amount.

3. The output control device for the vehicle according to claim 2,
wherein the map is in a form of a leaf-like shape to provide the two values in the predetermined range of the accelerator pedal opening,
wherein the basic correction amount is a value that gives a throttle opening change in relation to an accelerator pedal opening change smaller as compared with the correlation, and
wherein the throttle actuator controller is further configured to control the throttle actuator according to the correlation in a region outside the predetermined accelerator pedal opening range.

4. The output control device for the vehicle according to claim 2,
wherein the value of the throttle opening on the upper curve is larger than the value of the throttle opening on the lower curve at a same accelerator pedal opening.

5. The output control device for the vehicle according to claim 1, comprising:
a target throttle opening setting unit configured to maintain a target throttle opening immediately before the basic throttle opening changes if the basic throttle opening changes while the accelerator pedal opening remains unchanged, and configured to change the target throttle opening in the same direction as a changing direction of the accelerator pedal opening and set the target throttle opening if the accelerator pedal opening changes thereafter,
wherein the throttle actuator controller is further configured to control the throttle actuator according to the target throttle opening set by the target throttle opening setting unit.

6. The output control device for the vehicle according to claim 1, further comprising:
a road surface gradient detection/estimation unit configured to detect or estimate a road surface gradient of an uphill road on which the vehicle is running;
a gradient correction amount calculation unit configured to calculate a gradient correction amount having a value, which increases with an increase in the road surface gradient, based on the magnitude of the road surface gradient; and
a correction unit configured to calculate a corrected basic correction amount by applying the gradient correction amount to the basic correction amount,
wherein the throttle actuator controller is further configured to control the throttle actuator according to the corrected basic correction amount.

* * * * *